United States Patent
Ueno et al.

(10) Patent No.: US 6,449,943 B1
(45) Date of Patent: Sep. 17, 2002

(54) METHOD OF EVALUATING DETERIORATED STATE OF CATALYTIC CONVERTER FOR PURIFYING EXHAUST GAS

(75) Inventors: Masaki Ueno; Yoshihisa Iwaki; Shusuke Akazaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/748,189

(22) Filed: Dec. 27, 2000

(30) Foreign Application Priority Data

Dec. 28, 1999 (JP) .......................................... 11-372400

(51) Int. Cl.⁷ ................................................ F01N 3/00
(52) U.S. Cl. ........................... 60/274; 60/276; 60/277; 60/285
(58) Field of Search .................... 60/274, 276, 277, 60/285; 73/118.1; 701/103, 109; 123/674

(56) References Cited

U.S. PATENT DOCUMENTS

| | | | | |
|---|---|---|---|---|
| 5,400,592 A | * | 3/1995 | Mukaihira et al. | 60/277 |
| 5,557,933 A | * | 9/1996 | Numata et al. | 60/277 |
| 5,673,555 A | * | 10/1997 | Achleitner | 60/277 |
| 5,675,967 A | * | 10/1997 | Ries-Mueller | 60/277 |
| 5,732,551 A | * | 3/1998 | Naber et al. | 60/277 |
| 5,845,490 A | * | 12/1998 | Yasui et al. | 60/276 |
| 6,073,073 A | * | 6/2000 | Kitamura et al. | 60/277 |
| 6,073,440 A | * | 6/2000 | Douta et al. | 60/277 |
| 6,151,888 A | * | 11/2000 | Schneider et al. | 60/277 |

* cited by examiner

Primary Examiner—Thomas Denion
Assistant Examiner—Tu M. Nguyen
(74) Attorney, Agent, or Firm—Arent Fox Kintner Plotkin & Kahn, PLLC

(57) ABSTRACT

The values of parameters of a model of an object exhaust system including a catalytic converter are identified from the data of outputs from an air-fuel ratio sensor and an $O_2$ sensor which are disposed respectively upstream and downstream of the catalytic converter while an internal combustion engine associated with the catalytic converter is in operation. A deterioration evaluating parameter representing the degree of variation of time-series data of the identified parameters is determined from the time-series data of the identified parameters. The deteriorated state of the catalytic converter is evaluated based on the deterioration evaluating parameter.

28 Claims, 22 Drawing Sheets

METHOD OF EVALUATING DETERIORATED STATE OF CATALYTIC CONVERTER FOR PURIFYING EXHAUST GAS

BACKGROUND OF THE INVENTION

1. Field of the Invention

The present invention relates to a method of evaluating a deteriorated state of a catalytic converter for purifying an exhaust gas, such as a catalytic converter for use on an automobile or a hybrid vehicle.

2. Description of the Related Art

Conventional processes of determining the deteriorated state of a catalytic converter for purifying exhaust gases produced when an air-fuel mixture is combusted, e.g., a catalytic converter disposed in the exhaust passage of an internal combustion engine, are known from Japanese patent publication No. 2,526,640 and Japanese laid-open patent publication No. 7-19033, for example.

The disclosed techniques are based on the fact that when the air-fuel ratio of an air-fuel mixture to be combusted by an internal combustion engine is changed from a leaner value to a richer value or from a richer value to a leaner value, the outputs from oxygen concentration sensors that are positioned respectively upstream and downstream of a catalytic converter combined with the internal combustion engine are inverted. More specifically, under certain operating conditions of the internal combustion engine, i.e., when the power output of the internal combustion engine is increased or the fuel supplied to the internal combustion engine is cut off as disclosed in Japanese patent publication No. 2,526,640 or when certain conditions are satisfied, e.g., the load and rotational speed of the internal combustion engine are in predetermined ranges as disclosed in Japanese laid-open patent publication No. 7-19033, the air-fuel ratio is positively changed from a leaner value to a richer value or from a richer value to a leaner value. At this time, the time consumed after the output of the upstream oxygen concentration sensor is inverted until the output of the downstream oxygen concentration sensor is inverted, and the period at which the output of the downstream oxygen concentration sensor is inverted are measured, and the deteriorated state of the catalytic converter is evaluated based on the measured values.

According to these techniques, when the internal combustion engine is operating under ordinary conditions, i.e., conditions without determining the deteriorated state of the catalytic converter, the air-fuel ratio is feedback-controlled depending on the inversion of the outputs from the oxygen concentration sensors in order to keep the air-fuel ratio of the internal combustion engine in the vicinity of a stoichiometric air-fuel ratio, for thereby allowing the catalytic converter to keep an appropriate purifying capability.

However, the above processes of evaluating the deteriorated state of the catalytic converter have suffered the following difficulties:

In order to determine the deteriorated state of the catalytic converter, the air-fuel ratio of the internal combustion engine needs to be positively changed to a leaner value or a richer value. Therefore, while the air-fuel ratio of the internal combustion engine is being feedback-controlled in order to allow the catalytic converter to keep an appropriate purifying capability, it is not possible to determine the deteriorated state of the catalytic converter. When the deteriorated state of the catalytic converter is determined, it is difficult to keep an appropriate purifying capability of the catalytic converter.

According to the conventional processes, the operating state of the internal combustion engine which is capable of determining the deteriorated state of the catalytic converter or the state in which exhaust gases are generated by the internal combustion engine in that operating state is limited to a certain special state. Specifically, according to the process disclosed in Japanese patent publication No. 2,526,640, the deteriorated state of the catalytic converter can be determined only if the output of the downstream $O_2$ sensor is produced in a leaner air-fuel ratio range when the output power of the internal combustion engine is to be increased and at the time of starting to increase the output power of the internal combustion engine, and only if the output of the downstream $O_2$ sensor is produced in a richer air-fuel ratio range when the supply of fuel to the internal combustion engine is to be cut off and at the time of cutting off the supply of fuel to the internal combustion engine.

According to the process disclosed in Japanese laid-open patent publication No. 7-19033, the deteriorated state of the catalytic converter can be determined only if the load (represented by the intake air rate, the throttle valve opening, the fuel injection quantity, and the intake air pressure) and the rotational speed of the internal combustion engine fall in a predetermined range, the intake air temperature is equal to or higher than a preset value, and the load of the internal combustion engine varies by an amount equal to or greater than a preset value. Therefore, if the internal combustion engine which generates exhaust gases to be supplied to the catalytic converter, which may be disposed in the exhaust passage of the internal combustion engine, operates in various operating states or the exhaust gases are generated in various states, then there are not many opportunities to be able to determine the deteriorated state of the catalytic converter, and the reliability of the determined deteriorated state of the catalytic converter under such conditions is low.

The applicant of the present application has proposed a system having a first exhaust gas sensor disposed upstream of a catalytic converter for generating an output representing the air-fuel ratio of an air-fuel mixture combusted by an internal combustion engine, and a second exhaust gas sensor disposed downstream of the catalytic converter for generating an output representing the concentration of a certain component of exhaust gases, e.g., the concentration of oxygen, the system being arranged to control the air-fuel ratio of the internal combustion engine according to a feedback control process to achieve an optimum purifying capability of the catalytic converter based on outputs from the sensors (see Japanese laid-open patent publication No. 9-324681 and U.S. Pat. No. 5,852,930 and Japanese laid-open patent publication No. 11-93740 and U.S. Pat. No. 6,079,205).

The proposed system determines a target air-fuel ratio for the internal combustion engine to cause the output (the detected value of the oxygen concentration) of the second exhaust gas sensor to have a given constant value, and feedback-controls the air-fuel ratio of the internal combustion engine to converge the output (the detected value of the air-fuel ratio) of the first exhaust gas sensor to the target air-fuel ratio, for thereby achieving the optimum purifying capability of the catalytic converter.

Since the system can stably achieve the optimum purifying capability of the catalytic converter according to the above air-fuel ratio control process, it is desirable to be able to evaluate the deteriorated state of the catalytic converter while performing the air-fuel ratio control process.

SUMMARY OF THE INVENTION

It is therefore an object of the present invention to provide a method capable of appropriately evaluating a deteriorated state of a catalytic converter for purifying an exhaust gas in various states in which an exhaust gas to be purified by the catalytic converter is generated or in various states in which an internal combustion engine that generates the exhaust gas is operated.

Another object of the present invention is to provide a method capable of appropriately evaluating a deteriorated state of a catalytic converter for purifying an exhaust gas while maintaining a desired purifying capability of the catalytic converter which is disposed in the exhaust passage of an internal combustion engine.

To achieve the above objects, there is provided in accordance with the present invention a method of evaluating a deteriorated state of a catalytic converter for purifying an exhaust gas produced when an air-fuel mixture is combusted, comprising the steps of supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas, detecting data of the outputs of the first exhaust gas sensor and the second exhaust gas sensor when the exhaust gas is supplied to the exhaust passage, sequentially identifying the value of at least one parameter to be set of a model that is constructed as representing a behavior of an object exhaust system which ranges from the first exhaust gas sensor to the second exhaust gas sensor and includes the catalytic converter in the exhaust passage, based on the detected data of the outputs of the first exhaust gas sensor and the second exhaust gas sensor, and determining data representing a degree of variation of time-series data of the identified value of the parameter of the model, as a deterioration evaluating parameter, from the time-series data of the identified value, and evaluating a deteriorated state of the catalytic converter based on the determined deterioration evaluating parameter.

Studies made by the inventors indicate that a model expressing the behavior of the object exhaust system including the catalytic converter and ranging from the first exhaust gas sensor to the second exhaust gas sensor is constructed, and when the value of the parameter to be set, i.e., the parameter to be set to a certain value in defining the behavior of the model, is sequentially identified based on the data of the output of the exhaust gas sensors that are acquired while the exhaust gas is being supplied to the exhaust passage, the time-series data of the identified value of the parameter exhibits a certain characteristic tendency against the deteriorated state of the catalytic converter. Specifically, if the deterioration of the catalytic converter is small, the time-series data of the identified value of the parameter varies to a small extent, and if the deterioration of the catalytic converter becomes larger, the time-series data of the identified value of the parameter varies to a relatively large extent. Therefore, as the deterioration of the catalytic converter progresses, the variation of the identified value of the parameter of the model tends to become larger. This is considered to be due to the fact that the matching between the model of the object exhaust system and the actual behavior of the object exhaust system is lowered as the deterioration of the catalytic converter progresses.

According to the present invention, in evaluating the deterioration of the catalytic converter, the data representing the degree of variation of time-series data of the identified value of the parameter of the model is determined as the deterioration evaluating parameter from the time-series data of the identified value, and the deteriorated state of the catalytic converter is determined based on the determined deterioration evaluating parameter.

Preferably, the first exhaust gas sensor comprises a sensor for producing an output representing the air-fuel ratio of the air-fuel mixture from which the exhaust gas entering the catalytic converter is produced, and the second exhaust gas sensor comprises a sensor for producing an output representing the content of a particular component of the exhaust gas that has passed through the catalytic converter.

When the value of the parameter of the model of the object exhaust system which employs the above sensors as the first and second exhaust gas sensors are identified based on the data of the outputs of the first and second exhaust gas sensors at the time the exhaust gas is supplied to the exhaust passage, the above tendency of the identified value against the deteriorated state of the catalytic converter tends to appear relatively easily. Therefore, it is easy to evaluate the deteriorated state of the catalytic converter based on the deterioration evaluating parameter which represents the degree of variation of time-series data of the identified value of the parameter.

Since it is possible to evaluate the deteriorated state of the catalytic converter when the exhaust gas to be supplied to the catalytic converter is generated in various states or the internal combustion engine operates in various operating states, the catalytic converter is preferably disposed in the exhaust passage of the internal combustion engine which combusts the air-fuel mixture therein.

If the first exhaust gas sensor comprises a sensor for producing an output representing the air-fuel ratio of the air-fuel mixture, and the second exhaust gas sensor comprises a sensor for producing an output representing the content of a particular component of the exhaust gas that has passed through the catalytic converter, then the method preferably further comprising the step of controlling the air-fuel ratio of the internal combustion engine in order to converge the output of the second exhaust gas sensor to a predetermined target value when the exhaust gas is supplied to the exhaust passage upon operation of the internal combustion engine, wherein the value of the parameter is identified and the deteriorated state of the catalytic converter is evaluated concurrent with the step of controlling the air-fuel ratio of the internal combustion engine.

By controlling the air-fuel ratio of the internal combustion engine, or more specifically the air-fuel ratio of the air-fuel mixture combusted in the internal combustion engine, to converge the output of the second exhaust gas sensor which represents the content of the particular component of the exhaust gas having pass through the catalytic converter, it is possible to achieve a desired purifying capability of the catalytic converter for purifying the exhaust gas emitted from the internal combustion engine. When the value of the parameter is identified and the deteriorated state of the catalytic converter is evaluated concurrent with the step of controlling the air-fuel ratio of the internal combustion engine, the deteriorated state of the catalytic converter can be evaluated while maintaining the desired purifying capability of the catalytic converter during operation of the internal combustion engine.

If an oxygen concentration sensor ($O_2$ sensor) is used as the second exhaust gas sensor, then an optimum purifying capability of the catalytic converter is achieved by controlling the air-fuel ratio of the internal combustion engine to keep the output of the sensor at a given constant level.

The step of controlling the air-fuel ratio of the internal combustion engine preferably comprises the steps of calculating a target air-fuel ratio of the internal combustion engine in order to converge the output of the second exhaust gas sensor to the target value, and controlling the air-fuel ratio of the internal combustion engine according to a feedback control process in order to converge the air-fuel ratio represented by the output of the first exhaust gas sensor to the target air-fuel ratio.

By thus controlling the air-fuel ratio of the internal combustion engine, the air-fuel ratio detected by the first exhaust gas sensor can stably be controlled at an air-fuel ratio suitable to achieve the desired purifying capability of the catalytic converter, i.e., the target air-fuel ratio. Since the air-fuel ratio of the internal combustion engine is stably controlled, the behavior of the data of the outputs of the first and second exhaust gas sensors which are used to identify the value of the parameter is made smooth. As a result, the effect of disturbances other than the deteriorated state of the catalytic converter on the identified value of the parameter is reduced. Consequently, the deteriorated state of the catalytic converter can appropriately be evaluated based on the deterioration evaluating parameter which represents the degree of variation of time-series data of the identified value of the parameter.

While the target air-fuel ratio can be calculated using a PID controller, it is preferably calculated by a sliding mode controller.

Specifically, the sliding mode controller is advantageous in that it is more resistant to disturbances than the PID controller. The target air-fuel ratio calculated by the sliding mode controller makes stable the process of controlling the air-fuel ratio. As a result, the desired purifying capability of the catalytic converter can be achieved more reliably. At the same time, because the effect of disturbances other than the deteriorated state of the catalytic converter on the identified value of the parameter is minimized, the deterioration evaluating parameter which represents the degree of variation of time-series data of the identified value of the parameter is made reliable as being highly correlated to the deteriorated state of the catalytic converter. Thus, the deteriorated state of the catalytic converter can be evaluated more adequately based on the deterioration evaluating parameter.

In controlling the air-fuel ratio of the internal combustion engine concurrent with evaluating the deteriorated state of the catalytic converter, the target air-fuel ratio is preferably calculated by an algorithm determined in advance using the identified data of the parameter.

Specifically, since the identified value of the parameter reflects the actual behavioral characteristics of the object exhaust system, when the target air-fuel ratio for converging the output of the second exhaust gas sensor to the target value is calculated using the identified value, the accuracy of the target air-fuel ratio is increased. As a consequence, the desired purifying capability of the catalytic converter can be achieved more reliably.

While the air-fuel ratio of the internal combustion engine can be feedback-controlled by a PID controller, it is preferably controlled by a recursive-type controller.

When the air-fuel ratio of the internal combustion engine is feedback-controlled by a recursive-type controller, or specifically an adaptive controller, it is possible to feedback-control the air-fuel ratio detected by the first exhaust gas sensor more accurately at the target air-fuel ratio while suppressing the effect of characteristic changes of the internal combustion engine than if a PID controller is used. The desired purifying capability of the catalytic converter can be achieved more reliably, and the reliability of the deterioration evaluating parameter which represents the degree of variation of time-series data of the identified value of the parameter is increased, so that the deteriorated state of the catalytic converter can be evaluated more adequately based on the deterioration evaluating parameter.

The recursive-type controller determines a new manipulated variable according to a given recursive formula including time-series data in the past prior to the present of a manipulated variable for the air-fuel ratio of the internal combustion engine, or more specifically a manipulated variable for the fuel supply quantity of the internal combustion engine, for example, in order to converge the air-fuel ratio represented by the output of the first exhaust gas sensor to the target air-fuel ratio, and controls the air-fuel ratio of the internal combustion engine with the manipulated variable.

The model comprises a model expressing the object exhaust system as a discrete-time system for generating the output of the second exhaust gas sensor from the output of the first exhaust gas sensor via a response delay element and/or a dead time element, and includes, as the parameter, at least one of a coefficient relative to the output of the first exhaust gas sensor and a coefficient relative to the output of the second exhaust gas sensor.

The model mathematically expresses the output of the second exhaust gas sensor in each control cycle with the outputs of the second exhaust gas sensor and the first exhaust gas sensor in a past control cycle and coefficients of the outputs of the sensors. The output of the second exhaust gas sensor in the past control cycle corresponds to the response delay element. When the output of the first exhaust gas sensor in a control cycle prior to the dead time of the object exhaust system is used as the output of the first exhaust gas sensor in the above model, it corresponds to the dead time element.

By thus constructing the model of the object exhaust system and the values of the coefficients used in the model as the parameter are identified based on the data of the outputs of the first and second exhaust gas sensors, the identified value of the parameter (coefficients) of the model accurately reflects the actual behavioral characteristics of the catalytic converter included in the exhaust system. As a result, the reliability of the deterioration evaluating parameter which represents the degree of variation of time-series data of the identified value of the parameter is achieved as the deterioration evaluating parameter is correlated to the deteriorated state of the catalytic converter. Therefore, the deteriorated state of the catalytic converter can be evaluated adequately based on the deterioration evaluating parameter. By modeling the object exhaust system as a discrete time system, the value of the parameter (coefficients) can be identified on a real-time basis.

With the object exhaust system being thus modeled, the parameter preferably includes the coefficient relative to the output of the first exhaust gas sensor, and the step of evaluating the deteriorated state of the catalytic converter preferably comprises the step of evaluating the deteriorated state of the catalytic converter based on the deterioration evaluating parameter determined from time-series data of the identified value of the coefficient relative to the output of the first exhaust gas sensor.

Specifically, when the identified value of the coefficients relative to the output of the first exhaust gas sensor and the identified value of the coefficients relative to the output of the second exhaust gas sensor are compared with each other, the time-series data of the former identified value exhibits the above tendency against the deteriorated state of the catalytic converter more than the time-series data of the latter identified value. Therefore, the deteriorated state of the catalytic converter can be evaluated more adequately based on the deterioration evaluating parameter that is determined from the time-series data of the identified value of the coefficients relative to the output of the first exhaust gas sensor.

With the object exhaust system being thus modeled, the step of sequentially identifying the value of the parameter comprises the steps of sequentially identifying the value of the parameter according to an algorithm for sequentially updating and identifying the value of the parameter in order to minimize an error between the output of the second exhaust gas sensor in the model and an actual output of the second exhaust gas sensor, and filtering the output of the second exhaust gas sensor in the model and the actual output of the second exhaust gas sensor with the same frequency passing characteristics in calculating the error.

It is thus possible to identify the value of the parameter (coefficients) in a manner to cause the frequency characteristics of the actual object exhaust system including the catalytic converter and the model, or more specifically the frequency characteristics of changes of the output of the second exhaust gas sensor (corresponding to the output of the model) with respect to changes of the output of the first exhaust gas sensor (corresponding to the input of the model), to match each other. Thus, the identified value of the parameter is highly reliable as reflecting the behavioral characteristics of the object exhaust system including the catalytic converter. Therefore, the deteriorated state of the catalytic converter can be evaluated more adequately based on the deterioration evaluating parameter which represents the degree of variation of the time-series data of the identified value.

The step of sequentially identifying the value of the parameter preferably comprises the step of sequentially identifying the value of the parameter depending on a particular behavior of the object exhaust system.

Depending on the behavior of the object exhaust system, the identified value of the parameter may lack reliability. By identifying the value of the parameter in a certain behavior of the object exhaust system, i.e., a behavior in which air-fuel ratio of the air-fuel mixture recognized by the oxygen concentration in the exhaust gas changes from a leaner value to a richer value, the identified value of the parameter is made highly reliable as reflecting the behavioral characteristics of the object exhaust system. Thus, the reliability of the evaluation of the deteriorated state of the catalytic converter based on the deterioration evaluating parameter which represents the degree of variation of the time-series data of the identified value is increased.

The step of sequentially identifying the value of the parameter preferably comprises the step of recognizing the particular behavior of the object exhaust system based on the value of a function that is determined by a predetermined number of time-series data prior to the present of the output of the second exhaust gas sensor.

The step of sequentially identifying the value of the parameter preferably comprises the step of limiting the identified value of the parameter.

The above process makes it possible to prevent the value of the parameter from being unduly identified due to a disturbance other than the deteriorated state of the catalytic converter. As a result, the reliability of the evaluation of the deteriorated state of the catalytic converter based on the deterioration evaluating parameter is increased. As the identified value is prevented from being determined as a noisy value, the stability of the process of controlling the air-fuel ratio of the internal combustion engine using the identified value is increased.

The step of sequentially identifying the value of the parameter preferably comprises the step of calculating the identified value of the parameter based on the difference between an actual output of the first exhaust gas sensor and a predetermined reference value and the difference between an actual output of the second exhaust gas sensor and a predetermined reference value, which differences are used as the data of the outputs of the first and second exhaust gas sensors.

In calculating the identified value of the parameter, the difference between the actual output of the first exhaust gas sensor and the predetermined reference value and the difference between the actual output of the second exhaust gas sensor and the predetermined reference value are used as the data of the outputs of the first and second exhaust gas sensors. In this manner, an algorithm for calculating the identified value can be constructed relatively easily, and the accuracy of the identified value is increased.

As described above, for controlling the air-fuel ratio of the internal combustion engine in order to converge the output of the first exhaust gas sensor to a given target value, the reference value relative to the first exhaust gas sensor is preferably set to the above target value.

The step of evaluating the deteriorated state of the catalytic converter comprises the steps of determining a central value of the identified value of the parameter by effecting a low-pass filtering process on the time-series data of the identified value of the parameter, and determining the deterioration evaluating parameter from the difference between the central value and each of the time-series data of the identified value of the parameter.

Specifically, by effecting the low-pass filtering process on the time-series data of the identified value of the parameter of the model, the central value of the identified value can be determined. Inasmuch as the degree of variation of the time-series data of the identified value is closely related to the magnitude of the difference between the central value and. each of the time-series data of the identified value, the deterioration evaluating parameter which represents the degree of variation can be obtained by determining the deterioration evaluating parameter from the difference.

The low-pass filtering process preferably comprises a filtering process according to a sequential statistical algorithm.

When the central value is determined by the filtering process according to the sequential statistical algorithm, the central value of the identified value can be determined with a small memory capacity without the need for a memory for storing many time-series data of the identified value.

The sequential statistical algorithm may comprise a method of least squares, a method of weighted least squares, a degressive gain method, a fixed gain method, etc.

While the absolute value of the difference between the data of the individual identified value and the central value or the square of the difference may be used as the deterioration evaluating parameter, it is preferable to determine the deterioration evaluating parameter by effecting a low-pass filtering process on the square or absolute value of the difference between the data of the individual identified value and the central value.

The value of the deterioration evaluating parameter thus determined is highly correlated to the deteriorated state of the catalytic converter, and monotonously increases as the deterioration of the catalytic converter progresses. The variation of values of the deterioration evaluating parameter at respective deteriorated states of the catalytic converter is small, i.e., the extent of deterioration of the catalytic converter and the value of the deterioration evaluating parameter have a clear 1:1 correspondence. Therefore, the deteriorated state of the catalytic converter can be evaluated highly reliably and accurately based on the deterioration evaluating parameter.

The filtering process for determining the deterioration evaluating parameter should preferably a filtering process according to a sequential statistical algorithm as with the process of determining the central value of the identified value.

When the deterioration evaluating parameter is determined by the filtering process according to the sequential statistical algorithm, which preferably comprises a method of least squares, a method of weighted least squares, a degressive gain method, a fixed gain method, etc., the deterioration evaluating parameter as the central value of the square or absolute value of the difference can be determined with a small memory capacity without the need for a memory for storing many time-series data of the square or absolute value of the difference.

The method further comprises the step of determining whether the exhaust gas is supplied to the exhaust passage at a substantially constant rate or not, and the step of evaluating the deteriorated state of the catalytic converter comprises the step of preventing the deterioration evaluating parameter from being determined using data of the identified value if it is determined that the exhaust gas is supplied to the exhaust passage at the substantially constant rate.

Specifically if the exhaust gas is supplied to the exhaust passage at the substantially constant rate, since the output of the first or second exhaust gas sensor varies to a small extent, even when the deterioration of the catalytic converter progresses relatively largely, the variation of identified values of the parameter may possibly be relatively small. In such a situation, since the time-series data of the identified value does not properly reflect the deteriorated state of the catalytic converter, even if the deterioration evaluating parameter is determined from the time-series data, it is not suitable in evaluating the deteriorated state of the catalytic converter. According to the present invention, therefore, if it is determined that the exhaust gas is supplied to the exhaust passage at the substantially constant rate, the deterioration evaluating parameter is prevented from being determined using data of the identified value. Accordingly, the reliability of the deterioration evaluating parameter is achieved.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An apparatus for carrying out a method of evaluating a deteriorated state of a catalytic converter for purifying an exhaust gas according to the present invention will first be described below with reference to FIGS. 1 through 23.

Figure 1:
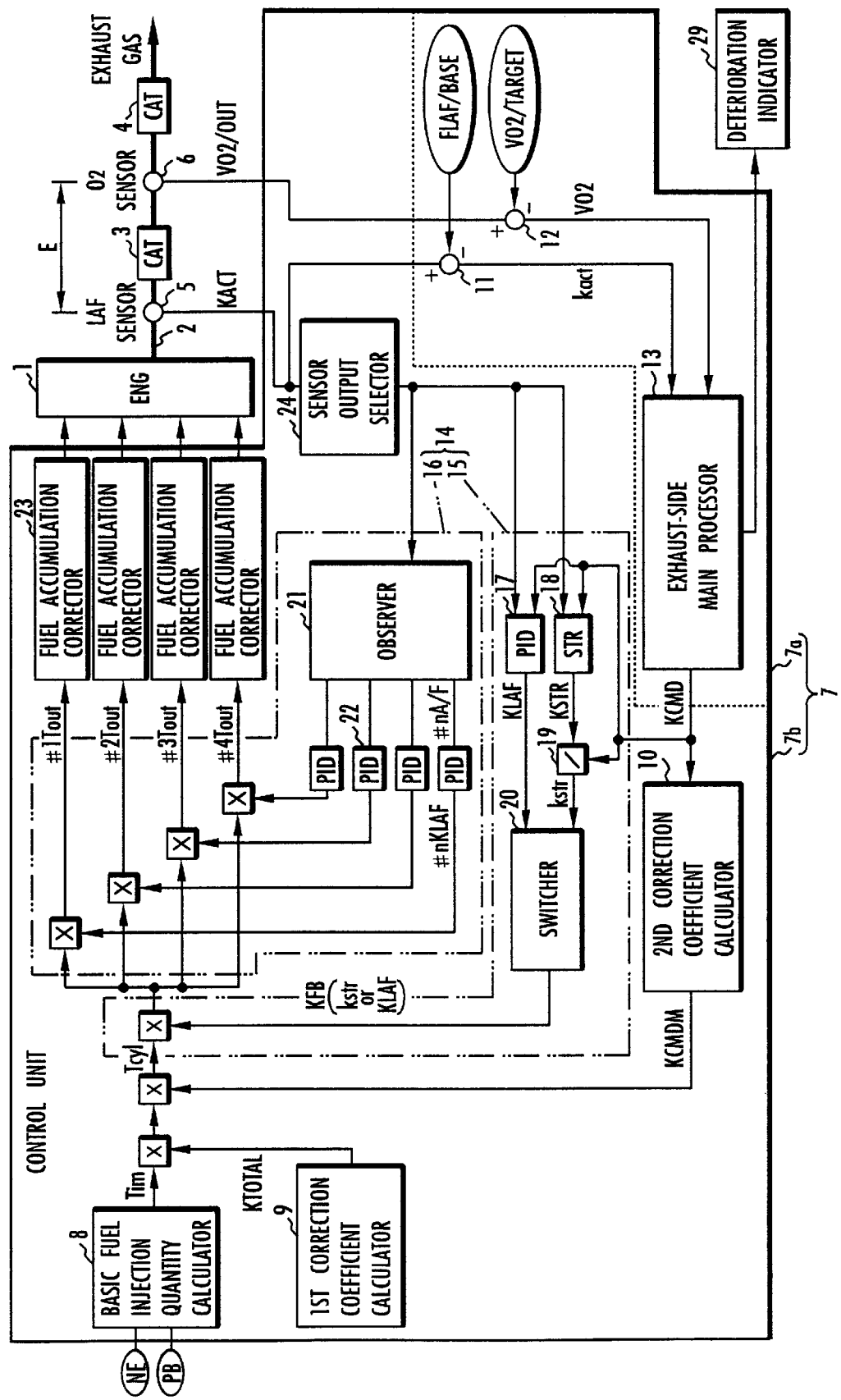
FIG. 1 is a block diagram of an overall system arrangement of an apparatus for carrying out a method of evaluating a deteriorated state of a catalytic converter for purifying an exhaust gas, according to the present invention.

FIG. 1 shows in block form the apparatus for carrying out the method according to the present invention. As shown in FIG. 1, an internal combustion engine 1 such as a four-cylinder internal combustion engine is mounted as a propulsion source on an automobile or a hybrid vehicle, for example. When a mixture of fuel and air is combusted in each cylinder of the internal combustion engine 1, an exhaust gas is generated and emitted from each cylinder into a common discharge pipe 2 positioned near the internal combustion engine 1, from which the exhaust gas is discharged into the atmosphere. Two three-way catalytic converters 3, 4 are mounted in the common exhaust pipe 2 at successively downstream locations thereon.

The upstream catalytic converter 3 is evaluated for its deteriorated state according to the present invention. The downstream catalytic converter 4 may be dispensed with.

The apparatus serves to control the air-fuel ratio of the internal combustion engine 1, i.e., the air-fuel ratio of an air-fuel mixture combusted by the internal combustion engine 1, in order to achieve an optimum purifying capability of the catalytic converter 3. While controlling the air-fuel ratio, the apparatus also evaluates the deteriorated state of the catalytic converter 3.

In order to perform the above processing, the apparatus has an air-fuel ratio sensor 5 mounted as a first exhaust gas sensor on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted as a second exhaust gas sensor on the exhaust pipe 2 downstream of the catalytic converter 3 and upstream of the catalytic converter 4, and a control unit 7 for carrying out a control process (described later on) and evaluating the deteriorated state of the catalytic converter 3 based on detected outputs from the sensors 5, 6.

The control unit 7 is supplied with detected outputs from the sensors 5, 6 and also detected outputs from various other sensors (not shown) for detecting operating conditions of the internal combustion engine 1, including an engine speed sensor, an intake pressure sensor, a coolant temperature sensor, etc.

The $O_2$ sensor 6 comprises an ordinary $O_2$ sensor for generating an output VO2/OUT having a level depending on the oxygen concentration in the exhaust gas that has passed through the catalytic converter 3, i.e., an output VO2/OUT representing a detected value of the oxygen concentration of the exhaust gas. The oxygen concentration in the exhaust gas is commensurate with the air-fuel ratio of an air-fuel mixture which, when combusted, produces the exhaust gas. The output VO2/OUT from the $O_2$ sensor 6 will change with high sensitivity in proportion to the oxygen concentration in the exhaust gas, with the air-fuel ratio corresponding to the oxygen concentration in the exhaust gas being in a range $\Delta$ close to a stoichiometric air-fuel ratio, as indicated by the solid-line curve a in FIG. 2. At oxygen concentrations corresponding to air-fuel ratios outside of the range $\Delta$, the output VO2/OUT from the $O_2$ sensor 6 is saturated and is of a substantially constant level.

The air-fuel ratio sensor 5 generates an output KACT representing a detected value of the air-fuel ratio which is recognized from the concentration of oxygen in the exhaust gas that enters the catalytic converter 3. The air-fuel ratio sensor 5 comprises a wide-range air-fuel ration sensor disclosed in detail in Japanese laid-open patent publication No. 4-369471, which corresponds to U.S. Pat. No. 5,391, 282. As indicated by the solid-line curve b in FIG. 2, the air-fuel ratio sensor 5 generates an output whose level is proportional to the concentration of oxygen in the exhaust gas in a wider range than the $O_2$ sensor 6. Stated otherwise, the air-fuel ratio sensor 5 (hereinafter referred to as "LAF sensor 5") generates an output whose level corresponds to the concentration of oxygen in the exhaust gas in a wide range of air-fuel ratios.

The control unit 7 comprises a control unit 7a (hereinafter referred to as an "exhaust-side control unit 7a") for performing a process of calculating a target air-fuel ratio KCMD for the internal combustion engine 1, or specifically a target value for the air-fuel ratio detected by the LAF sensor 5, and a process of evaluating the deteriorated state of the catalytic converter 3, and a control unit 7b (hereinafter referred to as an "engine-side control unit 7b") for carryout out a process of controlling the air-fuel ratio of the internal combustion engine 1 based on the target air-fuel ratio KCMD. As described in detail later on, the control units 7a, 7b perform their processes in respective given control cycles.

The engine-side control unit 7b will further be described below with reference to FIG. 1. The engine-side control unit 7b has, as its functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity (fuel supply quantity) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by the exhaust-side control unit 7a, as described later on.

The engine-side control unit 7b corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The engine-side control unit 7b also has, in addition to the above functions, a feedback controller 14 for feedback-controlling the air-fuel ratio of the air-fuel mixture to be combusted in the internal combustion engine 1 by adjusting a fuel injection quantity of the internal combustion engine 1 so as to converge the output KACT of the LAF sensor 5 (the detected air-fuel ratio of the internal combustion engine 1) toward the target air-fuel ratio KCMD which is calculated by the exhaust-side control unit 7a.

The feedback controller 14 comprises a general feedback controller 15 for feedback-controlling a total fuel injection quantity for all the cylinders of the internal combustion engine 1 and a local feedback controller 16 for feedback-controlling a fuel injection quantity for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output KACT from the LAF sensor 5 toward the target air-fuel ratio KCMD.

The general feedback controller 15 comprises a PID controller 17 for generating a feedback manipulated variable KLAF as the feedback correction coefficient KFB depending on the difference between the output KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feedback correction coefficient KFB in view of changes in operating conditions of the internal combustion engine 1 or characteristic changes thereof from the output KACT from the LAF sensor 5 and the target air-fuel ratio KCMD.

In the present embodiment, the feedback manipulated variable KLAF generated by the PID controller 17 is of "1" and can be used directly as the feedback correction coefficient KFB when the output KACT (the detected air-fuel ratio) from the LAF sensor 5 is equal to the target air-fuel ratio KCMD. The feedback manipulated variable KSTR generated by the adaptive controller 18 becomes the target air-fuel ratio KCMD when the output KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each. of the cylinders to the air-fuel ratio detected by the LAF sensor 5. Based on the modeled system, a real air-fuel ratio #nA/F of each of the cylinders is estimated from the output KACT from the LAF sensor 5.

Details of the observer 21 are disclosed in Japanese laid-open patent publication No. 7-83094 and U.S. Pat. No. 5,531,208, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the engine-side control unit 7b. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, and will not be described in detail below.

A sensor output selector 24 shown in FIG. 1 serves to select the output KACT from the LAF sensor 5, which is suitable for the estimation of a real air-fuel ratio #nA/F of each cylinder with the observer 21, depending on the operating conditions of the internal combustion engine 1. Details of the sensor output selector 24 are disclosed in detail in Japanese laid-open patent publication No. 7-259588 and U.S. Pat. No. 5,540,209, and will not be described in detail below.

The exhaust-side control unit 7a has a subtractor 11 for determining a difference kact (=KACT−FLAF/BASE) between the output KACT from the LAF sensor 5 and a predetermined reference value FLAF/BASE and a subtractor 12 for determining a difference VO2 (=VO2/OUT−VO2/TARGET) between the output VO2/OUT from the $O_2$ sensor 6 and a target value VO2/TARGET therefor.

Figure 2:
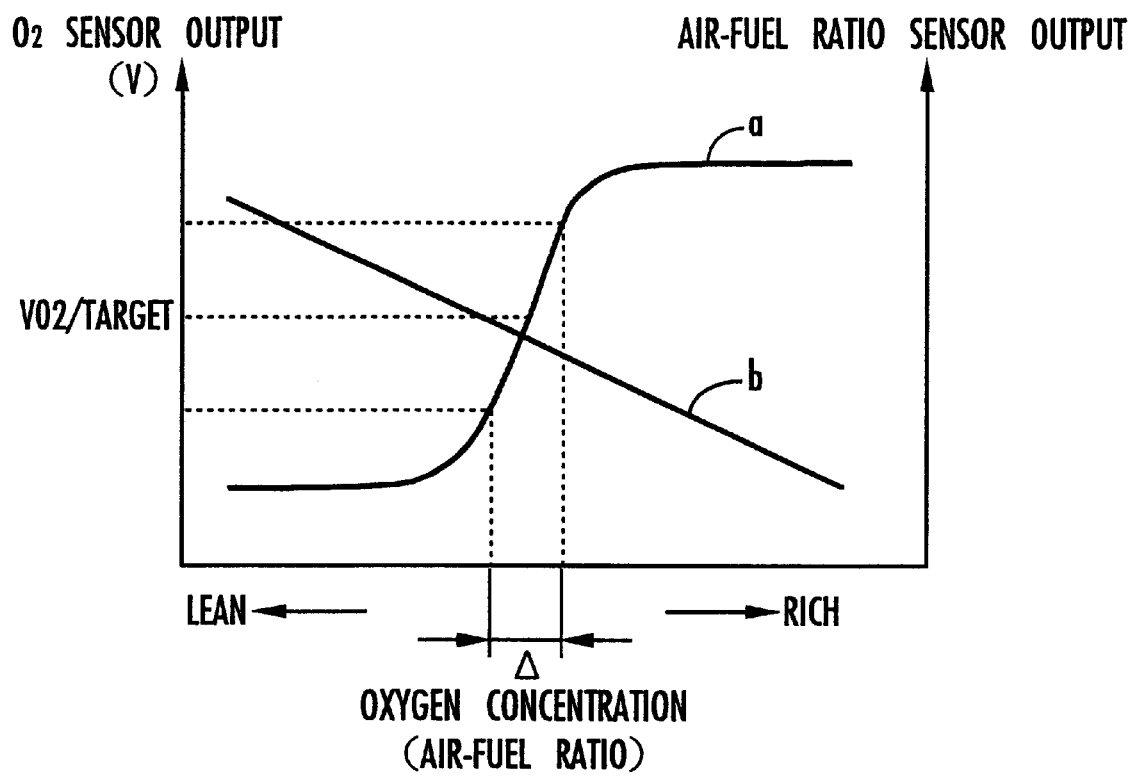
FIG. 2 is a diagram showing output characteristics of an $O_2$ sensor and an air-fuel ratio sensor used in the apparatus shown in FIG. 1.

The catalytic converter 3 achieves an optimum purifying capability irrespective of its deteriorated state at the air-fuel ratio of the internal combustion engine 1 which causes the output VO2/OUT from the $O_2$ sensor 6 to settle on a certain constant value VO2/TARGET (see FIG. 2). In the present embodiment, therefore, the constant value VO2/TARGET is used as the target value VO2/TARGET for the output VO2/OUT from the $O_2$ sensor 6. The reference value FLAF/BASE with respect to the output KACT from the LAF sensor 5 is set to a "stoichiometric air-fuel ratio".

The differences kact, VO2 determined respectively by the subtractors 11, 12 are referred to as a differential output kact of the LAF sensor 5 and a differential output VO2 of the O₂ sensor 6, respectively.

The exhaust-side control unit 7a also has an exhaust-side main processor 13 which is supplied with the data of the differential outputs kact, VO2 as the data of the output from the LAF sensor 5 and the output of the O₂ sensor 6.

The exhaust-side main processor 13 has a function (hereinafter referred to as "target air-fuel ratio calculating function) for sequentially calculating a target air-fuel ratio KCMD for the internal combustion engine 1, or more specifically a target value for the air-fuel ratio detected by the LAF sensor 5, based on the data of the differential outputs kact, VO2, and a function (hereinafter referred to as "deteriorated state evaluating function) for evaluating the deteriorated state of the catalytic converter 3.

The target air-fuel ratio calculating function serves to control an object exhaust system (denoted by E in FIG. 1) including the catalytic converter 3, which ranges from the LAF sensor 5 to the O₂ sensor 6 along the exhaust pipe 2. The target air-fuel ratio calculating function sequentially determines the target air-fuel ratio KCMD for the internal combustion engine 1 so as to converge the output VO2/OUT of the O₂ sensor 6 to the target value VO2/TARGET therefor, or so as to converge the differential output VO2 of the O₂ sensor 6 to "0", according to an adaptive sliding mode control process, in view of a dead time present in the object exhaust system E to be controlled, a dead time present in the internal combustion engine 1 and the engine-side control unit 7b, and behavioral changes of the object exhaust system E.

The deteriorated state evaluating function serves to evaluate the deteriorated state of the catalytic converter 3 using the data of identified values of parameters of a model, described later on, that are sequentially obtained in the process of calculating the target air-fuel ratio KCMD, and control the operation of a deterioration indicator 29 connected to the apparatus depending on the evaluation of the deteriorated state of the catalytic converter 3. The deterioration indicator 29 may comprise a lamp, a buzzer, or a display unit for displaying characters, a graphic image, etc. to indicate the deteriorated state of the catalytic converter 3.

In order to perform the target air-fuel ratio calculating function and the deteriorated state evaluating function, the object exhaust system E is regarded as a system for generating the output VO2/OUT of the O₂ sensor 6 (the detected value of the oxygen concentration of the exhaust gas having passed through the catalytic converter 3) from the output KACT of the LAF sensor 5 (the detected value of the air-fuel ratio) via a dead time element and a response delay element, and the behavior of the system is modeled as a discrete time system.

In addition, for the target air-fuel ratio calculating function, the system comprising the internal combustion engine 1 and the engine-side control unit 7b is regarded as a system (hereinafter referred to as "air-fuel ratio manipulating system") for generating the output KACT of the LAF sensor 5 from the target air-fuel ratio KCMD via a dead time element, and the behavior of this system is modeled as a discrete time system.

The model (hereinafter referred to as "exhaust system model") in which the behavior of the object exhaust system E is expressed as a discrete time system is expressed, using the differential output kact (=KACT−FLAF/BASE) from the LAF sensor 5 and the differential output VO2 (=VO2/OUT−VO2/TARGET) from the O₂ sensor 6, instead of the output KACT of the LAF sensor 5 and the output VO2/OUT of the O₂ sensor 6, according to the following equation (1):

$$VO2(k+1)=a1\cdot VO2(k)+a2\cdot VO2(k-1)+b1\cdot kact(k-d1) \quad (1)$$

According to the equation (1), the object exhaust system E is regarded as a system for generating the differential output VO2 from the O₂ sensor 6 from the differential output kact from the LAF sensor 5 via a dead time element and a response delay element, and the behavior of the object exhaust system E is expressed by the model of a discrete time system (more specifically, an autoregressive model having a dead time in the differential output kact as an input to the exhaust system E).

In the equation (1), "k" represents the ordinal number of a discrete-time control cycle of the exhaust-side control unit 7a, and "d1" the dead time of the object exhaust system E as represented by the number of control cycles. The dead time of the object exhaust system E (more specifically, the dead time required until the air-fuel ratio detected at each point of time by the LAF sensor 5 is reflected in the output VO2/OUT of the O₂ sensor 6) is generally equal to the time of 3–10 control cycles (d1=3–10) if the period (constant in the present embodiment) of control cycles of the exhaust-side control unit 7a ranges from 30 to 100 ms. In the present embodiment, a preset constant value (d1=7, for example) which is equal to or slightly longer than the actual dead time of the object exhaust system E is used as the dead time d1 in the discrete-system model of the object exhaust system E as represented by the equation (1).

The first and second terms of the right side of the equation (1) correspond to a response delay element of the object exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients a1, a2 are relative to the differential output VO2 of the O₂ sensor 6 as an output of the control system E.

The third term of the right side of the equation (1) represents the differential output kact of the LAF sensor 5 as an input to the object exhaust system E, including the dead time d1 of the object exhaust system E. In the third term, "b1" represents a gain coefficient relative to the input to the object exhaust system E, i.e., the differential output kact of the LAF sensor 5.

These gain coefficients "a1", "a2", "b1" are parameters which define the behavior of the exhaust system model, and are sequentially identified by an identifier which will be described later on.

The model (hereinafter referred to as "air-fuel ratio manipulating system model") of the discrete time system of the air-fuel ratio manipulating system which comprises the internal combustion engine 1 and the engine-side control unit 7b is expressed, using the differential output kact (=KACT−FLAF/BASE) from the LAF sensor 5 instead of the output KACT from the LAF sensor 5 and also using a difference kcmd (=KCMD−FLAF/BASE, which corresponds to a target value for the differential output kact of the LAF sensor 5, and will be referred to as "target differential air-fuel ratio kcmd") between the target air-fuel ratio KCMD and the reference value FLAF/BASE instead of the target air-fuel ratio KCMD, according to the following equation (2):

$$kact(k)=kcmd(k-d2) \quad (2)$$

The equation (2) expresses the air-fuel ratio manipulating system as the model of a discrete time system, regarding the air-fuel ratio manipulating system as a system for generating the differential output kact from the LAF sensor 5 from the target differential air-fuel ratio kcmd via a dead time element, i.e., a system in which the differential output kact in each control cycle is equal to the target differential air-fuel ratio kcmd prior to the dead time.

In the equation (2), "d2" represents the dead time of the air-fuel ratio manipulating system in terms of the number of control cycles of the exhaust-side control unit 7a. The dead time of the air-fuel ratio manipulating system varies (more specifically, the time required until the target air-fuel ratio KCMD at each point of time is reflected in the output signal KACT of the LAF sensor 5) varies with the rotational speed NE of the internal combustion engine 1, and is longer as the rotational speed NE of the internal combustion engine 1 is lower. In the present embodiment, in view of the above characteristics of the dead time of the air-fuel ratio manipulating system, a pre-set constant value (for example, d2=3) which is equal to or slightly longer than the actual dead time of the air-fuel ratio manipulating system at an idling rotational speed of the internal combustion engine 1, which is a rotational speed in a low speed range of the internal combustion engine 1 (the actual dead time is a maximum dead time which can be taken by the air-fuel ratio manipulating system at an arbitrary rotational speed of the internal combustion engine 1), is used as the value of the dead time d2 in the air-fuel ratio manipulating system model expressed by the equation (2).

The air-fuel ratio manipulating system actually includes a dead time element and a response delay element of the internal combustion engine 1. Since a response delay of the output KACT of the LAF sensor 5 with respect to the target air-fuel ratio KCMD is basically compensated for by the feedback controller 14 (particularly the adaptive controller 18) of the engine-side control unit 7b, there will arise no problem if a response delay element of the internal combustion engine 1 is not taken into account in the air-fuel ratio manipulating system as viewed from the exhaust-side control unit 7a.

The exhaust-side main processor 13 performs the target air-fuel ratio calculating function based on the exhaust system model and the air-fuel ratio manipulating system model expressed respectively by the equations (1), (2) and the deterioration evaluating function based on the exhaust system model expressed by the equation (1) in constant control cycles of the exhaust-side control unit 7a. In order to performs the above functions, the exhaust-side main processor 13 has its functions as shown in FIG. 3.

Figure 3:
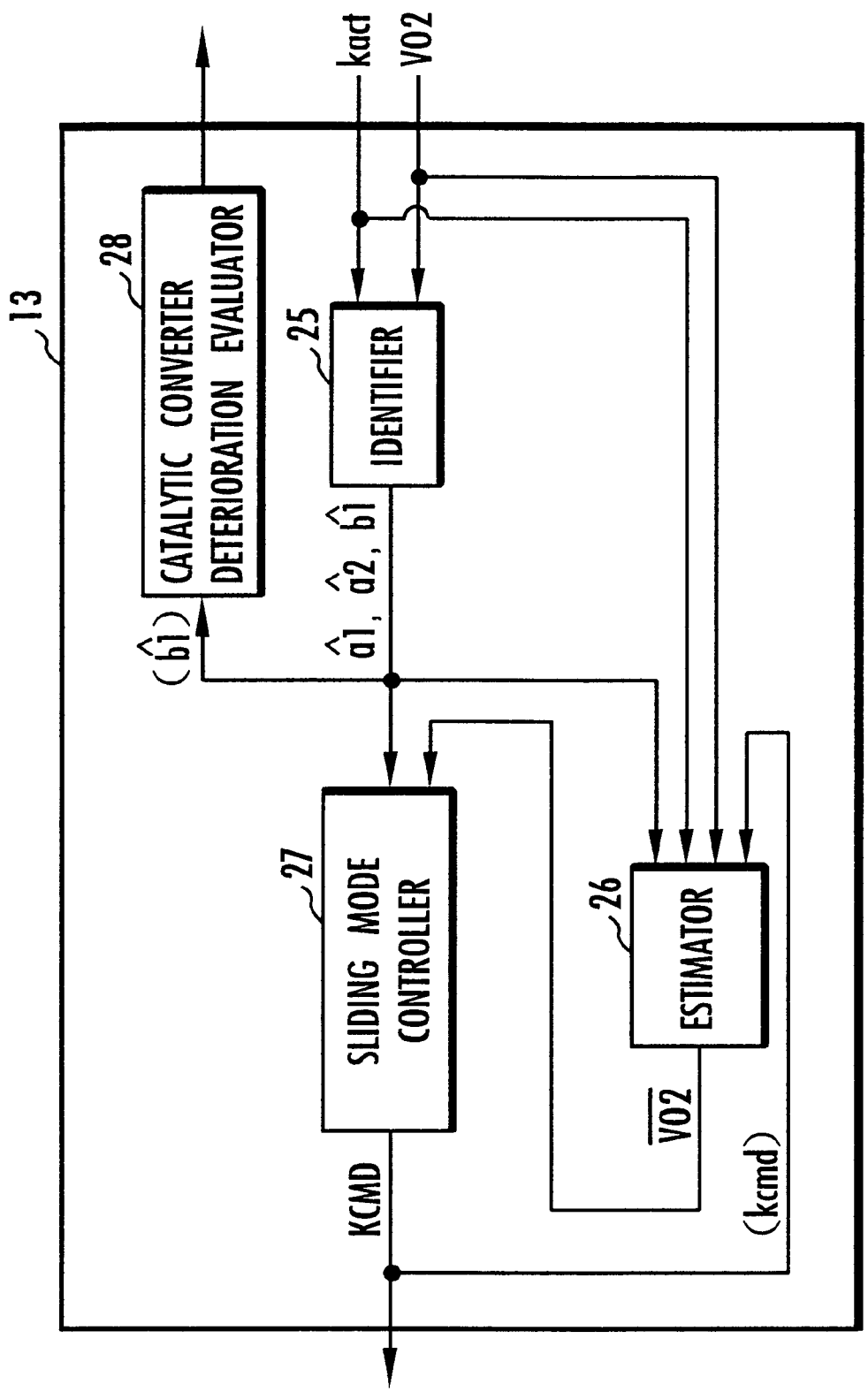
FIG. 3 is a block diagram showing a basic arrangement of an exhaust-side main processor of the apparatus shown in FIG. 1.

As shown in FIG. 3, the exhaust-side main processor 13 has an identifier 25 for sequentially identifying in each control cycle the gain coefficients a1, a2, b1 that are parameters to be established for the exhaust system model (the equation (1)).

The exhaust-side main processor 13 also has an estimator 26 for sequentially determining in each control cycle an estimated value VO2 bar of the differential output VO2 from the O$_2$ sensor 6 (hereinafter referred to as "estimated differential output VO2 bar") after the total dead time d (=d1+d2) which is the sum of the dead time d1 of the object exhaust system E and the dead time d2 of the air-fuel ratio manipulating system, from the data of the differential output kact of the LAF sensor 5, the differential output VO2 of the O$_2$ sensor 6, and the target air-fuel ratio KCMD (more accurately, the target differential air-fuel ratio kcmd) determined in the past by a sliding mode controller 27, using identified values a1 hat, a2 hat, b1 hat of the gain coefficients a1, a2, b1 (hereinafter referred to as "identified gain coefficients a1 hat, a2 hat, b1 hat") calculated by the identifier 25.

The exhaust-side main processor 13 also has a sliding mode controller 27 for sequentially determining in each control cycle a target air-fuel ratio KCMD according to an adaptive slide mode control process from the data of the estimated differential output VO2 bar of the O$_2$ sensor 6 determined by the estimator 26, using the identified gain coefficients a1 hat, a2 hat, b1 hat.

The exhaust-side main processor 13 also has a catalytic converter deterioration evaluator 28 for evaluating the deteriorated state of the catalytic converter 3 using the data of the identified gain coefficient b1 hat, for example, among the identified gain coefficients a1 hat, a2 hat, b1 hat.

The algorithm of a processing operation to be carried out by the identifier 25, the estimator 26, and the sliding mode controller 27 is constructed as follows:

The identifier 25 serves to identify the gain coefficients a1, a2, b1 sequentially on a real-time basis for the purpose of minimizing a modeling error of the exhaust system model expressed by the equation (1) with respect to the actual object exhaust system E. The identifier 25 carries out its identifying process as follows:

In each control cycle, the identifier 25 determines an identified value VO2(k) hat of the differential output VO2 (the output of the exhaust system model) from the O$_2$ sensor 6 (hereinafter referred to as "identified differential output VO2(k) hat") on the exhaust system model, using the data of the present values of the identified gain coefficients a1 hat, a2 hat, b1 hat of the exhaust system model, i.e., the values of identified gain coefficients a1(k−1) hat, a2(k−1) hat, b1(k−1) hat determined in a preceding control cycle, and the data of the past values of the differential output kact from the LAF sensor 5 and the differential output VO2 from the O$_2$ sensor 6, according to the following equation (3):

$$V\hat{O}2(k) = \hat{a}1(k-1) \cdot VO2(k-1) + \hat{a}2(k-1) \cdot VO2(k-2) + \hat{b}1(k-1) \cdot kact(k-d1-1) \quad (3)$$

The equation (3) corresponds to the equation (1) which is shifted into the past by one control cycle with the gain coefficients a1, a2, b1 being replaced with the respective identified gain coefficients a1(k−1) hat, a2(k−1) hat, b1(k−1) hat. The constant value (d1=7) established as described above is used as the value of the dead time d1 of the object exhaust system E in the third term of the equation (3).

If vectors $\Theta$, $\xi$ defined by the following equations (4), (5) are introduced (the letter T in the equations (4), (5) represents a transposition), then the equation (3) is expressed by the equation (6):

$$\Theta^T(k) = [\hat{a}1(k)\hat{a}2(k)\hat{b}1(k)] \quad (4)$$

$$\xi^T(k) = [VO2(k-1)VO2(k-2)kact(k-d1-1)] \quad (5)$$

$$V\hat{O}2(k) = \Theta^T(k-1) \cdot \xi(k) \quad (6)$$

The identifier 25 also determines a difference id/e(k) between the identified differential output VO2(k) hat from the O$_2$ sensor 6 which is determined by the equation (3) or (6) and the present differential output VO2(k) from the O$_2$ sensor 6, as representing a modeling error of the exhaust system model with respect to the actual object exhaust system E (hereinafter the difference id/e will be referred to as "identified error id/e"), according to the following equation (7):

$$id/e(k) = VO2(k) - V\hat{O}2(k) \quad (7)$$

The identifier 25 further determines new identified gain coefficients a1(k) hat, a2(k) hat, b1(k) hat, stated otherwise, a new vector Θ(k) having these identified gain coefficients as elements (hereinafter the new vector Θ(k) will be referred to as "identified gain coefficient vector Θ"), in order to minimize the identified error id/e, according to the equation (8) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k)=\Theta(k-1)+K\theta(k) \cdot id/e(k) \quad (8)$$

where Kθ represents a cubic vector determined by the following equation (9), i.e., a gain coefficient vector for determining a change depending on the identified error id/e of the identified gain coefficients a1 hat, a2 hat, b1 hat):

$$K\theta(k) = \frac{P(k-1) \cdot \xi(k)}{1 + \xi^T(k) \cdot P(k-1) \cdot \xi(k)} \quad (9)$$

where P represents a cubic square matrix determined by a recursive formula expressed by the following equation (10):

$$P(k) = \frac{1}{\lambda_1(k)} \cdot \left[ I - \frac{\lambda_2(k) \cdot P(k-1) \cdot \xi(k) \cdot \xi^T(k)}{\lambda_1(k) + \lambda_2(k) \cdot \xi^T(k) \cdot P(k-1) \cdot \xi(k)} \right] \cdot P(k-1) \quad (10)$$

where I represents a unit matrix.

In the equation (10), $\lambda_1$, $\lambda_2$ are established to satisfy the conditions $0 < \lambda_1 \leq 1$ and $0 \leq \lambda_2 < 2$, and an initial value P(0) of P represents a diagonal matrix whose diagonal components are positive numbers.

Depending on how $\lambda_1$, $\lambda_2$ in the equation (10) are established, any one of various specific algorithms including a fixed gain method, a degressive gain method, a method of weighted least squares, a method of least squares, a fixed tracing method, etc. may be employed. According to the present embodiment, a method of least squares ($\lambda_1=\lambda_2=1$), for example, is employed.

Basically, the identifier 25 sequentially determines in each control cycle the identified gain coefficients a1 hat, a2 hat, b1 hat in order to minimize the identified error id/e according to the above algorithm (calculating operation). Through this operation, it is possible to sequentially obtain the identified gain coefficients a1 hat, a2 hat, b1 hat which match the actual object exhaust system E.

The algorithm described above is the basic algorithm that is carried out by the identifier 25. The identifier 25 performs additional processes such as a limiting process, on the identified gain coefficients a1 hat, a2 hat, b1 hat in order to determine them. Such operations of the identifier 25 will be described later on.

The estimator 26 sequentially determines in each control cycle the estimated differential output VO2 bar which is an estimated value of the differential output VO2 from the O₂ sensor 6 after the total dead time d (=d1+d2) in order to compensate for the effect of the dead time d1 of the object exhaust system E and the effect of the dead time d2 of the air-fuel ratio manipulating system for the calculation of the target air-fuel ratio KCMD with the sliding mode controller 27 as described in detail later on. The algorithm for the estimator 26 to determine the estimated differential output VO2 bar is constructed as described below. Since the estimator 26 has no direct bearing on the present invention and its details are disclosed in Japanese laid-open patent publication No. 11-324767 and U.S. patent application Ser. No. 09/311353, the estimator 26 will briefly be described below.

If the equation (2) expressing the model of the air-fuel ratio manipulating system is applied to the equation (1) expressing the model of the object exhaust system E, then the equation (1) can be rewritten as the following equation (11):

$$VO2(k+1) = a1 \cdot VO2(k) + a2 \cdot VO2(k-1) + b1 \cdot kcmd(k-d1-d2) \quad (11)$$

$$= a1 \cdot VO2(k) + a2 \cdot VO2(k-1) + b1 \cdot kcmd(k-d)$$

The equation (11) expresses a system which is a combination of the object exhaust system E and the air-fuel manipulating system as the model of a discrete time system, regarding such a system as a system for generating the differential output VO2 from the O₂ sensor 6 from the target differential air-fuel ratio kcmd via dead time elements of the object exhaust system E and the air-fuel manipulating system and a response delay element of the object exhaust system E.

By using the equation (11), the estimated differential output VO2(k+d) bar which is an estimated value of the differential output VO2(k+d) of the O₂ sensor 6 after the total dead time d in each control cycle can be expressed using time-series data VO2(k), VO2(k−1) of the present and past values of the differential output VO2 of the O₂ sensor 6 and time-series data kcmd(k−j) (j=1, 2, . . . , d) of the past values of the target differential air-fuel ratio kcmd (=KCMD−FLAF/BASE) which corresponds to the target air-fuel ratio KCMD determined by the sliding mode controller 27 (its specific process of determining the target air-fuel ratio KCMD will be described later on), according to the following equation (12):

$$\overline{VO2}(k+d) = \alpha1 \cdot VO2(k) + \alpha2 \cdot VO2(k-1) + \sum_{j=1}^{d} \beta j \cdot kcmd(k-j) \quad (12)$$

where
α1=the first-row, first-column element of $A^d$,
α2=the first-row, second-column element of $A^d$,
βj=the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

In the equation (12), "α1", "α2" represent the first-row, first-column element and the first-row, second-column element, respectively, of the dth power $A^d$ (d: total dead time) of the matrix A defined as described above with respect to the equation (12), and "βj" (j=1, 2, . . . , d) represents the first-row elements of the product $A^{j-1} \cdot B$ of the (j−1)th power $A^{j-1}$ (j=1, 2, . . . , d) of the matrix A and the vector B defined as described above with respect to the equation (12).

Of the time-series data of the past values of the target combined differential air-fuel ratio kcmd according to the equation (12), the time-series data kcmd(k−d2), kcmd(k−d2−1), . . . , kcmd(k−d) from the present prior to the dead time d2 of the air-fuel manipulating system can be replaced respectively with data kact(k), kact(k−1), . . . , kact(k−d+d2)

obtained prior to the present time of the differential output kact of the LAF sensor 5 according to the equation (2). When the time-series data are thus replaced, the following equation (13) is obtained:

$$\overline{VO2}(k+d) = \alpha 1 \cdot VO2(k) + \alpha 2 \cdot VO2(k-1) + \qquad (13)$$
$$\sum_{j=1}^{d2-1} \beta j \cdot kcmd(k-j) + \sum_{i=0}^{d-d2} \beta i + d2 \cdot kact(k-i)$$
$$= \alpha 1 \cdot VO2(k) + \alpha 2 \cdot VO2(k-1) +$$
$$\sum_{j=1}^{d2-1} \beta j \cdot kcmd(k-j) + \sum_{i=0}^{d1} \beta i + d2 \cdot kact(k-i)$$

The equation (13) is a basic formula for the estimator 26 to determine the estimated differential output VO2(k+d) bar. Stated otherwise, the estimator 26 determines, in each control cycle of the exhaust-side control unit 7a, the estimated differential output VO2(k+d) bar of the $O_2$ sensor 6 according to the equation (13), using the time-series data VO2(k), VO2(k−1) of the present and past values of the differential output VO2 of the $O_2$ sensor 6, the time-series data kcmd(k−j) (j=1, . . . , d2−1) of the past values of the target differential air-fuel ratio kcmd which represents the target air-fuel ratio KCMD determined in the past by the sliding mode controller 27, and the time-series data kact(k−i) (i=0, . . . , d1) of the present and past values of the differential output kact of the LAF sensor 5.

In the present embodiment, the values of the coefficients α1, α2, βj (j=1, 2, . . . , d) required to calculate the estimated differential output VO2(k+d) bar according to the equation (13) are basically calculated using the identified gain coefficients a1 hat, a2 hat, b1 hat which are the identified values of the gain coefficients a1, a2, b1 (which are elements of the vectors A, B defined with respect to the equation (12)). The values of the dead times d1, d2 required in the equation (13) comprise the preset values as described above.

The estimated differential output VO2(k+d) bar may be determined according to the equation (12) without using the data of the differential output kact of the LAF sensor 5. For increasing the reliability of the estimated differential output VO2(k+d) bar, however, it is preferable to determine the estimated differential output VO2(k+d) bar according to the equation (13) using the data of the differential output kact of the LAF sensor 5 which reflects the actual behavior of the internal combustion engine 1. If the dead time d2 of the air-fuel ratio manipulating system can be set to "1", all the time-series data kcmd(k−j) (j=1, 2, . . . , d) of the past values of the target differential air-fuel ratio kcmd in the equation (12) may be replaced with the time-series data kact(k), kact(k−1), . . . , kact(k−d+d1), respectively, of the present and past values of the differential output kact of the LAF sensor 5. In this case, the estimated differential output VO2(k+d) bar can be determined according to the following equation (14) which does not include the data of the target differential air-fuel ratio kcmd:

$$\overline{VO2}(k+d) = a1 \cdot VO2(k) + a2 \cdot VO2(k-1) + \sum_{j=0}^{d-1} \beta j + 1 \cdot kact(k-j) \qquad (14)$$

The sliding mode controller 27 will be described in detail below. Since the details of the sliding mode controller 27 are disclosed in Japanese laid-open patent publication No. 11-324767 and U.S. patent application Ser. No. 09/311353, the sliding mode controller 27 will briefly be described below.

The sliding mode controller 27 determines an input quantity to be given to the object exhaust system E (which is specifically a target value for the difference between the output KACT of the LAF sensor 5 (the detected value of the air-fuel ratio) and the reference value FLAF/BASE, which target value is equal to the target differential air-fuel ratio kcmd) (the input quantity will be referred to as "SLD manipulating input Usl") in order to cause the output VO2/OUT of the $O_2$ sensor 6 to settle on the target value VO2/TARGET, i.e., to converge the differential output VO2 of the $O_2$ sensor 6 to "0" according to an adaptive sliding mode control process which incorporates an adaptive control law for minimizing the effect of a disturbance, in a normal sliding mode control process, and determines the target air-fuel ratio KCMD from the determined SLD manipulating input Usl. An algorithm for carrying out the adaptive sliding mode control process is constructed as follows:

A switching function required for the algorithm of the adaptive sliding mode control process carried out by the sliding mode controller 27 and a hyperplane defined by the switching function (also referred to as a slip plane) will first be described below.

According to a basic concept of the sliding mode control process, the differential output VO2(k) of the $O_2$ sensor 6 obtained in each control cycle and the differential output VO2(k−1) obtained in a preceding control cycle are used as a state quantity to be controlled, and a switching function σ for the sliding mode control process is defined as a linear function according to the following equation (15):

$$\sigma(k) = s1 \cdot VO2(k) + s2 \cdot VO2(k-1) \qquad (15)$$
$$= S \cdot X$$

where
S=[s1 s2], $$X = \begin{bmatrix} VO2(k) \\ VO2(k-1) \end{bmatrix}$$

A vector X defined above with respect to the equation (15) as a vector whose elements are represented by the differential outputs VO2(k), VO2(k−1) will hereinafter be referred to as a state quantity X.

The coefficients s1, s2 of the switching function τ is set in order to meet the condition of the following equation (16):

$$-1 < \frac{s2}{s1} < 1 \qquad (16)$$

(when s1=1, −1<s2<1)

In the present embodiment, for the sake of brevity, the coefficient s1 is set to s1=1 (s2/s1=s2), and the coefficient s2 is established to satisfy the condition:

−1<s2<1.

Figure 4:
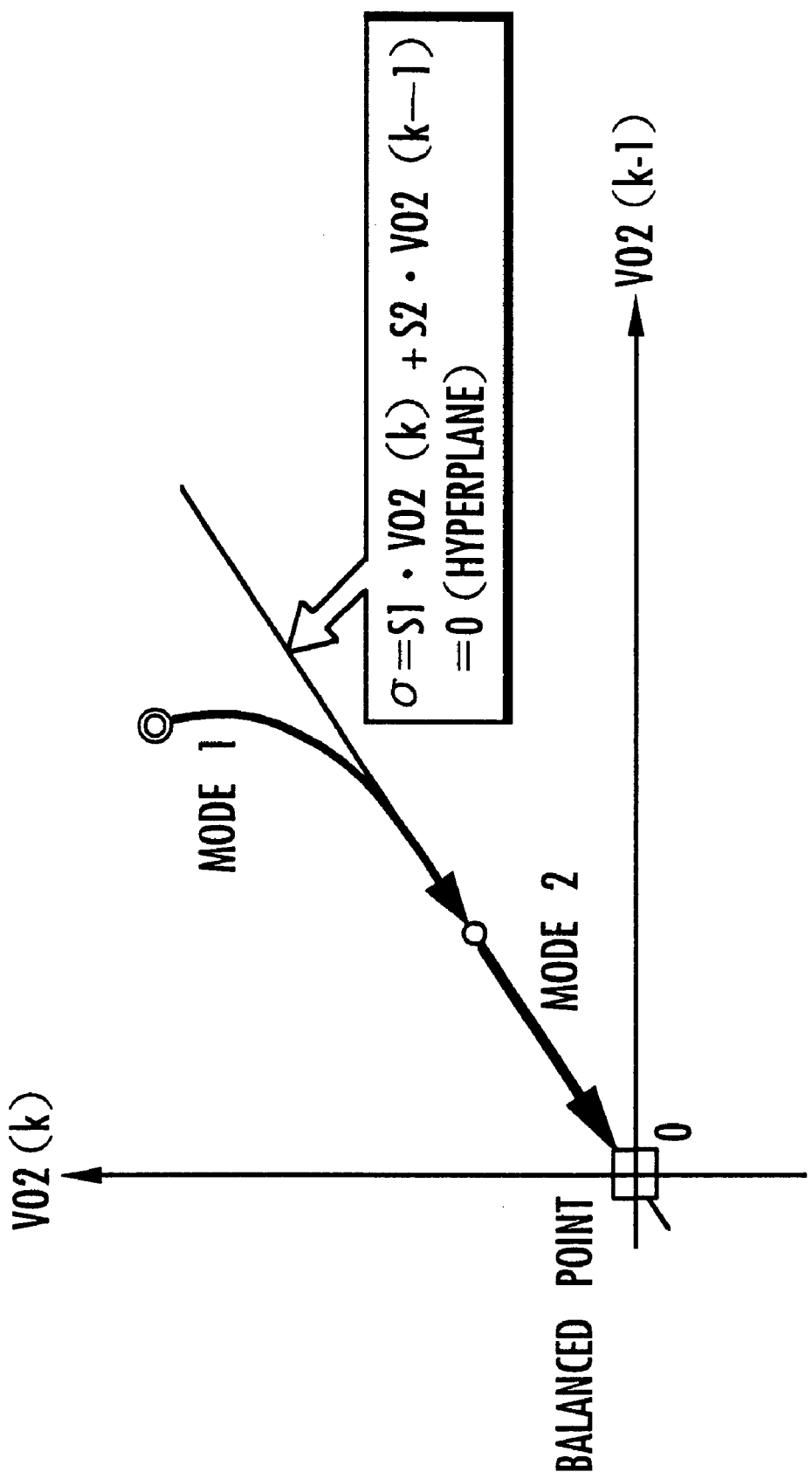
FIG. 4 is a diagram illustrative of a sliding mode control process employed by the apparatus shown in FIG. 1.

With the switching function a thus defined, the hyperplane for the sliding mode control process is defined by the equation σ=0. Since the state quantity X is of the second degree, the hyperplane σ=0 is represented by a straight line as shown in FIG. 4. At this time, the hyperplane is called a switching line or a switching plane depending on the degree of a topological space.

In the present embodiment, the time-series data of the estimated differential output VO2 bar determined by the estimator 26 is actually used as the variable components of the switching function for the sliding mode control process, as described later on.

The adaptive sliding mode control process serves to converge the state quantity X onto the hyperplane σ=0 according to a reaching control law which is a control law for converging the state quantity X (=VO2(k), VO2(k−1)) onto the hyperplane σ=0, and an adaptive control law which is a control law for compensating for the effect of a disturbance in converging the state quantity X onto the hyperplane σ=0 (mode 1 in FIG. 4). While holding the state quantity X onto the hyperplane σ=0 according to an equivalent control input, the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the $O_2$ sensor 6 are equal to the target value VO2/TARGET (mode 2 in FIG. 4).

The SLD manipulating input Usl (=the target differential air-fuel ratio kcmd) to be generated by the sliding mode controller 27 for converging the state quantity X toward the balanced point on the hyperplane σ=0 is expressed as the sum of an equivalent control input Ueq to be applied to the object exhaust system E according to the control law for converging the state quantity X onto the hyperplane σ=0, an input Urch (hereinafter referred to as "reaching control law input Urch") to be applied to the object exhaust system E according to the reaching control law, and an input Uadp (hereinafter referred to as "adaptive control law Uadp") to be applied to the object exhaust system E according to the adaptive control law (see the following equation (17)).

$$Usl=Ueq+Urch+Uadp \quad (17)$$

The equivalent control input Ueq, the reaching control law input Urch, and the adaptive control law input Uadp are determined on the basis of the model of the discrete time system expressed by the equation (11), i.e., the model in which the differential output kact(k−d1) of the LAF sensor 5 in the equation (1) is replaced with the target differential air-fuel ratio kcmd(k−d) using the total dead time d, as follows:

The equivalent control input Ueq which is an input component to be applied to the object exhaust system E for converging the state quantity X onto the hyperplane σ=0 is the target differential air-fuel ratio kcmd which satisfies the condition: σ(k+1)=σ(k)=0. Using the equations (11), (15), the equivalent control input Ueq which satisfies the above condition is given by the following equation (18):

$$Ueq(k) = -(S \cdot B)^{-1} \cdot \{S \cdot (A-1)\} \cdot X(k+d) \quad (18)$$

$$= \frac{-1}{s1b1} \cdot \{[s1 \cdot (a1-1) + s2] \cdot VO2(k+d) + (s1 \cdot a2 - s2) \cdot VO2(k+d-1)\}$$

The equation (18) is a basic formula for determining the equivalent control law input Ueq(k) in each control cycle.

According to the present embodiment, the reaching control law input Urch is basically determined according to the following equation (19):

$$Urch(k) = -(S \cdot B)^{-1} \cdot F \cdot \sigma(k+d) \quad (19)$$

$$= \frac{-1}{s1b1} \cdot F \cdot \sigma(k+d)$$

Specifically, the reaching control law input Urch is determined in proportion to the value σ(k+d) of the switching function σ after the total dead time d, in view of the effect of the total dead time d.

The coefficient F in the equation (19) Which determines the gain of the reaching control law is established to satisfy the condition expressed by the following equation (20):

$$0 < F < 2 \quad (20)$$

The value of the switching function σ may possibly vary in an oscillating fashion (so-called chattering) with respect to the hyperplane σ=0. In order to suppress such chattering, it is preferable that the coefficient F relative to the reaching control law input Urch be established to further satisfy the condition of the following equation (21):

$$0 < F < 1 \quad (21)$$

The adaptive control law input Uadp is basically determined according to the following equation (22) (ΔT in the equation (22) represents the period of the control cycles of the exhaust-side control unit 7a):

$$Uadp(k) = -(S \cdot B)^{-1} \cdot G \cdot \sum_{i=0}^{k+d} (\sigma(i) \cdot \Delta T) \quad (22)$$

$$= \frac{-1}{s1b1} \cdot G \cdot \sum_{i=0}^{k+d} (\sigma(i) \cdot \Delta T)$$

The adaptive control law input Uadp is determined in proportion to an integrated value (which corresponds to an integral of the values of the switching function σ) over control cycles of the product of values of the switching function σ and the period ΔT of the exhaust-side control unit 7a until after the total dead time d, in view of the effect of the total dead time d.

The coefficient G (which determines the gain of the adaptive control law) in the equation (22) is established to satisfy the condition of the following equation (23):

$$G = J \cdot \frac{2 - F}{\Delta T} \quad (23)$$

$$(0 < J < 2)$$

A specific process of deriving conditions for establishing the equations (16), (20), (21), (23) is described in detail in Japanese patent application No. 11-93741 and U.S. Pat. No. 6,082,099, and will not be described in detail below.

In the present embodiment, the sliding mode controller 27 determines the sum (Ueq+Urch+Uadp) of the equivalent control input Ueq, the reaching control law input Urch, and the adaptive control law Uadp determined according to the respective equations (18), (19), (22) as the SLD manipulating input Usl to be applied to the object exhaust system E. However, the differential outputs VO2(K+d), VO2(k+d−1) of the $O_2$ sensor 6 and the value σ(k+d) of the switching function σ, etc. used in the equations (18), (19), (22) cannot directly be obtained as they are values in the future.

According to the present embodiment, therefore, the sliding mode controller 27 actually uses the estimated differential outputs VO2(k+d) bar, VO2(k+d−1) bar determined by the estimator 26, instead of the differential outputs VO2(K+d), VO2(k+d−1) from the $O_2$ sensor 6 for determining the equivalent control input Ueq according to the equation (18), and calculates the equivalent control input Ueq in each control cycle according to the following equation (24):

$$Ueq(k) = \frac{-1}{s1 \cdot b1}\{[s1 \cdot (a1-1) + s2] \cdot \overline{VO2}(k+d) + (s1 \cdot a2 - s2) \cdot \overline{VO2}(k+d-1)\} \quad (24)$$

According to the present embodiment, furthermore, the sliding mode controller 27 actually uses time-series data of the estimated differential output VO2 bar sequentially determined by the estimator 26 as described above as a state quantity to be controlled, and defines a switching function σ bar according to the following equation (25) (the switching function σ bar corresponds to time-series data of the differential output VO2 in the equation (15) which is replaced with time-series data of the estimated differential output VO2 bar), in place of the switching function σ established according to the equation (25):

$$\overline{\sigma(k)} = s1 \cdot \overline{VO2}(k) + s2 \cdot \overline{VO2}(k-1) \quad (25)$$

The sliding mode controller 27 calculates the reaching control law input Urch in each control cycle according to the following equation (26), using the switching function Γ bar represented by the equation (25), rather than the value of the switching function Γ for determining the reaching control law input Urch according to the equation (19):

$$Urch(k) = \frac{-1}{s1 \cdot b1} \cdot F \cdot \overline{\sigma}(k+d) \quad (26)$$

Similarly, the sliding mode controller 27 calculates the adaptive control law input Uadp in each control cycle according to the following equation (27), using the value of the switching function a bar represented by the equation (25), rather than the value of the switching function σ for determining the adaptive control law input Uadp according to the equation (22):

$$Uadp(k) = \frac{-1}{s1 \cdot b1} \cdot G \cdot \sum_{i=0}^{k+d} (\overline{\sigma}(i) \cdot \Delta T) \quad (27)$$

The latest identified gain coefficients a1(k) hat, a2(k) hat, b1(k) hat which have been determined by the identifier 25 are basically used as the gain coefficients a1, a2, b1 that are required to calculate the equivalent control input Ueq, the reaching control law input Urch, and the adaptive control law input Uadp according to the equations (24), (26), (27).

The sliding mode controller 27 determines the sum of the equivalent control input Ueq, the reaching control law input Urch, and the adaptive control law input Uadp determined according to the equations (24), (26), (27), as the SLD manipulating input Usl to be applied to the object exhaust system E (see the equation (17)). The conditions for establishing the coefficients s1, s2, F, G used in the equations (24), (26), (27) are as described above.

The above process is a basic algorithm for determining the SLD manipulating input Usl (=target differential air-fuel ratio kcmd) to be applied to the object exhaust system E with the sliding mode controller 27. According to the above algorithm, the SLD manipulating input Usl is determined to converge the estimated differential output VO2 bar from the O₂ sensor 6 toward "0", and as a result, to convert the output VO2/OUT from the O₂ sensor 6 toward the target value VO2/TARGET.

The sliding mode controller 27 eventually sequentially determines the target air-fuel ratio KCMD in each control cycle. The SLD manipulating input Usl determined as described above signifies a target value for the difference between the air-fuel ratio of the exhaust gas detected by the LAF sensor 5 and the reference value FLAF/BASE, i.e., the target differential air-fuel ratio kcmd. Consequently, the sliding mode controller 27 eventually determines the target air-fuel ratio KCMD by adding the reference value FLAF/BASE to the determined SLD manipulating input Usl in each control cycle according to the following equation (28):

$$KCMD(k) = Usl(k) + FLAF/BASE \quad (28)$$
$$= Ueq(k) + Urch(k) + Uadp(k) + FLAF/BASE$$

The above process is a basic algorithm for determining the target air-fuel ratio KCMD with the sliding mode controller 27 according to the present embodiment.

In the present embodiment, the stability of the adaptive sliding mode control process carried out by the sliding mode controller 27 is checked for limiting the value of the SLD manipulating input Usl. Details of such a checking process will be described later on.

The catalytic converter deterioration evaluator 28 will be described below.

Various studies conducted by the inventors of the present invention have revealed that the time-series data of the identified gain coefficients a1 hat, a2 hat, b1 hat sequentially calculated by the identifier 25 during operation of the internal combustion engine 1 exhibit a characteristic tendency depending on the deteriorated state of the catalytic converter 3.

Figure 5:
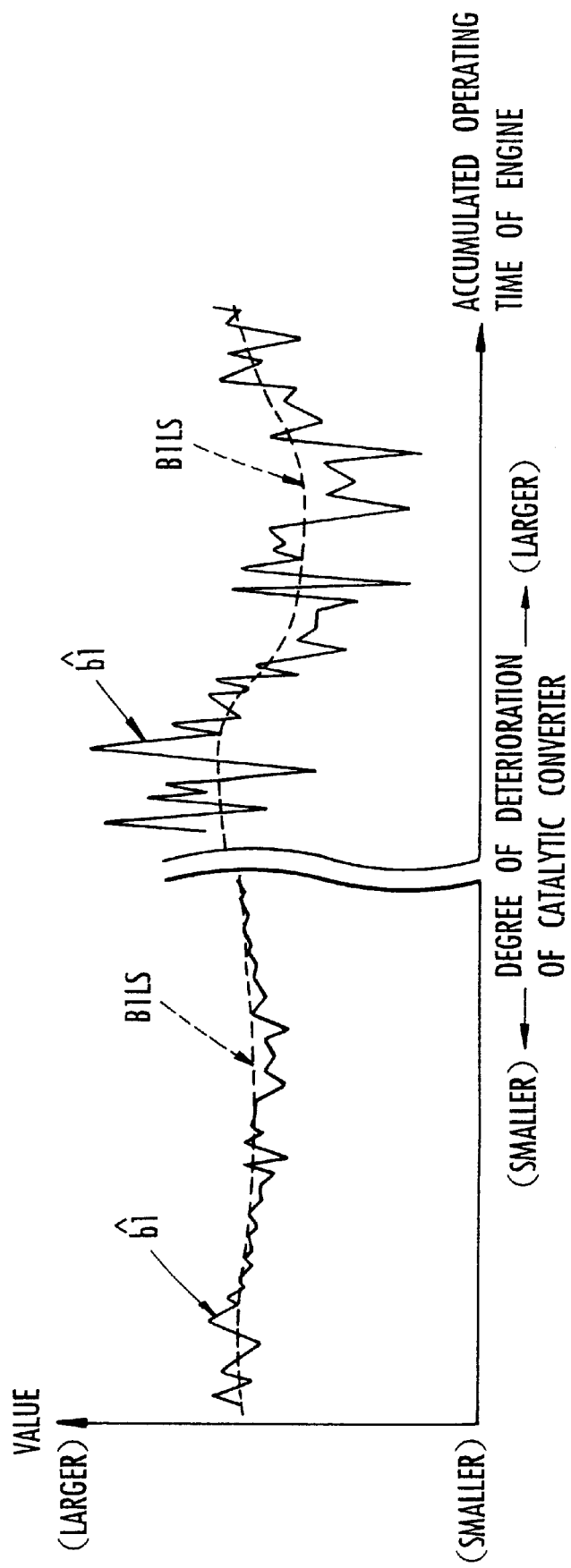
FIG. 5 is a diagram illustrative of a process of evaluating the deteriorated state of a catalytic converter employed by the apparatus shown in FIG. 1.

For example, the value of the identified gain coefficient b1 hat that is sequentially calculated by the identifier 25 varies a small extent when the deterioration of the catalytic converter 3 is relatively small, i.e., when the catalytic converter 3 is nearly brand-new, as shown in a left half portion of FIG. 5. When the deterioration of the catalytic converter 3 is relatively large, the variation of the calculated value of the identified gain coefficient b1 hat becomes larger. Thus, as the deterioration of the catalytic converter 3 progresses, the variation of the calculated value of the identified gain coefficient b1 hat becomes larger, resulting in a wider distribution range. This is considered to arise from the fact that as the deterioration of the catalytic converter 3 progresses, the matching between the equation (1) of the exhaust system model and the actual behavioral characteristics of the object exhaust system E including the catalytic converter 3.

Such a tendency is also exhibited by the other identified gain coefficients a1 hat, a2 hat. However, the tendency occurs greatly particularly for the identified gain coefficient b1 hat because the deteriorated state of the catalytic converter 3 has a greater effect on the dead time element of the object exhaust system E than on the response delay element thereof.

For the above reasons, the catalytic converter deterioration evaluator 28 uses the value of the identified gain coefficient b1 hat determined by the identifier 25 in order to evaluate the deteriorated state of the catalytic converter 3.

An algorithm for evaluating the deteriorated state of the catalytic converter 3 is constructed as follows:

The catalytic converter deterioration evaluator 28 sequentially updates and determines a central value B1LS of the value of the identified gain coefficient b1 hat (hereinafter referred to as "identified central value B1LS"), i.e., a central value of the distribution range of calculated values of the identified gain coefficient b1 hat, in each control cycle of the exhaust-side control unit 7a, according to a low-pass filtering process based on a sequential statistical algorithm represented by the following equation (29):

$$B1LS(k) = B1LS(k-1) + \frac{BP(k-1)}{1+BP(k-1)} \cdot (\hat{b}1(k) - B1LS(k-1)) \quad (29)$$

where BP represents a parameter sequentially updated in each control cycle according to the equation (30):

$$BP(k) = \frac{1}{\eta 1} \cdot \left(1 - \frac{\eta 2 \cdot BP(k-1)}{\eta 1 + \eta 2 \cdot BP(k-1)}\right) \cdot BP(k-1) \quad (30)$$

In the equation (30), η1, η2 are set to values that satisfy the conditions: 0<η1≦1 and 0≦η2<2. Depending on how the values of η1, η2 are set, various specific algorithms including a fixed gain method, a method of least squares, a degression gain method, a method of weighted least squares, etc. are constructed. According to the present embodiment, η1=1, and η2 is set to a given value smaller than "1" (e.g., 0.9999), and the algorithm of the method of weighted least squares is employed.

According to the above algorithm, a low-pass filtering process is effected on the time-series data of the identified gain coefficient b1 hat to sequentially determine the identified central value BLLS as indicated by the broken line in FIG. 5.

Concurrent with the determination of the identified central value B1LS, the catalytic converter deterioration tion evaluator 28 determines the square BLMT of the difference between the identified gain coefficient b1 hat and the identified central value B1LS as a basic value representing the degree of variation of the identified gain coefficient b1 hat (hereinafter referred to as "variation basic parameter B1MT") according to the following equation (31):

$$B1MT(k) = (\hat{b}1(k) - B1LS(k)^2) \quad (31)$$

Figure 6:
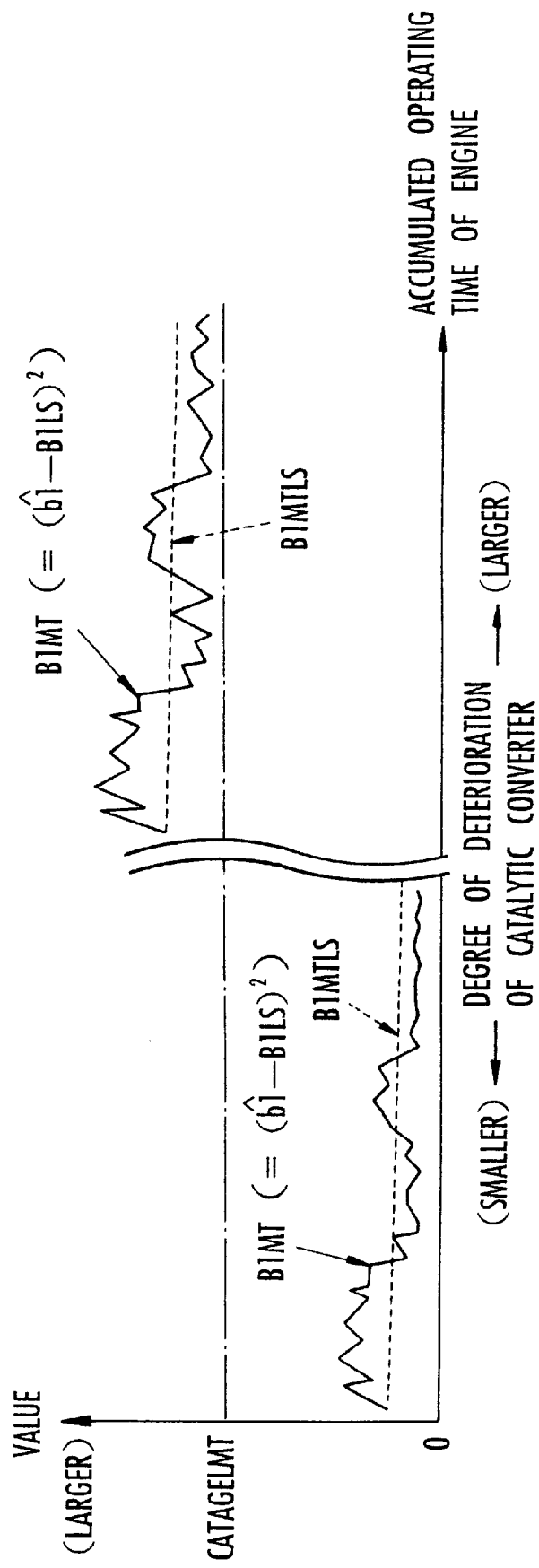
FIG. 6 is a diagram illustrative of the process of evaluating the deteriorated state of the catalytic converter employed by the apparatus shown in FIG. 1.

At this time, due to the above tendency of the identified gain coefficient b1 hat with respect to the deteriorated state of the catalytic converter 3, the variation basic parameter B1MT is of a relatively small value when the deterioration of the catalytic converter 3 is relatively small, as indicated in a left half portion of FIG. 6. When the deterioration of the catalytic converter 3 is larger, the variation basic parameter B1MT is of a large value, as indicated in a right half portion of FIG. 6. Therefore, as the deterioration of the catalytic converter 3 progresses, the value of the variation basic parameter B1MT increases.

In the present invention, the square B1MT of the difference between the identified gain coefficient b1 hat and the identified central value B1LS is used as the variation basic parameter B1MT which represents the degree of variation of the identified gain coefficient b1 hat. However, the absolute value of the difference may be used as a variation basic parameter. Such a variation basic parameter exhibits the same tendency as the above variation basic parameter B1MT against the deterioration of the catalytic converter 3.

The value of the variation basic parameter B1MT exhibits a characteristic tendency with respect to the deterioration of the catalytic converter 3. In general, however, the value of the variation basic parameter B1MT tends to vary to a certain extent even if the deteriorated state of the catalytic converter 3 remains substantially the same.

According to the present invention, the catalytic converter deterioration evaluator 28 further determines a central value B1MTLS of the variation basic parameter B1MT (see the broken line in FIG. 6) according to the equation (32) given below based on a sequential statistical algorithm (an algorithm of the degression gain method) which is the same low-pass filter process as used to determine the identified central value B1LS, and obtains the central value B1MTLS as a deterioration evaluating parameter for finally evaluating the deteriorated state of the catalytic converter 3.

$$B1MTLS(k) = B1MTLS(k-1) + \frac{BP(k-1)}{1+BP(k-1)} \cdot \quad (32)$$
$$(B1MT(k) - B1MTLS(k-1))$$

where BP represents a parameter sequentially updated by the recursive formula according to the above equation (31). In the present embodiment, the statistical algorithm for determining the identified central value B1LS and the statistical algorithm for determining the deterioration evaluating parameter B1MTLS (the central value of the variation basic parameter B1MT) are the same as each other. However, different algorithms may be used to determine the identified central value B1LS and the deterioration evaluating parameter B1MTLS, respectively.

The value of the deterioration evaluating parameter B1MTLS thus determined is highly correlated to the deteriorated state of the catalytic converter 3, and monotonously increases as the deterioration of the catalytic converter 3 progresses. Therefore, the deteriorated state of the catalytic converter 3, or the extent to which the catalytic converter 3 is deteriorated, can be recognized based on the value of the deterioration evaluating parameter B1MTLS.

In the present embodiment, the deteriorated state of the catalytic converter 3 is evaluated to judge whether the catalytic converter 3 is in a state where it has been deteriorated to the extent that it needs to be replaced immediately or soon (such a deteriorated state will hereinafter be referred to as "deterioration-in-progress state", or not (a state of the catalytic converter 3 which is not in the deterioration-in-progress state will hereinafter be referred to as "non-deteriorated state").

The catalytic converter deterioration evaluator 28 compares the deterioration evaluating parameter B1MTLS with a predetermined threshold CATAGELMT as shown in FIG. 6. If B1MTLS≧CATAGELMT, then the catalytic converter deterioration evaluator 28 judges the catalytic converter 3 as being in the deterioration-in-progress state. If B1MTLS<CATAGELMT, then the catalytic converter deterioration evaluator 28 judges the catalytic converter 3 as being in the non-deteriorated state. When the catalytic converter deterioration evaluator 28 judges the catalytic converter 3 as being in the deterioration-in-progress state, the catalytic converter deterioration evaluator 28 operates the deterioration indicator 29 to indicate the deterioration-in-progress state.

The algorithm described above is a basic algorithm for evaluating the deteriorated state of the catalytic converter 3 with catalytic converter deterioration evaluator 28.

The general feedback controller 15 of the engine-side control unit 7b, particularly, the adaptive controller 18, will further be described below.

In FIG. 1, the general feedback controller 15 effects a feedback control process to converge the output KACT (the detected value of the air-fuel ratio) from the LAF sensor 5 toward the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 7:
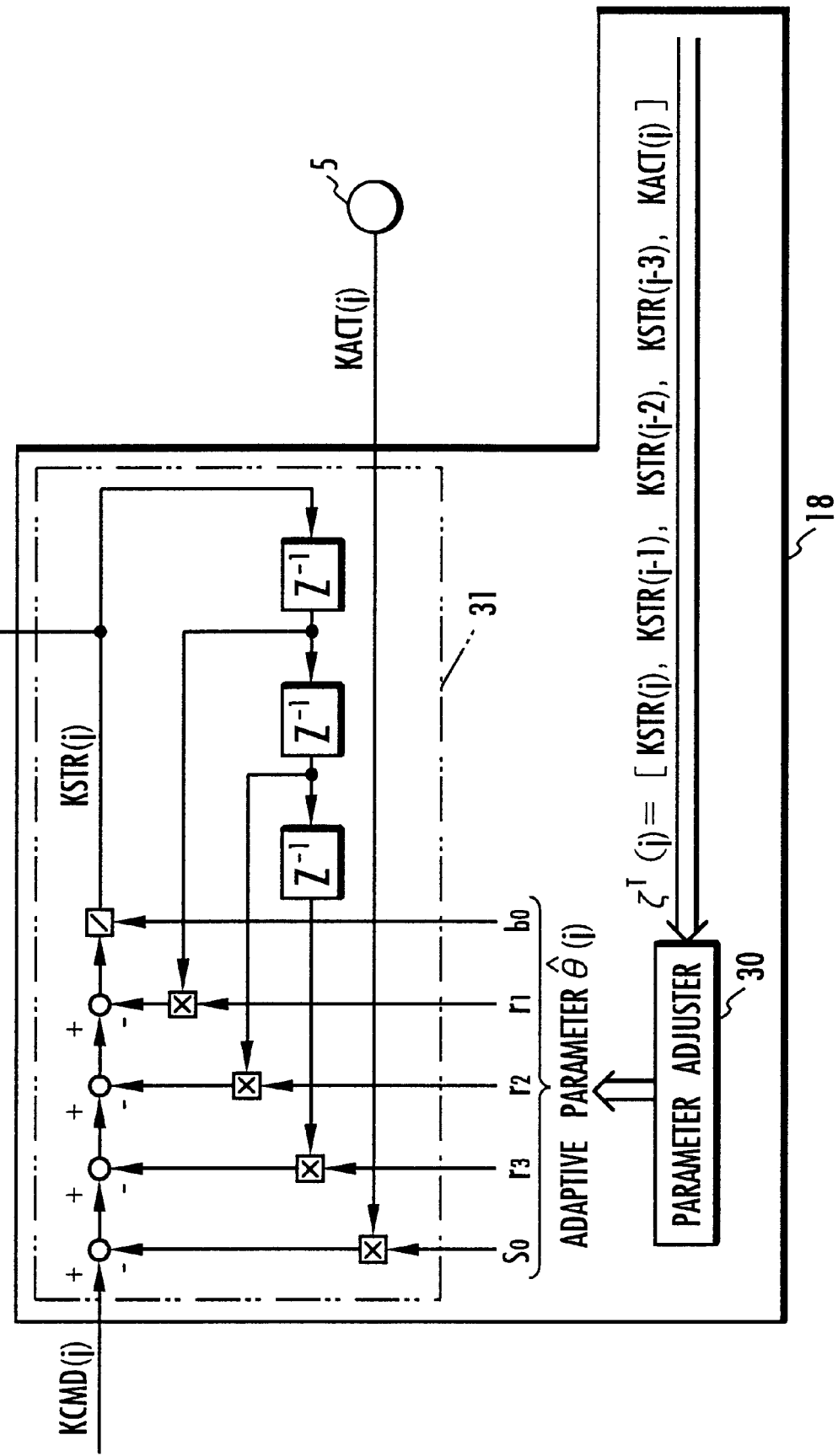
FIG. 7 is a block diagram of an adaptive controller employed in the apparatus shown in FIG. 1.

The adaptive controller 18 is a recursive-type controller which makes it possible to carry out a feedback control process while compensating for dynamic behavioral changes of the internal combustion engine 1. As shown in FIG. 7, the adaptive controller 18 comprises a parameter adjuster 30 for establishing a plurality of adaptive parameters using the parameter adjusting law proposed by I. D. Landau, et al., and a manipulated variable calculator 31 for calculating the feedback manipulated variable KSTR using the established adaptive parameters.

The parameter adjuster 30 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (33), (34), given below, an adaptive parameter $\hat{\theta}$ (j) (j indicates the ordinal number of a control cycle) established by the parameter adjuster 30 is represented by a vector (transposed vector) according to the equation (35) given below. An input $\zeta$(j) to the parameter adjuster 30 is expressed by the equation (36) given below. In the present embodiment, it is assumed that the internal combustion engine 1, which is an object to be controlled by the general feedback controller 15, is considered to be a plant of a first-order system having a dead time dp corresponding to the time of three combustion cycles of the internal combustion engine 1, and m=n=1, dp=3 in the equations (33)–(36), and five adaptive parameters s0, r1, r2, r3, b0 are established (see FIG. 7). In the upper and middle expressions of the equation (36), us, ys generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 5, and the input $\zeta$(j) to the parameter adjuster 30 is expressed by the lower expression of the equation (36) (see FIG. 7).

$$A(Z^{-1}) = 1 + a1Z^{-1} + \ldots + anZ^{-n} \tag{33}$$

$$B(Z^{-1}) = b0 + b1Z^{-1} + \ldots + bmZ^{-m} \tag{34}$$

$$\hat{\theta}^T(j) = [\hat{b0}(j), \hat{BR}(Z^{-1}, j), \hat{S}(Z^{-1}, j)] \tag{35}$$
$$= [b0(j), r1(j), \ldots, rm + dp - 1(j),$$
$$s0(j), \ldots, sn - 1(j)]$$
$$= [b0(j), r1(j), r2(j), r3(j), s0(j)]$$

$$\zeta^T(j) = [us(j), \ldots, us(j-m-dp+1), ys(j), \ldots, \tag{36}$$
$$ys(j-n+1)]$$
$$= [us(j), us(j-1), us(j-2), us(j-3), ys(j)]$$
$$= [KSTR(j), KSTR(j-1), KSTR(j-2),$$
$$KSTR(j-3), KACT(j)]$$

The adaptive parameter $\hat{\theta}$ hat expressed by the equation (35) is made up of a scalar quantity element $\hat{b0}$ (j) for determining the gain of the adaptive controller 18, a control element $\hat{BR}$ $(Z^{-1},j)$ expressed using a manipulated variable, and a control element $\hat{S}$ $(Z^{-1},j)$ expressed using a controlled variable, which are expressed respectively by the following equations (37)~(39) (see the block of the manipulated variable calculator 31 shown in FIG. 7):

$$\hat{b0}^{-1}(j) = \frac{1}{b0} \tag{37}$$

$$\hat{BR}(Z^{-1}, j) = r1Z^{-1} + r2Z^{-2} + \cdots + rm + dp - 1Z^{-(m+dp-1)} \tag{38}$$
$$= r1Z^{-1} + r2Z^{-2} + r3Z^{-3}$$

$$\hat{S}(Z^{-1}, j) = s0 + s1Z^{-1} + \cdots + sn - 1Z^{-(n-1)} \tag{39}$$
$$= s0$$

The parameter adjuster 30 establishes coefficients of the scalar quantity element and the control elements, described above, and supplies them as the adaptive parameter $\theta$ hat expressed by the equation (35) to the manipulated variable calculator 31. The parameter adjuster 30 calculates the adaptive parameter $\theta$ hat so that the output KACT from the LAF sensor 5 will agree with the target air-fuel ratio KCMD, using time-series data of the feedback manipulated variable KSTR from the present to the past and the output KACT from the LAF sensor 5.

Specifically, the parameter adjuster 30 calculates the adaptive parameter $\theta$ hat according to the following equation (40):

$$\hat{\theta}(j) = \hat{\theta}(j-1) + \Gamma(j-1)\cdot\zeta(j-dp)\cdot e^*(j) \tag{40}$$

where $\Gamma$(j) represents a gain matrix (whose degree is indicated by m+n+dp) for determining a rate of establishing the adaptive parameter $\theta$ hat, and e*(j) an estimated error of the adaptive parameter $\theta$ hat. $\Gamma$(j) and e*(j) are expressed respectively by the following recursive formulas (41), (42):

$$\Gamma(j) = \tag{41}$$
$$\frac{1}{\lambda 1(j)} \cdot \left[ \Gamma(j-1) - \frac{\lambda 2(j) \cdot \Gamma(j-1) \cdot \zeta(j-dp) \cdot \zeta^T(j-dp) \cdot \Gamma(j-1)}{\lambda 1(j) + \lambda 2(j) \cdot \zeta^T(j-dp) \cdot \Gamma(j-1) \cdot \zeta(j-dp)} \right]$$

where $0 < \lambda 1(j) \leq 1$, $0 \leq \lambda 2(j) < 2$, $\Gamma(0) > 0$.

$$e^*(j) = \frac{D(Z^{-1}) \cdot KACT(j) - \hat{\theta}^T(j-1) \cdot \zeta(j-dp)}{1 + \zeta^T(j-dp) \cdot \Gamma(j-1) \cdot \zeta(j-dp)} \tag{42}$$

where $D(Z^{-1})$ represents an asymptotically stable polynomial for adjusting the convergence. In the present embodiment, $D(Z^{-1}) = 1$.

Various specific algorithms including the degressive gain algorithm, the variable gain algorithm, the fixed tracing algorithm, and the fixed gain algorithm are obtained depending on how $\lambda 1(j)$, $\lambda 2(j)$ in the equation (41) are selected. For a time-dependent plant such as a fuel injection process, an air-fuel ratio, or the like of the internal combustion engine 1, either one of the degressive gain algorithm, the variable gain algorithm, the fixed gain algorithm, and the fixed tracing algorithm is suitable.

Using the adaptive parameter $\theta$ hat (s0, r1, r2, r3, b0) established by the parameter adjuster 30 and the target air-fuel ratio KCMD determined by the exhaust-side main processor 13, the manipulated variable calculator 31 determines the feedback manipulated variable KSTR according to a recursive formula expressed by the following equation (43):

$$KSTR = \frac{KCMD(j) - s0 \cdot KACT(j) - r1 \cdot KSTR(j-1) - r2 \cdot KSTR(j-2) - r3 \cdot KSTR(j-3)}{b0} \quad (43)$$

The manipulated variable calculator 31 shown in FIG. 7 represents a block diagram of the calculations according to the equation (43).

The feedback manipulated variable KSTR determined according to the equation (43) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 15, calculates a proportional term (P term), an integral term (I term), and a derivative term (D term) from the difference between the output KACT of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed NE and intake pressure PB of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT of the LAF sensor 5 quickly toward the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 or U.S. Pat. No. 5,558,075, and will not be described in detail below.

Operation of the entire apparatus according to the present embodiment will be described below.

First, control cycles of the processing sequence carried out by the control unit 7 will be described below. The process of controlling the air-fuel ratio of the internal combustion engine 1, i.e., the process of adjusting the fuel injection quantity, needs to be in synchronism with the rotational speed of the internal combustion engine 1. Therefore, the processing sequence carried out by the engine-side control unit 7b is performed in control cycles in synchronism with the crankshaft angle period (so-called TDC) of the internal combustion engine 1. The output data from various sensors including the LAF sensor 5 and the $O_2$ sensor 6 are also read in control cycles in synchronism with the crankshaft angle period (so-called TDC).

It is preferable that the process performed by the exhaust-side control unit 7a for calculating the target air-fuel ratio KCMD and evaluating the deteriorated state of the catalytic converter 3 be carried out in control cycles of a constant period in view of the dead time present in the catalytic converter 3, calculating loads, etc. In the present embodiment, the above process of the exhaust-side control unit 7a is carried out in control cycles of a constant period (e.g., 30–100 ms).

The constant period may be determined depending on the type, reaction rate, volume, etc. of the catalytic converter 3 to be controlled. In the present embodiment, the time interval of the above constant period is selected to be greater than the time interval of the crankshaft angle period (TDC) in a general operating state, i.e., at a general rotational speed of the internal combustion engine 1.

Figure 8:
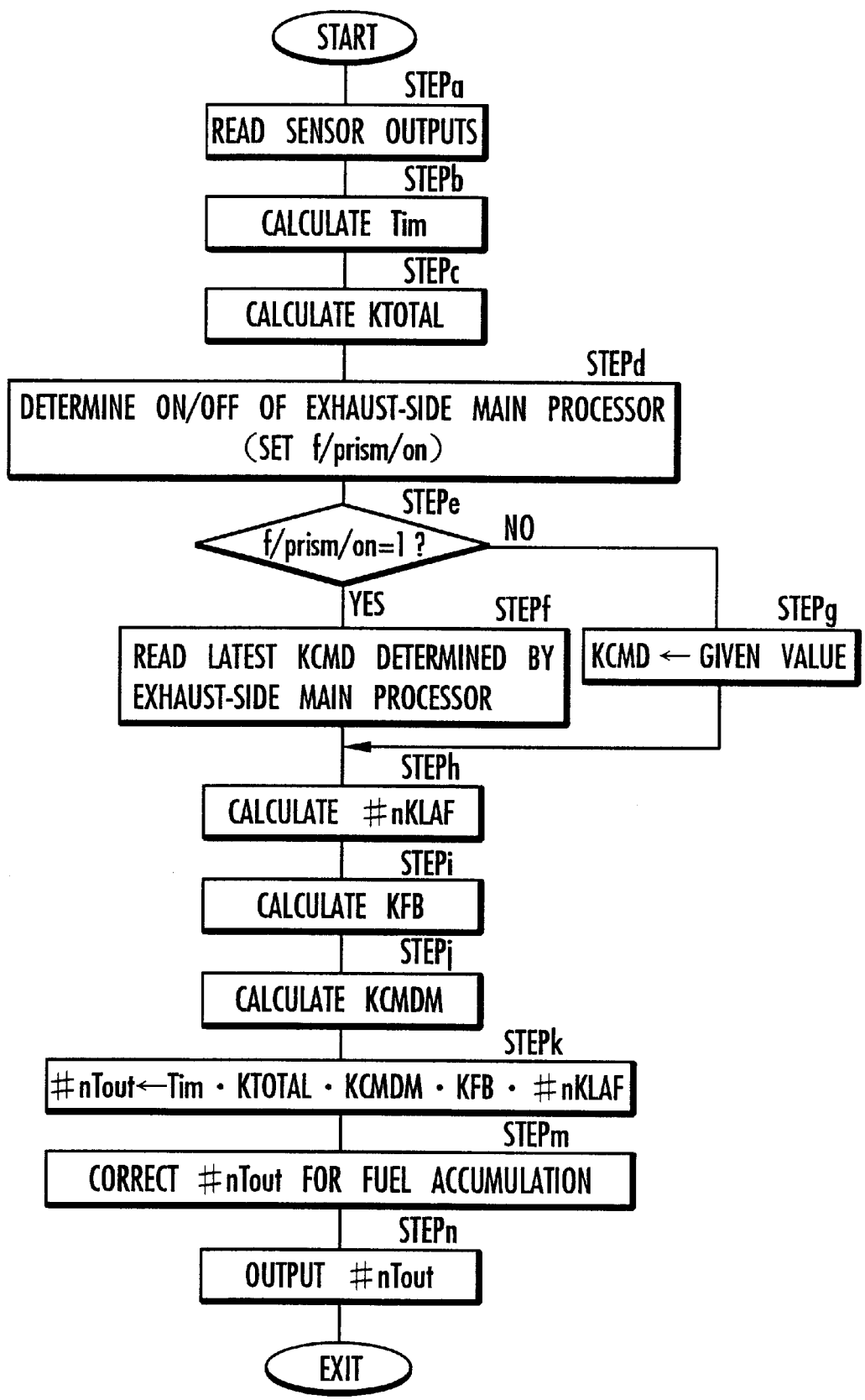
FIG. 8 is a flowchart of a process of controlling fuel in an internal combustion engine with the apparatus shown in FIG. 1.

First, a process, carried out by the engine-side control unit 7b, of calculating an output fuel injection quantity #nTout (n=1, 2, 3, 4) for each of the cylinders of the internal combustion engine 1 for controlling the air-fuel ratio of the internal combustion engine 1 will be described below with reference to FIG. 8. The engine-side control unit 7b calculates an output fuel injection quantity #nTout (n=1, 2, 3, 4) for each of the cylinders in synchronism with a crankshaft angle period (TDC) of the internal combustion engine 1 as follows:

In FIG. 8, the engine-side control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine-side control unit 7b decides whether the target air-fuel ratio KCMD generated by the exhaust-side main processor 13 is to be used or not, i.e., determines ON/OFF of the exhaust-side main processor 13, and sets a value of a flag f/prism/on which represents ON/OFF of the exhaust-side main processor 13 in STEPd. When the value of the flag f/prism/on is "0", it means that the target air-fuel ratio KCMD generated by the exhaust-side main processor 13 is not to be used (OFF), and when the value of the flag f/prism/on is "1", it means that the target air-fuel ratio KCMD generated by the exhaust-side main processor 13 is to be used (ON).

In the above deciding step, activated states of the $O_2$ sensor 6 and the LAF sensor 5 and an operating state (operating mode) of the internal combustion engine 1 are determined. If these states satisfy given conditions, then the value of the flag f/prism/on is set to "1" in order to use the target air-fuel ratio KCMD generated by the exhaust-side main processor 13 for controlling the supply of fuel to the internal combustion engine 1. If the above states do not satisfy given conditions, e.g., if the $O_2$ sensor 6 or the LAF sensor 5 is not sufficiently activated, the supply of fuel to the internal combustion engine 1 is being cut off, or the internal combustion engine 1 is being operated with a lean air-fuel mixture, then the value of the flag f/prism/on is set to "1". Basically, the value of the flag f/prism/on is set to "1" while the internal combustion engine 1 is normally operating.

After the value of the flag f/prism/on has been set, the engine-side control unit 7b determines the value of the flag f/prism/on in STEPe. If f/prism/on=1, then the engine-side control unit 7b reads the target air-fuel ratio KCMD generated by the exhaust-side main processor 13 in STEPf. If f/prism/on=0, then the engine-side control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controllers 22 calculate respective feedback correction coefficients #nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB. in STEPi.

Depending on the operating conditions of the internal combustion engine 1, the switcher 20 selects either the feedback manipulated variable KLAF determined by the PID controller 17 or the feedback manipulated variable kstr which has been. produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the control cycle for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the engine-side control unit 7b multiplies the basic fuel injection quantity Tim determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected air-fuel ratio) toward the target air-fuel ratio KCMD. While the feedback manipulated variable kstr from the adaptive controller 18 is being used as the feedback correction coefficient KFB, the output KACT of the LAF sensor 5 is quickly converged toward the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 9:
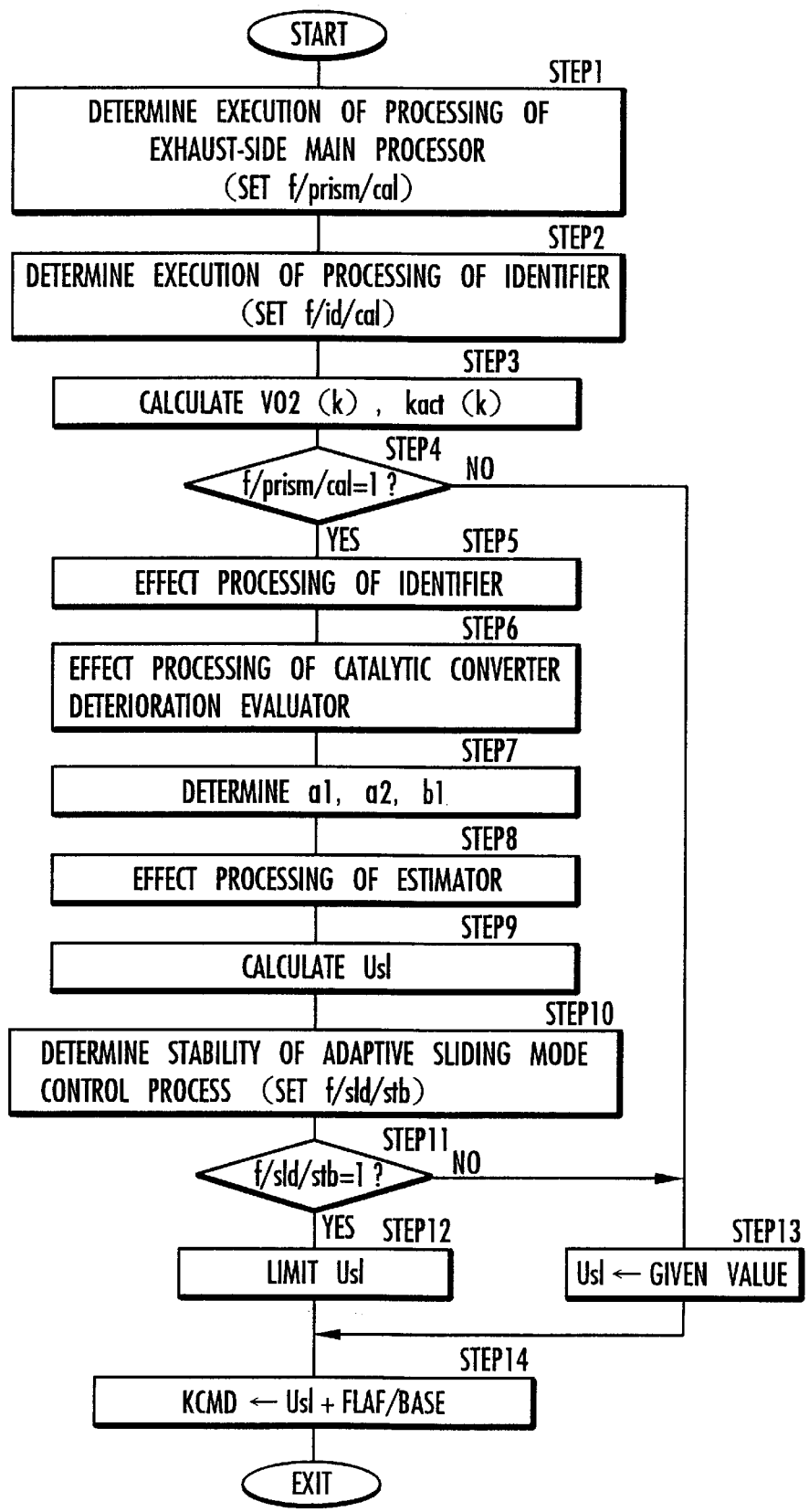
FIG. 9 is a flowchart of a main routine of the exhaust-side main processor of the apparatus shown in FIG. 1.

Concurrent with the above fuel control (the fuel injection quantity adjustment) for the internal combustion engine 1, the exhaust-side main processor 13 of the exhaust-side control unit 7a executes a main routine shown in FIG. 9 in control cycles of a constant period.

As shown in FIG. 9, the exhaust-side main processor 13 decides whether the processing thereof (the processing of the identifier 25, the estimator 26, the sliding mode controller 27, and the catalytic converter deterioration evaluator 28) is to be executed or not, and sets a value of a flag f/prism/cal indicative of whether the processing is to be executed or not in STEP1. When the value of the flag f/prism/cal is "0", it means that the processing of the exhaust-side main processor 13 is not to be executed, and when the value of the flag f/prism/cal is "1", it means that the processing of the exhaust-side main processor 13 is to be executed.

Figure 10:
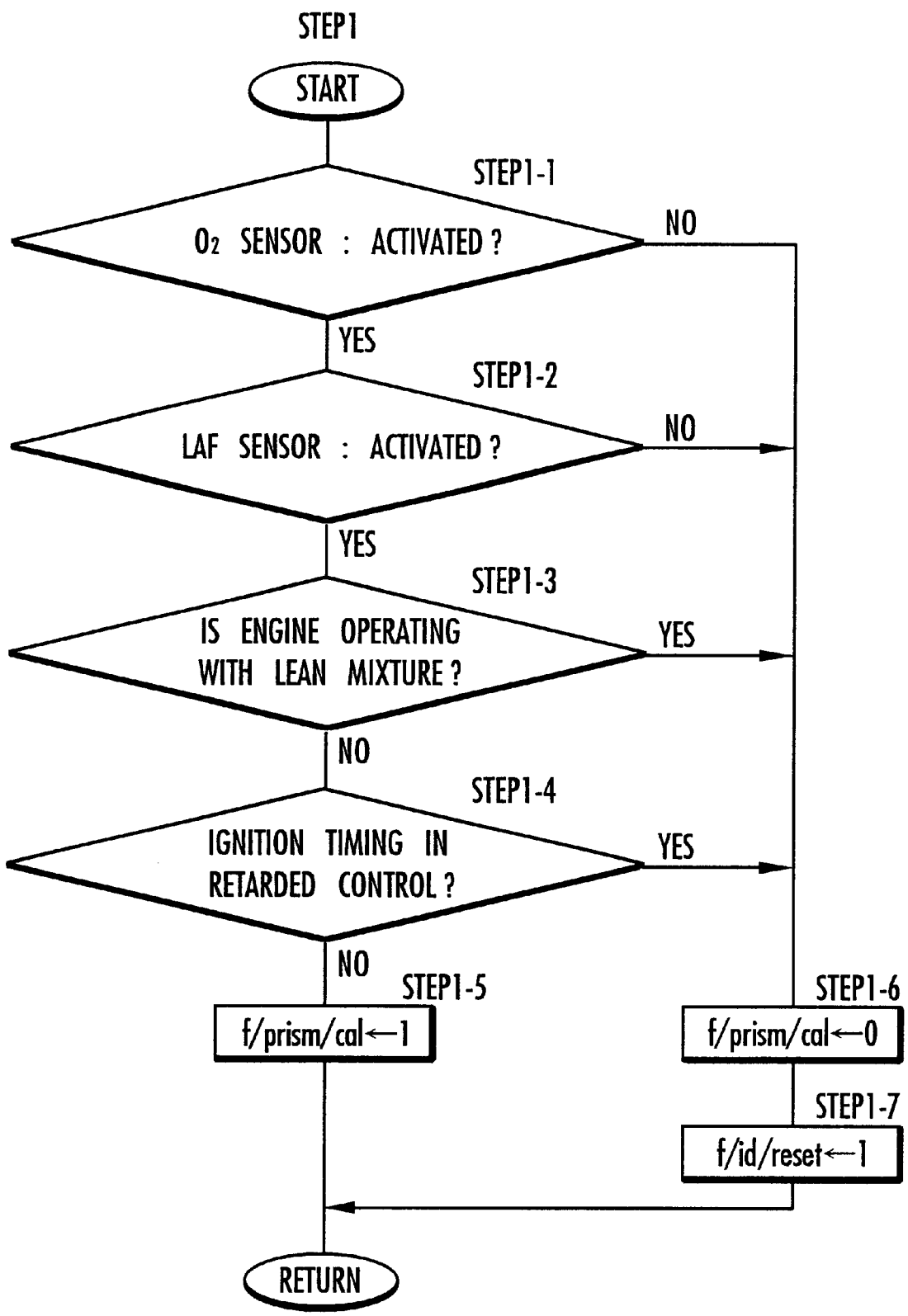
FIG. 10 is a flowchart of a subroutine of the main routine shown in FIG. 9.

The deciding subroutine in STEP1 is shown in detail in FIG. 10. As shown in FIG. 10, the exhaust-side main processor 13 decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the exhaust-side main processor 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The exhaust-side main processor 13 decides whether the internal combustion engine 1 is operating with a lean air-fuel mixture or not in STEP1-3. The exhaust-side main processor 13 decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to adjust the output VO2/OUT of the $O_2$ sensor 6 to the target value VO2/TARGET is not used for the fuel control for the internal combustion engine 1, the value of the flag f/prism/cal is set to "0" in STEP1-6, and the value of the flag f/id/reset is set to "1" in order to initialize the identifier 25 in STEP1-7.

If the conditions of STEP1-1, STEP1-2 are satisfied and the conditions of STEP1-3, STEP1-4 are not satisfied, then the value of the flag f/prism/cal is set to "1" in order to perform the processing sequence of the exhaust-side main processor 13 in STEP1-5.

In FIG. 9, after the above deciding subroutine, the exhaust-side main processor 13 decides whether a process of identifying (updating) the gain coefficients a1, a2, b1 with the identifier 25 is to be executed or not, and sets a value of a flag f/id/cal indicative of whether the process of identifying (updating) the gain coefficients a1, a2, b1 is to be executed or not in STEP2. When the value of the flag f/id/cal is "0", it means that the process of identifying (updating) the gain coefficients a1, a2, b1 is not to be executed, and when the value of the flag f/id/cal is "1", it means that the process of identifying (updating) the gain coefficients a1, a2, b1 is to be executed.

Figure 11:
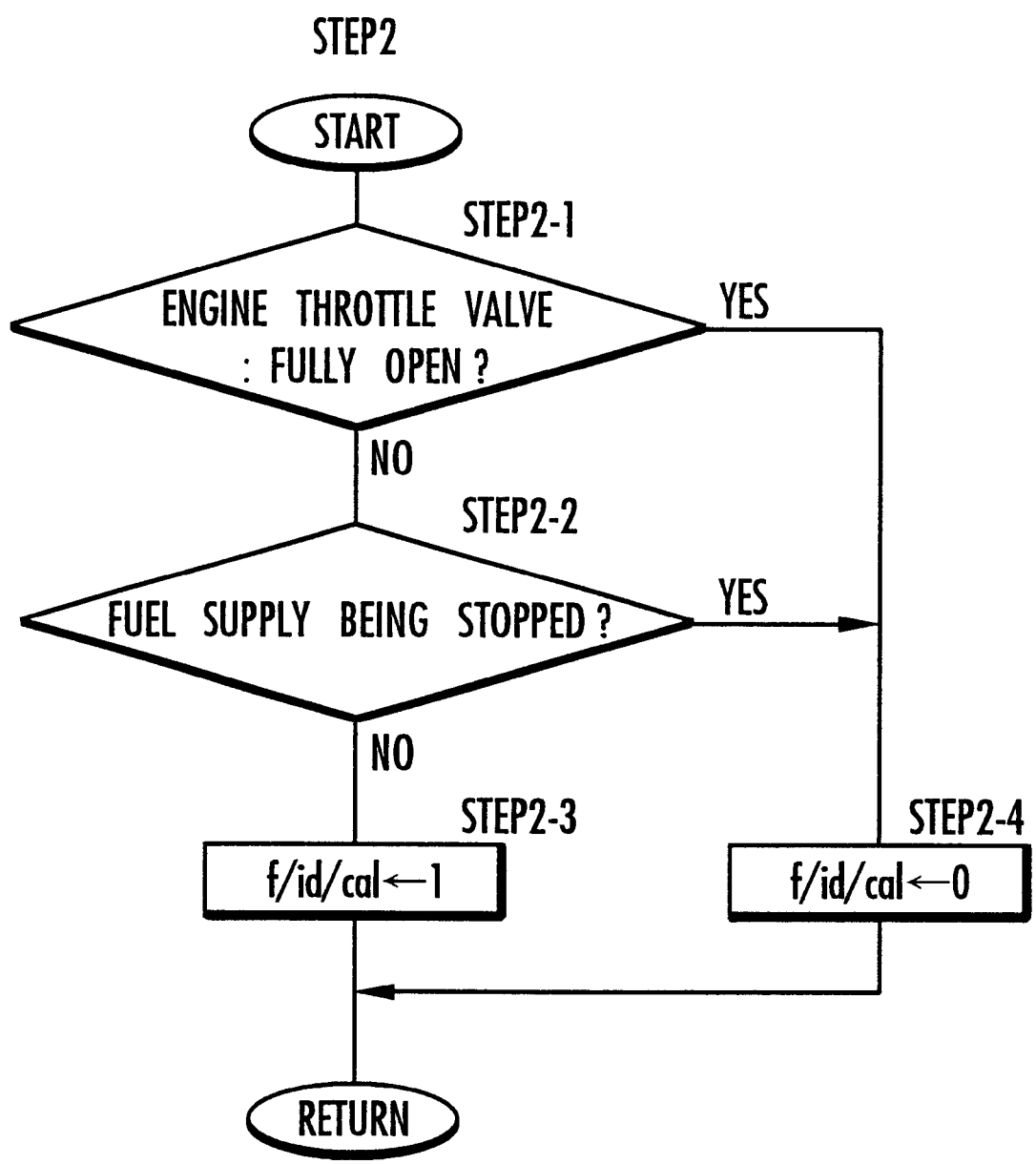
FIG. 11 is a flowchart of a subroutine of the main routine shown in FIG. 9.

The deciding subroutine of STEP2 is shown in detail in FIG. 11.

The exhaust-side main processor 13 decides whether the throttle valve of the internal combustion engine 1 is fully open or not in STEP2-1. The exhaust-side main processor 13 decides whether the supply of fuel to the internal combustion engine 1 is being stopped or not in STEP2-2. If either one of the conditions of these steps is satisfied, then since it is difficult to adjust the gain coefficients a1, a2, b1 appropriately, the value of the flag f/id/cal is set to "0" in STEP2-4. If neither one of the conditions of these steps is satisfied, then the value of the flag f/id/cal is set to "1" to identify (update) the gain coefficients a1, a2, b1 with the identifier 25 in STEP2-3.

Referring back to FIG. 9, the exhaust-side main processor 13 acquires the latest differential outputs kact(k) (=KACT−FLAF/BASE), VO2(k) (=VO2/OUT−VO2/TARGET) respectively from the subtractors 11, 12 in STEP3. Specifically, the subtractors 11, 12 select latest ones of the time-series data read and stored in the non-illustrated memory in STEPa shown in FIG. 8, calculate the differential outputs kact(k), VO2(k), and give the calculated differential outputs kact(k), VO2(k) to the exhaust-side main processor 13. The differential outputs kact(k), VO2(k) given to the exhaust-side main processor 13, as well as data given in the past, are stored in a time-series manner in a memory (not shown) in the exhaust-side control unit 7a.

Then, in STEP4, the exhaust-side main processor 13 determines the value of the flag f/prism/cal set in STEP1. If the value of the flag f/prism/cal is "0", i.e., if the processing of the exhaust-side main processor 13 is not to be executed, then the exhaust-side main processor 13 forcibly sets the SLD manipulating input Usl (the target differential air-fuel ratio kcmd) to be determined by the sliding mode controller 27, to a predetermined value in STEP13. The predetermined value may be a fixed value (e.g., "0") or the value of the SLD manipulating input Usl determined in a preceding control cycle.

After the SLD manipulating input Usl is set to the predetermined value in STEP13, the exhaust-side main processor 13 adds the reference value FLAF/BASE to the SLD manipulating input Usl for thereby determining a target air-fuel ratio KCMD in the present control cycle in STEP14. Then, the processing in the present control cycle is finished.

If the value of the flag f/prism/cal is "1" in STEP4, i.e., if the processing of the exhaust-side main processor 13 is to be executed, then the exhaust-side main processor 13 effects the processing of the identifier 25 in STEP5.

Figure 12:
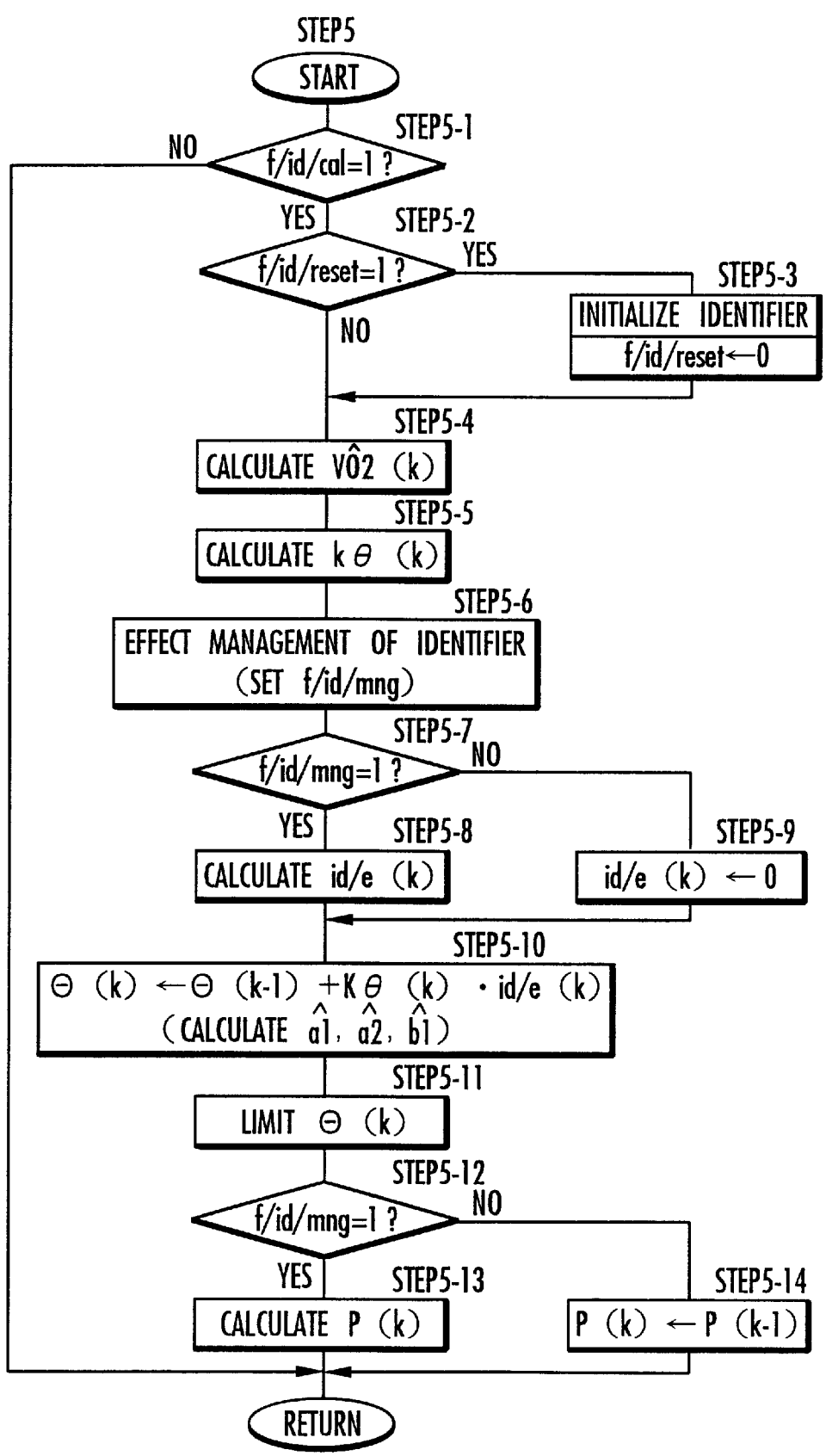
FIG. 12 is a flowchart of a subroutine of the main routine shown in FIG. 9.

The processing subroutine of STEP5 is shown in detail in FIG. 12.

The identifier 25 determines the value of the flag f/id/cal set in STEP2 in STEP5-1. If the value of the flag f/id/cal is "0", then since the process of identifying the gain coefficients a1, a2, b1 with the identifier 25 is not carried out, control immediately goes back to the main routine shown in FIG. 9.

If the value of the flag f/id/cal is "1", then the identifier 25 determines the value of the flag f/id/reset set in STEP1 with respect to the initialization of the identifier 25 in STEP5-2. If the value of the flag f/id/reset is "1", the identifier 25 is initialized in STEP5-3. When the identifier 25 is initialized, the identified gain coefficients a1 hat, a2 hat, b1 hat are set to predetermined initial values (the identified gain coefficient vector $\Theta$ according to the equation (4) is initialized), and the elements of the matrix P (diagonal matrix) according to the equation (10) are set to predetermined initial values. The value of the flag f/id/reset is reset to "0".

Then, the identifier 25 calculates the identified differential output VO2(k) hat, which is the output of the exhaust system model that is expressed using the present identified gain coefficients a1(k−1) hat, a2(k−1) hat, b1(k−1) hat, using the past data VO2(k−1), VO2(k−2), kact(k−d−1) of the differential outputs VO2, kact calculated in each control cycle in STEP3, and the values of the identified gain coefficients a1(k−1) hat, a2(k−1)hat, b1(k−1) hat, according to the equation (3) or the equation (6) equivalent thereto in STEP5-4.

The identifier 25 then calculates the vector K$\theta$(k) to be used in determining the new identified gain coefficients a1 hat, a2 hat, b1 hat according to the equation (9) in STEP5-5. Thereafter, the identifier 25 carries out a management process described below in STEP5-6.

When the gain coefficients a1, a2, b1 of the exhaust system model are to be sequentially identified, they should preferably be identified in a particular behavioral state of the object exhaust system E. For example, it is easier to obtain identified gain coefficients a1 hat, a2 hat, b1 hat that are appropriate for calculating the target air-fuel ratio and evaluating the deteriorated state of the catalytic converter 3 by identifying the gain coefficients a1, a2, b1 in a behavioral state of the object exhaust system E in which the air-fuel ratio is changed from a leaner value to a richer value than by identifying the gain coefficients a1, a2, b1 in a behavioral state of the object exhaust system E in which the air-fuel ratio is changed from a richer value to a leaner value.

In the present invention, therefore, the process of identifying the gain coefficients a1, a2, b1, or more precisely the process of updating the identified gain coefficients a1 hat, a2 hat, b1 hat, is carried out in a behavioral state of the object exhaust system E in which the air-fuel ratio is changed from a leaner value to a richer value. The management process is a process of specifying such a behavioral state of the object exhaust system E.

Figure 13:
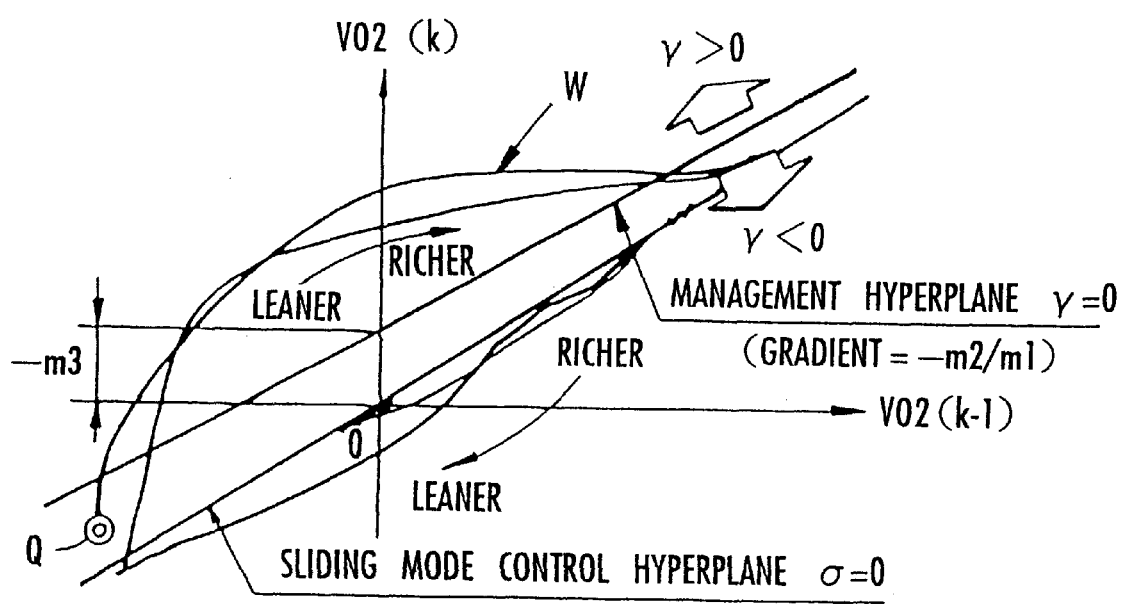
FIG. 13 is a diagram illustrating a partial process of the subroutine shown in FIG. 12.

As shown in FIG. 13, according to the control process of the present embodiment which uses the adaptive sliding mode control process, the state quantity X (VO2(k), VO2 (k−1)) of the differential output VO2 of the $O_2$ sensor 6 changes from its initial state at a point Q along a path W with respect to the hyperplane σ=0 (see FIG. 4). Basically, a state in which the state quantity X changes above the hyperplane σ=0 (at this time, the value of the switching function σ determined by the state quantity X is positive) is equal to a state in which the air-fuel ratio is changed from a leaner value to a richer value, and a state in which the state quantity x changes below the hyperplane σ=0 (at this time, the value of the switching function σ determined by the state quantity X is negative) is equal to a state in which the air-fuel ratio is changed from a richer value to a leaner value.

Consequently, whether the object exhaust system E is in a behavioral state in which the air-fuel ratio recogized by the output VO2/OUT (the detected value of the oxygen concentration) of the $O_2$ sensor 6 is changed from a leaner value to a richer value or not can be determined based on whether the value of the switching function σ is positive or negative. However, if whether the object exhaust system E is in a behavioral state in which the air-fuel ratio is changed from a leaner value to a richer value or not is determined based on whether the value of the switching function σ is positive or not, then the decision about whether the object exhaust system E is in a behavioral state in which the air-fuel ratio is changed from a leaner value to a richer value or not may be changed when the state quantity X slightly varies from above the hyperplane σ=0. Therefore, it is not preferable to carry out the process of identifying the gain coefficients a1, a2, b1, i.e., updating the identified gain coefficients a1 hat, a2 hat, b1 hat, depending on that decision.

In the present embodiment, a management function λ defined using the time-series data of the differential output VO2 according to the following equation (44) is introduced:

$$\gamma(k)=m1 \cdot VO2(k)+m2 \cdot VO2(k-1)+m3 \quad (44)$$

The coefficients m1, m2, m3 of the management function γ are established such that a management hyperplane (in this case, a straight line) expressed by γ=0 is positioned slightly above (in the region of σ>0) the sliding mode control hyperplane σ=0. In this embodiment, the coefficient m1 of the management function γ is set to "1" in view of the fact that the coefficient s1 of the switching function σ is set to "1".

If the management function γ is γ≧0, then the object exhaust system E is certainly in a behavioral state in which the air-fuel ratio is changed from a leaner value to a richer value. Therefore, whether the object exhaust system E is in such a behavioral state or not can stably be determined based on whether the management function γ is of a positive value (including "0") or not.

The management process in STEP5-6 determines, using the management function γ thus defined, whether the object exhaust system E is in a behavioral state in which the air-fuel ratio recognized by the output VO2/OUT (the detected value of the oxygen concentration) of the $O_2$ sensor 6 is changed from a leaner value to a richer value or not, i.e., whether the object exhaust system E is in a behavioral state that is suitable for the identifier 25 to identify the gain coefficients a1, a2, b1 or not. The management process is specifically carried out as follows:

The identifier 25 calculates the value of the management function γ according to the above equation (44), using the latest differential output VO2(k) acquired in STEP3 (see FIG. 9) and the differential output VO2(k−1) in the preceding control cycle. If the management function γ thus determined is γ≧0, then the identifier 25 sets a flag f/id/mng to "1", and if the management function γ is γ<0, then the identifier 25 sets the flag f/id/mng to "0". When the flag f/id/mng is "1", it indicates that the object exhaust system E is in a behavioral state in which the air-fuel ratio is changed from a leaner value to a richer value. When the flag f/id/mng is "0", it indicates otherwise.

Thus, the value of the flag f/id/mng indicates whether the object exhaust system E is in a behavioral state in which the air-fuel ratio is changed from a leaner value to a richer value, i.e., whether the object exhaust system E is in a behavioral state that is suitable for the identifier 25 to identify the gain coefficients a1, a2, b1, or to up-date the identified gain coefficients a1 hat, a2 hat, b1 hat.

After having carried out the management process, the identifier 25 determines the value of the flag f/id/mng in STEP5-7. If f/id/mng=1, i.e., if the object exhaust system E is in a behavioral state in which the air-fuel ratio is changed from a leaner value to a richer value, then the identifier 25 calculates the identified error id/e, i.e., the difference between the identified differential output VO2 hat and the actual differential output VO2 (see the equation (7)), in STEP5-8. If f/id/mng=0, then the identifier 25 forcibly sets the value of the identified error id/e to "0" in STEP5-9.

Thereafter, the identifier 25 calculates a new identified gain coefficient vector Θ(k), i.e., new identified gain coefficients a1(k) hat, a2(k) hat, b1(k) hat, according to the equation (8) using the identified error id/e determined in STEP5-8 or STEP5-9 and KΘ calculated in SETP5-5 in STEP5-10.

Figure 14:
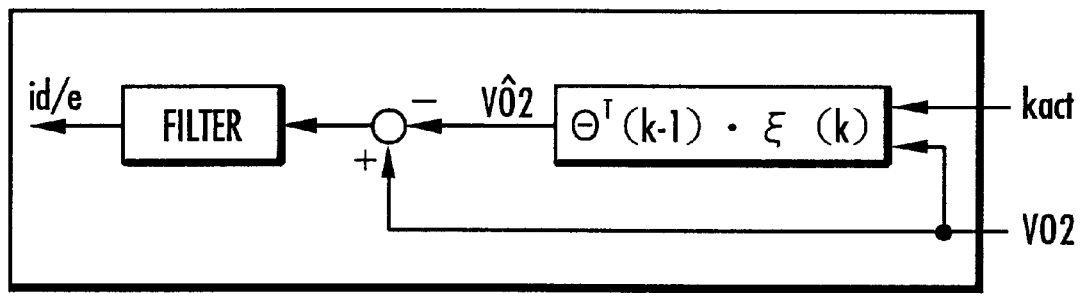
FIG. 14 is a diagram illustrating a partial process of the subroutine shown in FIG. 12.

The identified error id/e obtained in STEP5-8 may basically be calculated according to the equation (7). In the present embodiment, however, as shown in FIG. 14, a value (=VO2−VO2 hat) calculated according to the equation (7) from the differential output VO2 acquired in each control cycle in STEP3 (see FIG. 9), and the identified differential output VO2 hat calculated in each control cycle in STEP5-4 is filtered with low-pass characteristics to calculate the identified error id/e.

This is because since the object exhaust system E including the catalytic converter 3 generally has low-pass characteristics, it is preferable to attach importance to the low-frequency behavior of the exhaust system E in appropriately identifying the gain coefficients a1, a2, b1 of the the exhaust system model.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error id/e.

However, determining the identified error idle by filtering the result of the calculation of the equation (7) as with the present embodiment offers the following advantages: If the resolutions of the differential output kact of the LAF sensor 5 and the differential output VO2 of the O₂ sensor 6, which are supplied to the exhaust-side main processor 13, are lower than the calculating resolution of the exhaust-side main processor 13, then the result of the calculation of the equation (7) exhibits relatively large step-wise changes. By filtering the result of the calculation of the equation (7), any changes of the identified error id/e can be smoothed.

The above filtering is carried out by a moving average process which is a digital filtering process, for example.

After having calculated the new identified gain coefficients a1(k) hat, a2(k) hat, b1(k) hat, the identifier 25 limits the values of the identified gain coefficients a1 hat, a2 hat, b1 hat (elements of the identified gain coefficient vector Θ), are limited to meet predetermined conditions in STEP5-11, as described below.

The predetermined conditions for limiting the values of the identified gain coefficients a1 hat, a2 hat, b1 hat include a condition (hereinafter referred to as a first limiting condition) for limiting combinations of the values of the identified gain coefficients a1 hat, a2 hat, and a condition (hereinafter referred to as a second limiting condition) for limiting the value of the identified gain coefficient b1 hat.

Prior to describing the first and second limiting conditions and the specific processing details of STEP5-11, the reasons for limiting the values of the identified gain coefficients a1 hat, a2 hat, b1 hat will be described below.

The inventors of the present invention have found that if the values of the identified gain coefficients a1 hat, a2 hat, b1 hat are not particularly limited, while the output signal VO2/OUT of the O₂ sensor 6 is being stably controlled at the target value VO2/TARGET, there are developed a situation in which the target air-fuel ratio KCMD determined by the sliding mode controller 27 changes smoothly with time, and a situation in which the target air-fuel ratio KCMD oscillates with time at a high frequency. Neither of these situations poses problems in controlling the output VO2/OUT of the O₂ sensor 6 at the target value VO2/TARGET. However, the situation in which the target air-fuel ratio KCMD oscillates with time at a high frequency is not preferable in smoothly operating the internal combustion engine 1 that is controlled on the basis of the target air-fuel ratio KCMD. In this situation, the value of the identified gain coefficient b1 hat sequentially calculated by the identifier 25 may possible become inadequate for evaluating the deteriorated state of the catalytic converter 3.

A study of the above phenomenon by the inventors has shown that whether the target air-fuel ratio KCMD determined by the sliding mode controller 27 changes smoothly or oscillates at a high frequency depends strongly on the combinations of the values of the identified gain coefficients a1 hat, a2 hat identified by the identifier 25 and the value of the identified gain coefficient b1 hat.

In the present embodiment, the first and second limiting conditions are established appropriately, and the combinations of the values of the identified gain coefficients a1 hat, a2 hat and the value of the identified gain coefficient b1 hat are appropriately limited to eliminate the situation in which the target air-fuel ratio KCMD oscillates at a high frequency.

According to the present embodiment, the first and second limiting conditions are established as follows:

With respect to the first limiting condition for limiting the values of the identified gain coefficients a1 hat, a2 hat, the study by the inventors indicates that whether the target air-fuel ratio KCMD determined by the sliding mode controller 27 changes smoothly or oscillates at a high frequency is closely related to combinations of the coefficient values α1, α2 in the equations (12)–(14) which are determined by the values of the gain coefficients a1, a2, i.e., the coefficient values α1, α2 used for the estimator 26 to determine the estimated differential output VO2(k+d) bar (the coefficient values α1, α2 are the first-row, first-column element and the first-row, second-column element of the matrix $A^d$ which is a power of the matrix A defined by the equation (12)).

Figure 15:
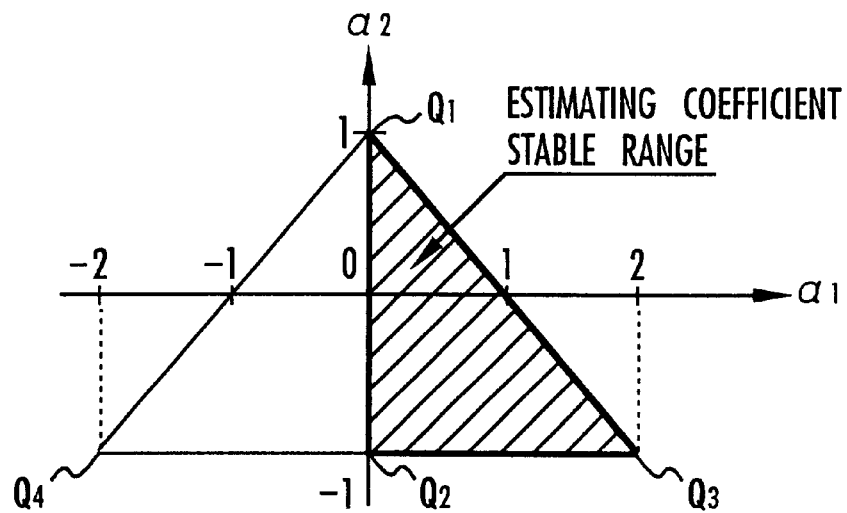
FIG. 15 is a diagram illustrating a partial process of the subroutine shown in FIG. 12.

Specifically, as shown in FIG. 15, when a coordinate plane whose coordinate components or axes are represented by the coefficient values α1, α2 is established, if a point on the coordinate plane which is determined by a combination of the coefficient values α1, α2 lies in a hatched range, which is surrounded by a triangle $Q_1Q_2Q_3$ (including the boundaries) and will hereinafter be referred to as an estimating coefficient stable range, then the target air-fuel ratio KCMD tends to be smooth.

Therefore, the combinations of the values of the gain coefficients a1, a2 identified by the identifier 25, i.e., the combinations of the values of the identified gain coefficients a1 hat, a2 hat, should be limited such that the point on the coordinate plane shown in FIG. 15 which corresponds to the combination of the coefficient values α1, α2 determined by the values of the gain coefficients a1, a2 or the values of the identified gain coefficients a1 hat, a2 hat will lie within the estimating coefficient stable range.

In FIG. 15, a triangular range $Q_1Q_4Q_3$ on the coordinate plane which contains the estimating coefficient stable range is a range that determines combinations of the coefficient values α1, α2 which makes theoretically stable a system defined according to the following equation (45), i.e., a system defined by an equation similar to the equation (12) except that VO2(k), VO2(k−1) on the right side of the equation (12) are replaced respectively with VO2(k) bar, VO2(k−1) bar (VO2(k) bar, VO2(k−1) bar mean respectively an estimated differential output determined before the dead time d by the estimator 26 and an estimated differential output determined in a preceding cycle by the estimator 26).

$$\overline{VO2}(k+d) = \alpha1 \cdot \overline{VO2}(k) + \alpha2 \cdot \overline{VO2}(k-1) + \sum_{j=1}^{d} \beta_j \cdot kcmd(k-j) \quad (45)$$

The condition for the system defined according to the equation (45) to be stable is that a pole of the system (which is given by the following equation (46)) exists in a unit circle on a complex plane:

Pole of the system according to the equation (45)

$$\text{Pole of the system according to the equation (45)} = \frac{\alpha1 \pm \sqrt{\alpha1^2 + 4 \cdot \alpha2}}{2} \quad (46)$$

The triangular range $Q_1Q_4Q_3$ shown in FIG. 15 is a range for determining the combinations of the coefficient values α1, α2 which satisfy the above condition. Therefore, the estimating coefficient stable range is a range indicative of those combinations where α1≧0 of the combinations of the coefficient values α1, α2 which make stable the system defined by the equation (45).

Since the coefficient values α1, α2 are determined by a combination of the values of the gain coefficients a1, a2, a combination of the values of the gain coefficients a1, a2 is determined by a combination of the coefficient values α1, α2. Therefore, the estimating coefficient stable range shown in FIG. 15 which determines preferable combinations of the coefficient values α1, α2 can be converted into a range on a coordinate plane shown in FIG. 16 whose coordinate components or axes are represented by the gain coefficients a1, a2. Specifically, the estimating coefficient stable range shown in FIG. 15 is converted into a range enclosed by the imaginary lines in FIG. 16, which is a substantially triangular range having an undulating lower side and will hereinafter be referred to as an identifying coefficient stable range, on the coordinate plane shown in FIG. 16. Stated otherwise, when a point on the coordinate plane shown in FIG. 16 which is determined by a combination of the values of the gain coefficients a1, a2 resides in the identifying coefficient stable range, a point on the coordinate plane shown in FIG. 15 which corresponds to the combination of the coefficient values α1, α2 determined by those values of the gain coefficients a1, a2 resides in the estimating coefficient stable range.

Figure 16:
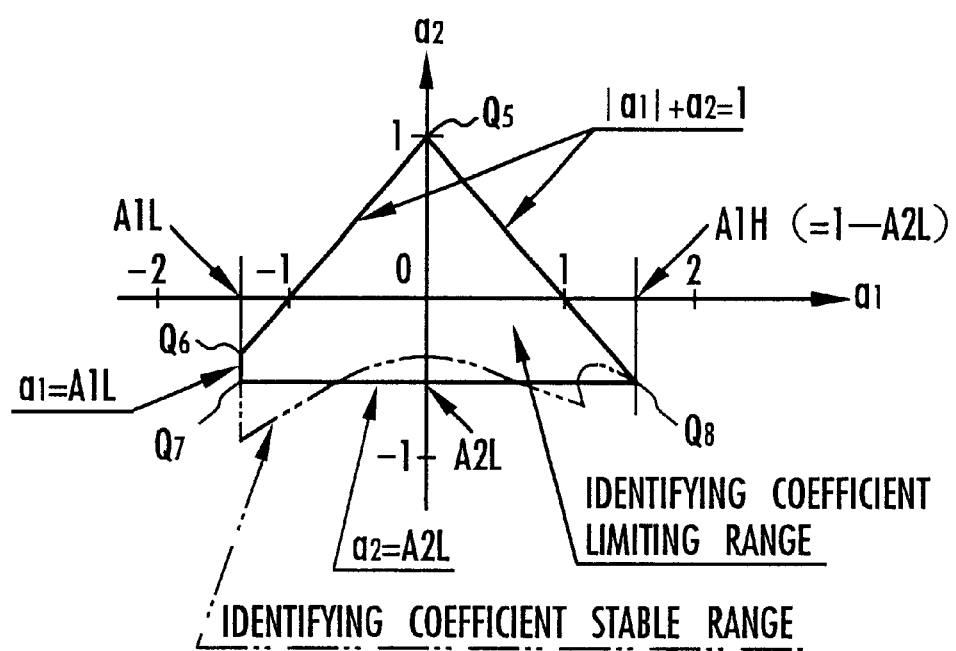
FIG. 16 is a diagram illustrating a partial process of the subroutine shown in FIG. 12.

Consequently, the first limiting condition for limiting the values of the identified gain coefficients a1 hat, a2 hat determined by the identifier 25 should preferably be basically established such that a point on the coordinate plane shown in FIG. 16 which is determined by those values of the identified gain coefficients a1 hat, a2 hat reside in the identifying coefficient stable range.

However, since a boundary (lower side) of the identifying coefficient stable range indicated by the imaginary lines in FIG. 16 is of a complex undulating shape, a practical process for limiting the point on the coordinate plane shown in FIG. 16 which is determined by the values of the identified gain coefficients a1 hat, a2 hat is liable to be complex.

For this reason, according to the present embodiment, the identifying coefficient stable range is substantially approximated by a quadrangular range $Q_5Q_6Q_7Q_8$ enclosed by the solid lines in FIG. 16, which has straight boundaries and will hereinafter be referred to as an identifying coefficient limiting range. As shown in FIG. 16, the identifying coefficient limiting range is a range enclosed by a polygonal line (including line segments $Q_5Q_6$ and $Q_5Q_8$) expressed by a functional expression |a1|+a2=1, a straight line (including a line segment $Q_6Q_7$) expressed by a constant-valued functional expression a1=A1L (A1L: constant), and a straight line (including a line segment $Q_7Q_8$) expressed by a constant-valued functional expression a2=A2L (A2L: constant). The first limiting condition for limiting the values of the identified gain coefficients a1 hat, a2 hat is established such that the point on the coordinate plane shown in FIG. 16 which is determined by those values of the identified gain coefficients a1 hat, a2 hat lies in the identifying coefficient limiting range, and the values of the identified gain coefficients a1 hat, a2 hat are limited such that the point determined by those values of the identified gain coefficients a1 hat, a2 hat lies in the identifying coefficient limiting range. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The above identifying coefficient limiting range is given for illustrative purpose only, and may be equal to or may substantially approximate the identifying coefficient stable range, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability. For example, while the boundary of an upper portion of the identifying coefficient limiting range is defined by the functional expression |a1|+a2=1 in the illustrated embodiment, combinations of the values of the gain coefficients a1, a2 which satisfy this functional expression are combinations of theoretical stable limits where a pole of the system defined by the equation (45) exists on a unit circle on a complex plane. Therefore, the boundary of the upper portion of the identifying coefficient limiting range may be determined by a functional expression |a1|+a2=r (r is a value slightly smaller than "1" corresponding to the stable limits, e.g., 0.99) for higher control stability.

The above identifying coefficient stable range shown in FIG. 16 as a basis for the identifying coefficient limiting range is given for illustrative purpose only. The identifying coefficient stable range which corresponds to the estimating coefficient stable range shown in FIG. 15 is affected by the dead time d (more precisely, its set value) and has its shape varied depending on the dead time d, as can be seen from the definition of the coefficient values α1, α2 (see the equation (12)). Irrespective of the shape of the identifying coefficient stable range, the identifying coefficient limiting range may be established, as described above, in a manner to match the shape of the identifying coefficient stable range.

In the present embodiment, the second limiting condition for limiting the value of the gain coefficient b1 identified by the identifier 25, i.e., the value of the identified gain coefficient b1 hat, is established as follows:

The inventors have found that the situation in which the time-depending change of the target air-fuel ratio KCMD is oscillatory at a high frequency tends to happen also when the value of the identified gain coefficient b1 hat is excessively large or small. According to the present embodiment, an upper limit value B1H and a lower limit value B1L (B1H>B1L>0) for the identified gain coefficient b1 hat are determined in advance through experimentation or simulation. Then, the second limiting condition is established such that the identified gain coefficient b1 hat is equal to or smaller than the upper limit value B1H and equal to or greater than the lower limit value B1L (B1L≦b1 hat≦B1H).

Figure 17:
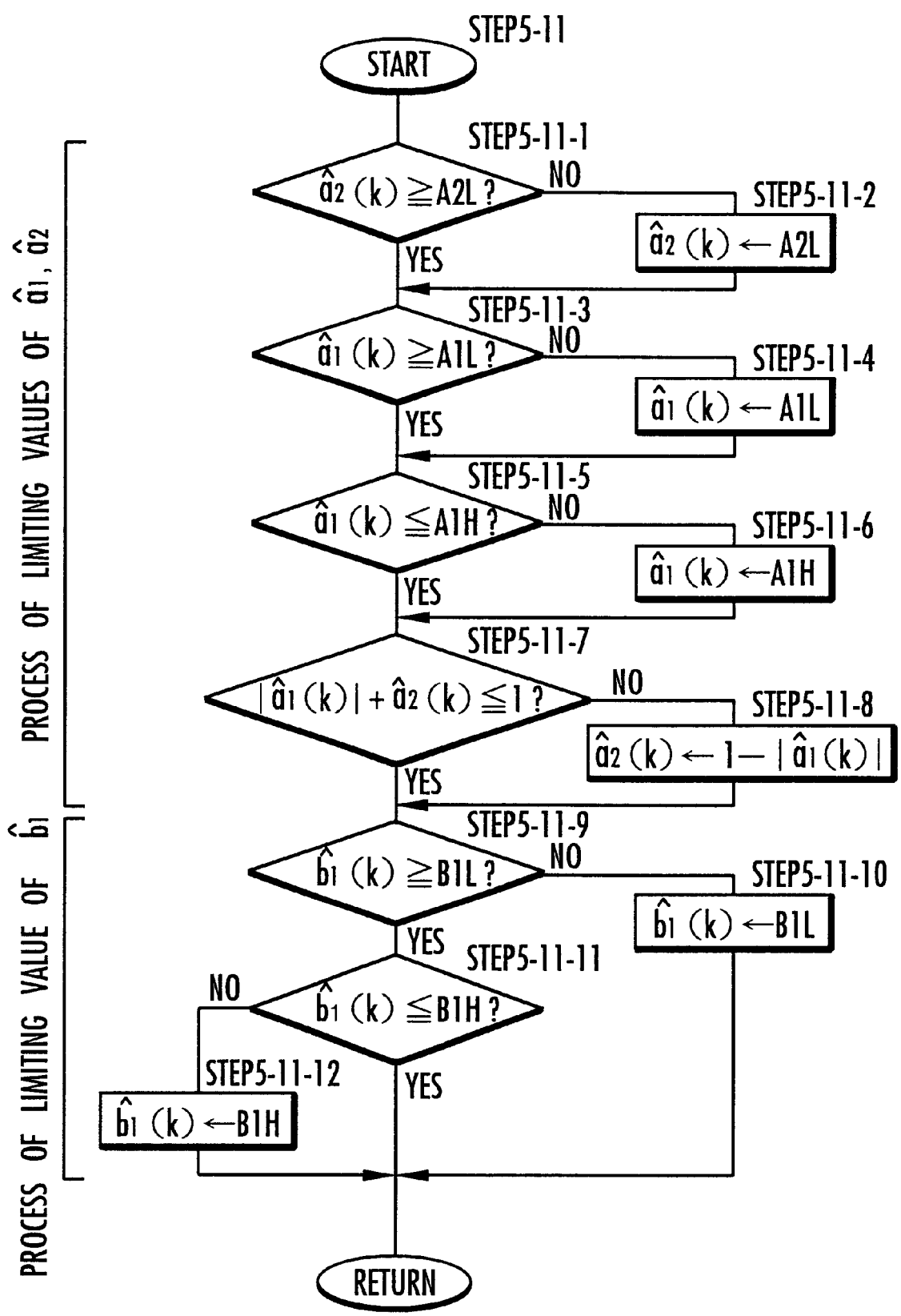
FIG. 17 is a diagram illustrating a subroutine of the subroutine shown in FIG. 12.

A process of limiting the values of the identified gain coefficients a1 hat, a2 hat, b1 hat according to the first and second limiting conditions is carried out by in STEP5-11 as follows:

As shown in FIG. 17, the identifier 25 limits combinations of the identified gain coefficients a1(k) hat, a2(k) hat determined in STEP5-10 shown in FIG. 12 according to the first limiting condition in STEP5-11-1 through STEP5-11-8.

Specifically, the identifier 25 decides whether or not the value of the identified gain coefficient a2(k) hat determined in STEP5-10 is equal to or greater than a lower limit value A2L (see FIG. 16) for the gain coefficient a2 in the identifying coefficient limiting range in STEP5-11-1.

If the value of the identified gain coefficient a2(k) is smaller than A2L, then since a point on the coordinate plane shown in FIG. 16, which is expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP5-11-2. Thus, the point (a1(k) hat, a2(k) hat) on the coordinate plane shown in FIG. 16 is limited to a point in a region on and above a straight line, i.e., the straight line including the line segment $Q_7Q_8$, expressed by at least a2=A2L.

Then, the identifier 25 decides whether or not the value of the identified gain coefficient a1(k) hat determined in STEP5-10 is equal to or greater than a lower limit value A1L (see FIG. 16) for the gain coefficient a1 in the identifying coefficient limiting range in STEP5-11-3, and then decides whether or not the value of the identified gain coefficient a1(k) hat is equal to or smaller than an upper limit value A1H (see FIG. 16) for the gain coefficient a1 in the identifying coefficient limiting range in STEP5-11-5. The upper limit value A1H for the gain coefficient a1 in the identifying coefficient limiting range is represented by A1H=1−A2L because it is an a1 coordinate of the point $Q_8$ where the polygonal line |a1|+a2=1 (a1>0) and the straight line a2=A2L intersect with each other, as shown in FIG. 16.

If the value of the identified gain coefficient a1(k) hat is smaller than the lower limit value A1L or greater than the upper limit value A1H, then since the point (a1(k) hat, a2(k) hat) on the coordinate plane shown in FIG. 16 does not reside in the identifying coefficient limiting range, the value of a1(k) hat is forcibly changed to the lower limit value A1L or the upper limit value A1H in STEP5-11-4, STEP5-11-6.

Thus, the point (a1(k) hat, a2(k) hat) on the coordinate plane shown in FIG. 16 is limited to a region on and between a straight line, i.e., the straight line including the line segment $Q_6A_7$, expressed by a1=A1L, and a straight line, i.e., the straight line passing through the point $Q_8$ and perpendicular to the a1 axis, expressed by a1=A1H.

The processing in STEP5-11-3 and STEP5-11-4 and the processing in STEP5-11-5 and STEP5-11-6 may be switched around. The processing in STEP5-11-1 and STEP5-11-2 may be carried out after the processing in STEP5-11-3 through STEP5-11-6.

Then, the identifier 25 decides whether the present values of a1(k) hat, a2(k) hat after STEP5-11-1 through STEP5-11-6 satisfy an inequality |a1|+a2≦1 or not, i.e., whether the point (a1(k) hat, a2(k) hat) is positioned on or below or on or above the polygonal line (including line segments $Q_5Q_6$ and $Q_5Q_8$) expressed by the functional expression |a1|+a2=1 in STEP5-11-7.

If |a1|+a2≦1, then the point (a1(k) hat, a2(k) hat) determined by the values of a1(k) hat, a2(k) hat after STEP5-11-1 through STEP5-11-6 exists in the identifying coefficient limiting range (including its boundaries).

If |a1|+a2>1, then since the point (a1(k) hat, a2(k) hat) deviates upwardly from the identifying coefficient limiting range, the value of the a2(k) hat is forcibly changed to a value (1−|a1(k) hat|) depending on the value of a1(k) hat in STEP5-11-8. Stated otherwise, while the value of a1(k) hat is being kept unchanged, the point (a1(k) hat, a2(k) hat) is moved onto a polygonal line expressed by the functional expression |a1|+a2=1, i.e., onto the line segment $Q_5Q_6$ or the line segment $Q_5Q_8$ which is a boundary of the identifying coefficient limiting range.

Through the above processing in STEP5-11-1 through 5-11-8, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP5-10 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP5-10 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 limits the identified gain coefficient b1(k) hat according to the second limiting condition in STEP5-11-9 through STEP5-11-12.

Specifically, the identifier 25 decides whether or not the value of the identified gain coefficient b1(k) hat determined in STEP5-10 is equal to or greater than the lower limit value B1L in STEP5-11-9. If the lower limit value B1L is greater than the value of the identified gain coefficient b1(k) hat, the value of b1(k) hat is forcibly changed to the lower limit value B1L in STEP5-11-10.

The identifier 25 decides whether or not the value of the identified gain coefficient b1(k) hat is equal to or smaller than the upper limit value B1H in STEP5-11-11. If the upper limit value B1H is greater than the value of the identified gain coefficient b1(k) hat, the value of b1(k) hat is forcibly changed to the upper limit value B1H in STEP5-11-12.

Through the above processing in STEP5-11-9 through 5-11-12, the value of the identified gain coefficient b1(k) hat is limited to a range between the lower limit value B1L and the upper limit value B1H.

After the identifier 25 has limited the combination of the values of the identified gain coefficients a1(k) hat, a2(k) hat and the identified gain coefficient b1(k) hat, control returns to the sequence shown in FIG. 12.

The preceding values a1(k−1) hat, a2(k−1) hat, b1(k−1) hat of the identified gain coefficients used for determining the identified gain coefficients a1(k) hat, a2(k) hat, b1(k) hat in STEP5-10 shown in FIG. 12 are the values of the identified gain coefficients limited according to the first and second limiting conditions in STEP5-11 in the preceding control cycle.

Referring back to FIG. 12, after having limited the identified gain coefficients a1(k) hat, a2(k) hat, b1(k) hat as described above, the identifier 25 determines the value of the flag f/id/mng set in the management process STEP5-6 in STEP5-12. If f/id/mng=1, then the identifier 25 updates the matrix P(k) according to the equation (10) for the processing of a next control cycle in STEP5-13, after which control returns to the main routine shown in FIG. 9. If f/id/mng=0, then since the values of the identified gain coefficients a1(k) hat, a2(k) hat, b1(k) hat have not been updated in STEP5-10, the identifier 25 maintains the present matrix P(k−1) as the matrix P(k) in STEP5-14, after which control returns to the main routine shown in FIG. 9.

The above process is the processing sequence of the identifier 25 which is carried out in STEP5 shown in FIG. 9.

After the processing sequence of the identifier 25 has been carried out as described above, the catalytic converter deterioration evaluator 28 performs its own processing sequence in STEP6 in FIG. 9. The processing sequence of the catalytic converter deterioration evaluator 28 will be described below with reference to FIG. 18.

The catalytic converter deterioration evaluator 28 determines the value of a flag F/DONE in STEP6-1. When the value of the flag F/DONE is "1", then it indicates that the evaluation of the deteriorated state of the catalytic converter 3 is completed during the present operation of the internal combustion engine 1, and when the value of the flag F/DONE is "0", then it indicates that the evaluation of the deteriorated state of the catalytic converter 3 is not completed during the present operation of the internal combustion engine 1. When the internal combustion engine 1 starts to operate, the value of the flag. F/DONE is initialized to "0".

If F/DONE=0, i.e., if the evaluation of the deteriorated state of the catalytic converter 3 is not completed, then the catalytic converter deterioration evaluator 28 performs a process of determining a varying state of the rate of flow of the exhaust gas discharged from the internal combustion engine 1 into the exhaust pipe 2 (herein-after referred to as "exhaust gas volume") in STEP6-2. More specifically, the catalytic converter deterioration evaluator 28 determines whether the exhaust gas volume is kept at a substantially constant level, i.e., in a cruise state, or not, and sets the value of a flag F/CRS. When the value of the flag F/CRS is "1", then it indicates that the exhaust gas volume is in the cruise state, and when the value of the flag F/CRS is "0", then it indicates that the exhaust gas volume is not in the cruise state. The process of determining a varying state of the exhaust gas volume is carried out in a period of 1 second, for example (hereinafter referred to as "exhaust gas volume variation determining period") longer than the period (30–100 ms) of the control cycles of the exhaust-side control unit 7a, and is shown in detail in FIG. 19.

Figure 19:
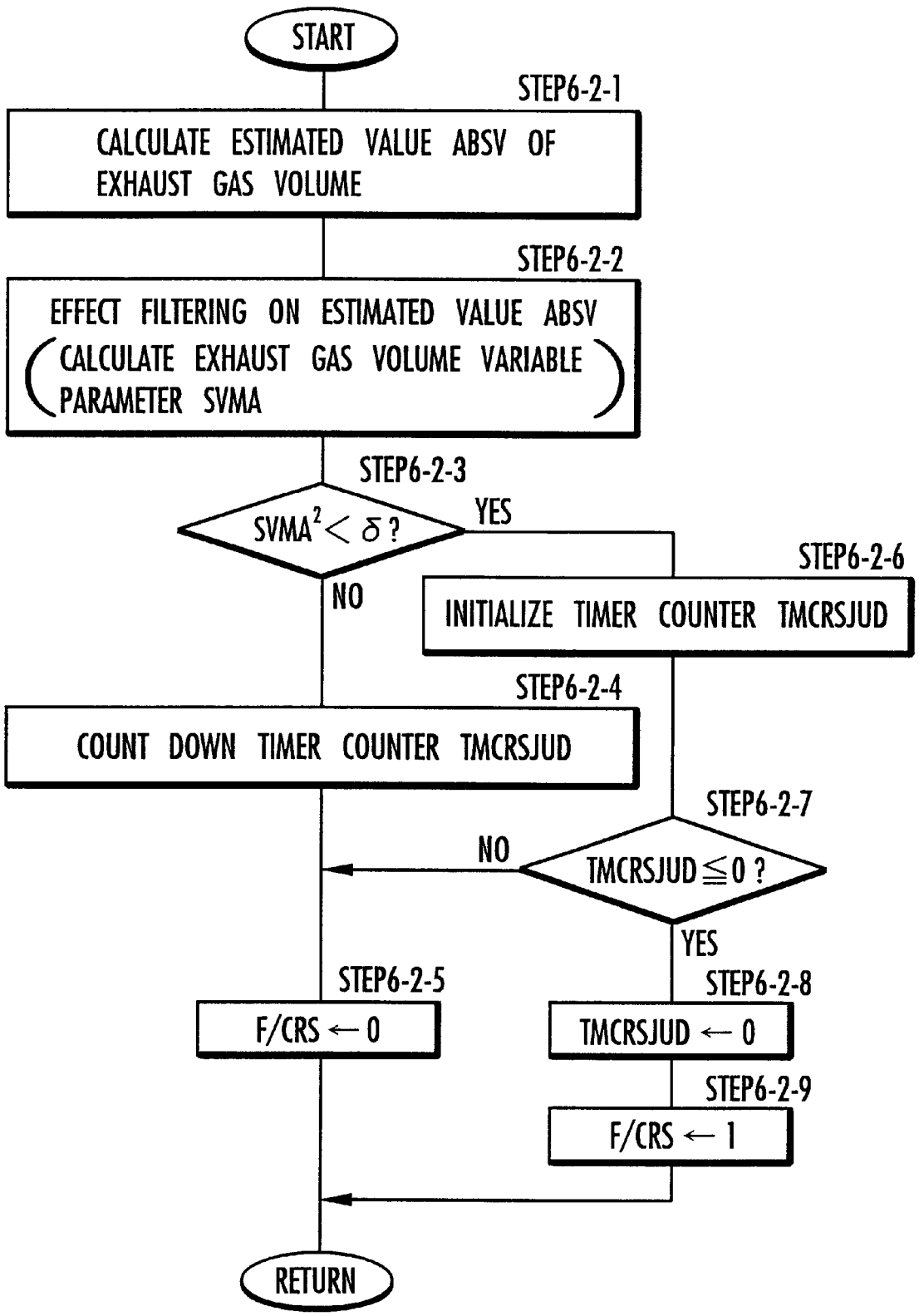
FIG. 19 is a flowchart of a subroutine of the subroutine shown in FIG. 18.
Figure 20:
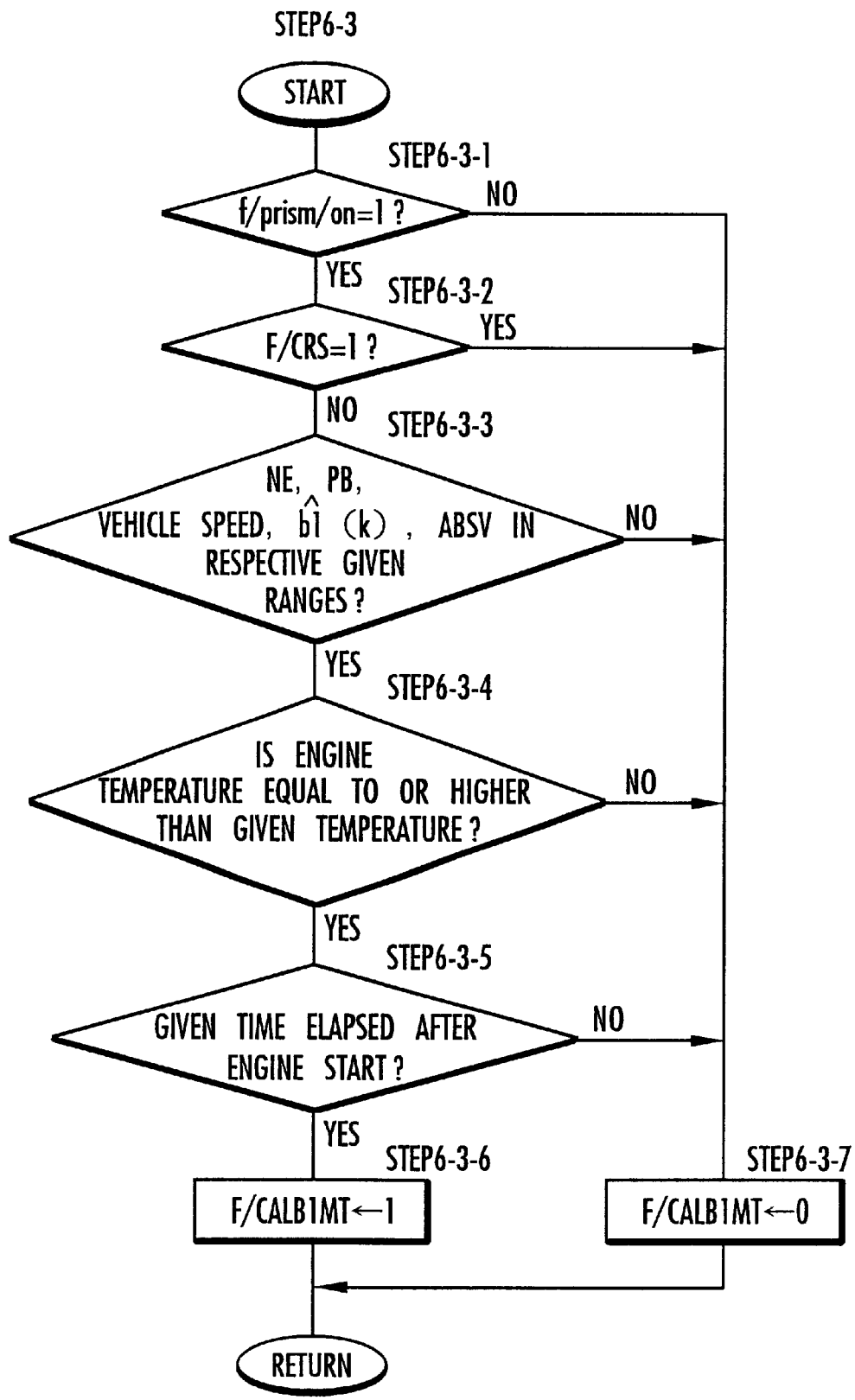
FIG. 20 is a flowchart of a subroutine of the subroutine shown in FIG. 18.
Figure 21:
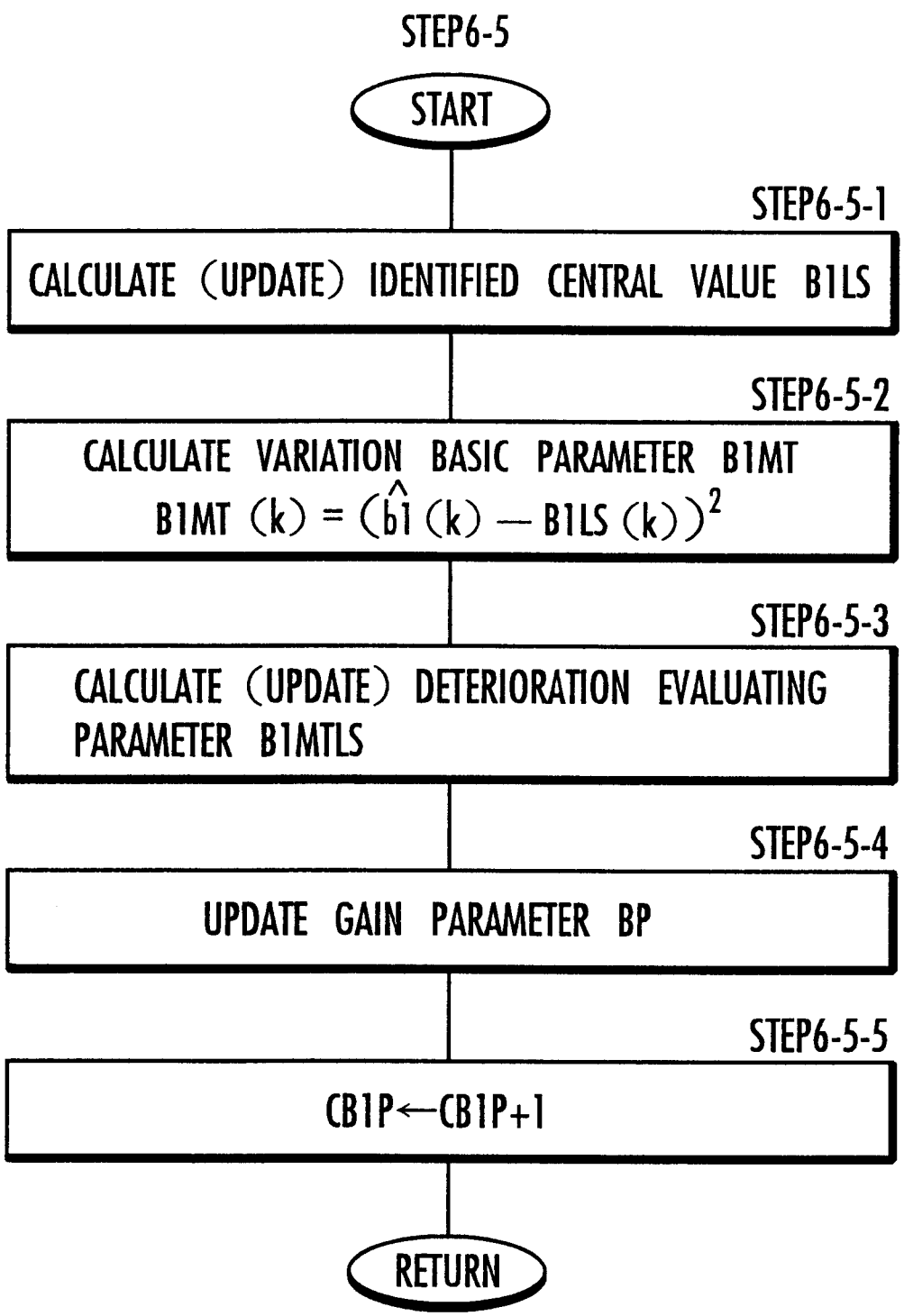
FIG. 21 is a flowchart of a subroutine of the subroutine shown in FIG. 18.
Figure 22:
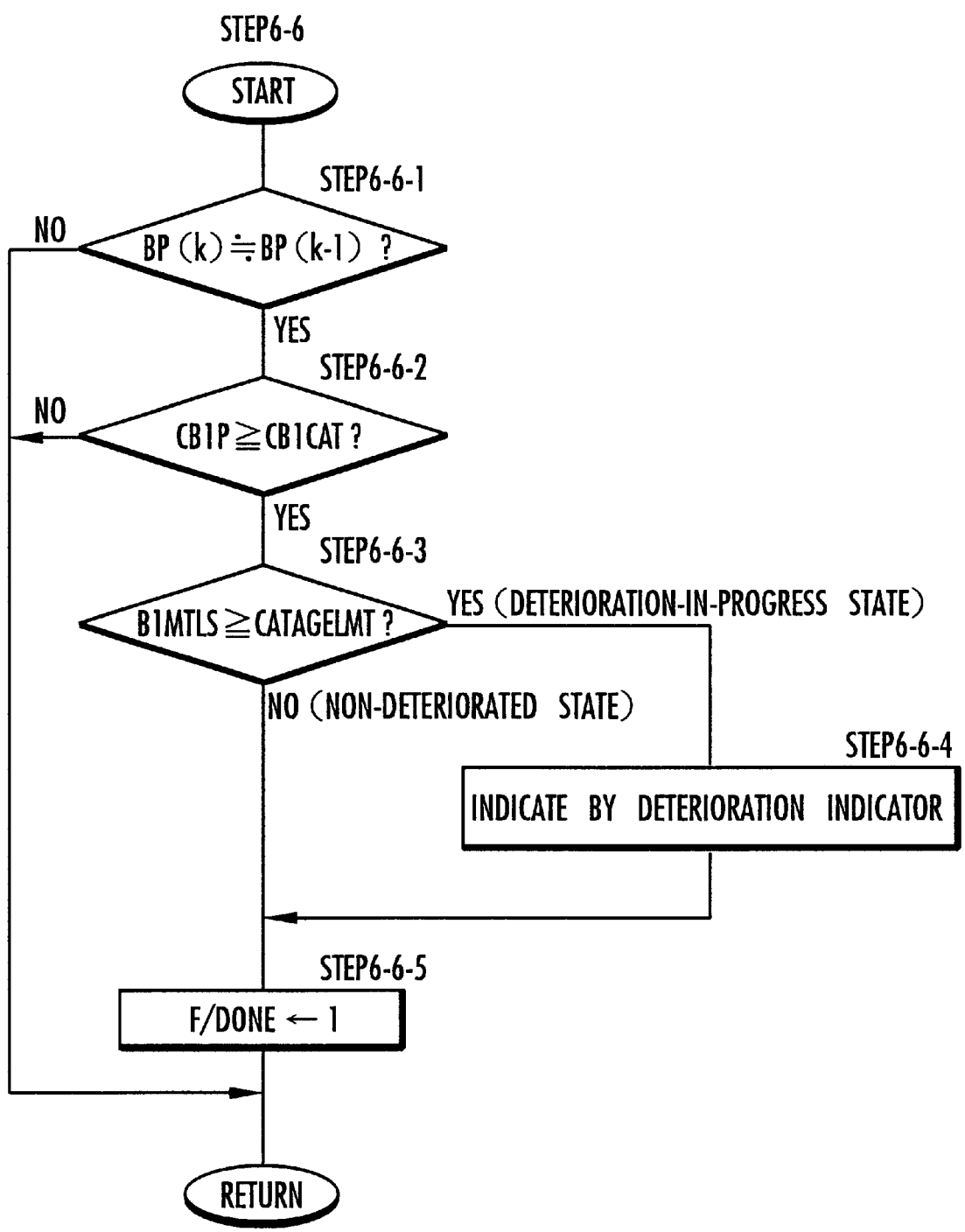
FIG. 22 is a flowchart of a subroutine of the subroutine shown in FIG. 18.

As shown in FIG. 19, the catalytic converter deterioration evaluator 28 calculates an estimated value ABSV of the present exhaust gas volume (hereinafter referred to as "estimated exhaust gas volume") from the detected data of the present rotational speed NE and intake pressure PB of the internal combustion engine 1 according to the following equation (47) in STEP6-2-1:

$$ABSV = \frac{NE}{1500} \cdot PB \cdot SVPRA \quad (47)$$

In the present embodiment, the exhaust gas volume when the rotational speed of the internal combustion engine 1 is 1500 rpm is used as a reference. Therefore, the detected value of the rotational speed NE is divided by "1500" in the above equation (47). In the equation (47), SVPRA represents a predetermined constant depending on the displacement of the internal combustion engine 1.

Instead of estimating the exhaust gas volume as described above, the exhaust gas volume may be estimated from the fuel supply quantity and intake air quantity of the internal combustion engine 1 or may be directly detected using a flow sensor.

Then, the catalytic converter deterioration evaluator 28 effects a predetermined filtering process on the estimated exhaust gas volume calculated in STEP6-2-1 in each exhaust gas volume variation determining period for thereby determining an exhaust gas volume variation parameter SVMA that represents the varying state of the exhaust gas volume in STEP6-2-2.

The above filtering process is expressed by the following equation (48):

$$SVMA = (ABSV(n) - ABSV(n-1)) + \quad (48)$$
$$(ABSV(n-2) - ABSV(n-3)) +$$
$$(ABSV(n-4) - ABSV(n-5))$$

Specifically, the exhaust gas volume variation parameter SVMA is calculated by determining a moving average of changes of the estimated exhaust gas volume ABSV over a plurality of exhaust gas volume variation determining periods (three exhaust gas volume variation determining periods in the present embodiment). In the equation (48), "n" represents the ordinal number of the cycle of the exhaust gas volume variation determining period.

The exhaust gas volume variation parameter SVMA thus calculated represents a rate of change in the estimated exhaust gas volume ABSV. Consequently, as the value of the exhaust gas volume variation parameter SVMA is closer to "0", the time-dependent change of the estimated exhaust gas volume ABSV is smaller, i.e., the estimated exhaust gas volume ABSV is substantially constant.

Then, the catalytic converter deterioration evaluator 28 compares the square of the exhaust gas volume variation parameter SVMA, i.e., the square $SVMA^2$, with a predetermined value $\delta$ in STEP6-2-3. The predetermined value $\delta$ is a positive value near "0".

If $SVMA^2 \geq \delta$, i.e., if the present exhaust gas volume suffers a relatively large variation, then the catalytic converter deterioration evaluator 28 sets the value of a timer counter (count-down timer) TMCRSJUD to a predetermined initial value X/TMCRSJST in STEP6-2-4. As the exhaust gas volume is not in the cruise state, i.e., the exhaust gas volume is not kept at a substantially constant level, the catalytic converter deterioration evaluator 28 sets the flag F/CRS to "0" in STEP6-2-5, after which control returns to the routine shown in FIG. 18.

If $SVMA^2 < \delta$ in STEP6-2-3, i.e., if the present exhaust gas volume suffers a relatively small variation, then the catalytic converter deterioration evaluator 28 counts down the value of the timer counter TMCRSJUD by a predetermined value in each exhaust gas volume variation determining period as long as the present exhaust gas volume suffers a relatively small variation, in STEP6-2-6. Then, the catalytic converter deterioration evaluator 28 determines whether or not the value of the timer counter TMCRSJUD becomes "0" or smaller, i.e., whether the set time of timer counter TMCRSJUD has elapsed or not, in STEP6-2-7.

If TMCRSJUD≦0, i.e., if the set time of the timer counter TMCRSJUD has elapsed, then the catalytic converter deterioration evaluator 28 decides that the exhaust gas volume is in the cruise state, and holds the value of the timer counter TMCRSJUD to "0" in STEP6-2-8. Then, the catalytic converter deterioration evaluator 28 sets the value of the flag F/CRS to "1" in STEP6-2-9, after which control returns to the routine shown in FIG. 18.

Figure 18:
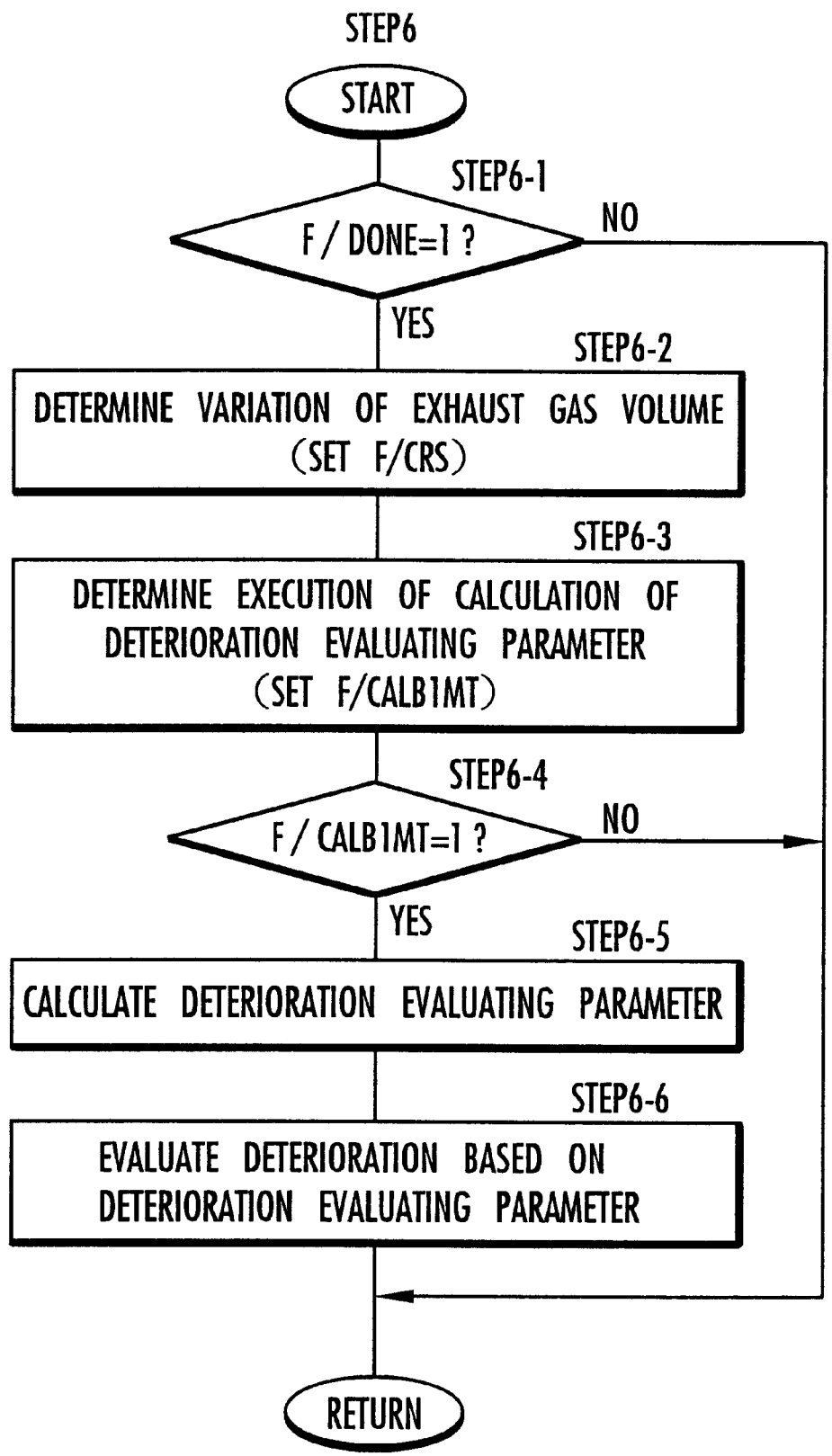
FIG. 18 is a flowchart of a subroutine of the main routine shown in FIG. 9.

If TMCRSJUD>0 in STEP6-2-7, i.e., if the set time of the timer counter TMCRSJUD has not elapsed, then the catalytic converter deterioration evaluator 28 sets the value of the flag F/CRS to "0" in STEP6-2-5, after which control returns to the routine shown in FIG. 18.

The processing sequence described above with reference to FIG. 19 represents the processing in STEP6-2 shown in FIG. 18. According to the processing in STEP6-2, if the square $SVMA^2$ of the exhaust gas volume variation parameter SVMA is $SVMA^2 < \delta$, i.e., the variation of the exhaust gas volume is small, continuously for a time, e.g., 10 to 15 seconds, corresponding to the initial value X/TMCRSJST of the timer counter TMCRSJUD, the catalytic converter deterioration evaluator 28 decides that the exhaust gas volume is in the cruise state, and sets the value of the flag F/CRS to "1". Otherwise, the catalytic converter deterioration evaluator 28 decides that the exhaust gas volume is not in the cruise state, and sets the value of the flag F/CRS to "0".

The processing in STEP6-2 allows a proper recognition of the state in which the exhaust gas volume is maintained at a substantially constant level. In each control cycle of the exhaust-side control unit 7a in one exhaust gas volume variation determining period, the value of the flag F/CRS is kept constant.

Referring back to FIG. 18, the catalytic converter deterioration evaluator 28 performs a process of determining whether a condition to calculate the deterioration evaluating parameter B1MTLS (hereinafter referred to as "deterioration evaluating condition") is satisfied or not, or specifically a process of setting a flag F/CALB1MT in STEP6-3. When the value of the flag F/CALB1MT is "1", it indicates that the deterioration evaluating condition is satisfied, and when the value of the flag F/CALB1MT is "0", it indicates that the deterioration evaluating condition is not satisfied. The process in STEP6-3 will be described in detail below with reference to FIG. 20.

The catalytic converter deterioration evaluator 28 determines the value of the flag f/prism/on that is set by the engine-side control unit 7b in STEPd shown in FIG. 8 in STEP6-3-1. If f/prism/on=0, i.e., if the internal combustion engine 1 is in an operating state in which the target air-fuel ratio KCMD determined by the exhaust-side main processor 13 is not used for the control of fuel in the internal combustion engine 1, e.g., if the internal combustion engine 1 is operating with a lean air-fuel mixture, then the catalytic converter deterioration evaluator 28 decides that the deterioration evaluating condition is not satisfied, and sets the flag F/CALB1MT to "0" in STEP6-3-7.

This is because if f/prism/on=0, it is often unable to obtain the identified gain coefficient b1 hat which properly reflects the deteriorated state of the catalytic converter 3.

If f/prism/on=1, then the catalytic converter deterioration evaluator 28 determines the value of the flag F/CRS set in STEP6-2 in STEP6-3-2. If F/CRS=1, i.e., if the exhaust gas volume is in the cruise state, then the catalytic converter deterioration evaluator 28 decides that the deterioration evaluating condition is not satisfied, and sets the flag F/CALB1MT to "0" in STEP6-3-7.

Specifically, in the cruise state, the outputs of the $O_2$ sensor 6 and the LAF sensor 5 tend to be stably kept in a steady state, i.e., in a substantially constant level. Therefore, even when the deterioration of the catalytic converter 3 progresses, the identified gain coefficients a1 hat, a2 hat, b1 hat determined by the identifier 25 are unlikely to vary. Thus, the value of the identified gain coefficient b1 hat used as a basis for the deterioration evaluating parameter B1MTLS does not tend to reflect the effect of the deteriorated state of the catalytic converter 3. In the cruise state, therefore, the catalytic converter deterioration evaluator 28 decides that the deterioration evaluating condition is not satisfied, and sets the flag F/CALB1MT to "0".

Then, the catalytic converter deterioration evaluator 28 determines in STEP6-3-3 whether the present rotational speed NE and intake pressure PB of the internal combustion engine 1, the latest identified gain coefficient b1(k) hat determined by the identifier 25 in STEP5, and the present estimated exhaust gas volume ABSV determined in STEP6-2 fall in respective given ranges, i.e., ranges of ordinary values, or not in STEP6-3-3. The catalytic converter deterioration evaluator 28 determines whether or not the temperature of the internal combustion engine 1, i.e., the coolant temperature, is a temperature equal to or higher than a predetermined temperature, i.e., a normal temperature after the internal combustion engine 1 has been warmed up, in STEP6-3-4. The catalytic converter deterioration evaluator 28 determines whether a given time has elapsed after the start of the internal combustion engine 1, i.e., a state right after the start of the internal combustion engine 1 has been over, or not in STEP6-3-5.

If the conditions of STEP6-3-3 through STEP6-3-5 are not satisfied, then since the identified gain coefficient b1 hat suitable for calculating the deterioration evaluating parameter B1MTLS may not be obtained, the catalytic converter deterioration evaluator 28 decides that the deterioration evaluating condition is not satisfied and sets the flag F/CALB1MT to "1" in STEP6-3-7.

If f/prism/on=1 in STEP6-3-1, if F/CRS=0 in STEP6-3-2, and also if the conditions of STEP6-3-3 through STEP6-3-5 are satisfied, then the catalytic converter deterioration evaluator 28 decides that the deterioration evaluating condition is satisfied and sets the flag F/CALB1MT to "1" in STEP6-3-6. Specifically, if the fuel in the internal combustion engine 1 is controlled depending on the target air-fuel ratio KCMD determined by the sliding mode controller 27, if the exhaust gas volume of the internal combustion engine 1 is not in the cruise sate, and if the rotational speed NE and other parameters of the internal combustion engine 1 are in an ordinary state, then the catalytic converter deterioration evaluator 28 decides that the deterioration evaluating condition is satisfied and sets the flag F/CALB1MT to "1".

Referring back to FIG. 18, the catalytic converter deterioration evaluator 28 determines the value of the flag F/CALB1MT thus set in STEP6-4. If F/CALB1MT=0, i.e., if the deterioration evaluating condition is not satisfied, then the catalytic converter deterioration evaluator 28 does not calculate the deterioration evaluating parameter B1MTLS, and control returns to the main routine shown in FIG. 9.

If F/CALB1MT=1, i.e., if the deterioration evaluating condition is satisfied, then the catalytic converter deterioration evaluator 28 calculates the deterioration evaluating parameter B1MTLS in STEP6-5. The process of calculating the deterioration evaluating parameter B1MTLS will be described below with reference to FIG. 21.

The catalytic converter deterioration evaluator 28 calculates (updates) the identified central value B1LS which is a central value of the identified gain coefficient b1 hat according to the equation (29) in STEP6-5-1. Specifically, the catalytic converter deterioration evaluator 28 calculates a new identified central value B1LS(k) according to the equation (29) from the value b1(k) of the identified gain coefficient b1 hat determined in STEP5 in the present control cycle of the exhaust-side control unit 7a, the present value B1LS(k−1) of the identified central value B1LS (the value determined in the preceding control cycle), and the present value BP(k−1) of the gain parameter BP determined by the recursive formula according to the equation (30) (the value determined in the preceding control cycle). Thus, the identified central value B1LS is sequentially up-dated in each control cycle of the exhaust-side control unit 7a.

The catalytic converter deterioration evaluator 28 then determines the square B1MT(k) of the difference between the present value b1(k) of the identified gain coefficient b1 hat and the identified central value B1LS(k) determined in STEP6-5-1, i.e., the variation basic parameter B1MT(k), according to the equation (31) in STEP6-5-2.

Then, the catalytic converter deterioration evaluator 28 calculates (updates) the deterioration evaluating parameter B1MTLS which is a central value of the variation basic parameter B1MT according to the equation (32) in STEP6-5-3. Specifically, the catalytic converter deterioration evaluator 28 calculates a new deterioration evaluating parameter B1MTLS(k) according to the equation (32) from the variation basic parameter B1MT(k) determined in STEP6-5-2, the present value B1MTLS(k−1) of the deterioration evaluating parameter B1MTLS (the value determined in the preceding control cycle), and the present value BP(k−1) of the gain parameter BP determined by the recursive formula according to the equation (30) (the value determined in the preceding control cycle). In this manner, the deterioration evaluating parameter B1MTLS is sequentially updated in each control cycle of the exhaust-side control unit 7a.

The catalytic converter deterioration evaluator 28 updates the value of the gain parameter BP according to the equation (30) in STEP6-5-4. Thereafter, the catalytic converter deterioration evaluator 28 increments, by "1", the value of a counter CB1P which counts the number of times that the deterioration evaluating parameter B1MTLS and the gain parameter BP are updated, which number corresponds to the number of values of the identified gain coefficient b1 hat used to determine the deterioration evaluating parameter B1MTLS, in STEP6-5-5. Thereafter, control returns to the main routine shown in FIG. 18.

The values of the identified central value B1LS, the deterioration evaluating parameter B1MTLS, and the gain parameter BP which are determined respectively in STEP6-5-1, STEP6-5-3, and STEP6-5-4 are stored in a nonvolatile memory such as an EEPROM or the like (not shown) when the internal combustion engine 1 is shut off, so that those values will not be lost when the internal combustion engine 1 is not operating. When the internal combustion engine 1 operates next time, the stored values of the identified central value B1LS, the deterioration evaluating parameter B1MTLS, and the gain parameter BP are used as their initial values. The initial values of the identified central value B1LS, the deterioration evaluating parameter B1MTLS, and the gain parameter BP at the time the internal combustion engine 1 operates for the first time are "0.2", "0", and "1", respectively. The value of the counter CB1P is initialized to "0" at the time of the startup of the internal combustion engine 1.

In FIG. 18, after calculating (updating) the value of the deterioration evaluating parameter B1MTLS as described above, the catalytic converter deterioration evaluator 28 evaluates the deteriorated state of the catalytic converter 3 based on the deterioration evaluating parameter B1MTLS in STEP6-6. The process of evaluating the deteriorated state of the catalytic converter 3 will be described below with reference to FIG. 22.

The catalytic converter deterioration evaluator 28 determines whether the present value BP(k) of the gain parameter BP and the preceding value BP(k−1) thereof are substantially equal to each other or not, i.e., whether the gain parameter BP has substantially been converged or not, in STEP6-6-1, and then determines whether or not the value of the counter CB1P is equal to or greater than a predetermined value CB1CAT, i.e., whether the number of values of the identified gain coefficient b1 hat used to determine the deterioration evaluating parameter B1MTLS has reached the predetermined value CB1CAT or not, in STEP6-6-2.

In the present embodiment, if the data of the identified central value B1LS, the deterioration evaluating parameter B1MTLS, and the gain parameter BP are not held, i.e., if the values thereof are initialized to "0", as when the battery of the vehicle (not shown) is temporarily removed before the internal combustion engine 1 is started or as when the internal combustion engine 1 operates for the first time, then the predetermined value to be compared with the value of the counter CB1P in STEP6-6-2 is set to a value greater than if the data of the identified central value B1LS, the deterioration evaluating parameter B1MTLS, and the gain parameter BP are held.

If either of the conditions in STEP6-6-1 and STEP6-6-2 is not satisfied, then the deterioration evaluating parameter B1MTLS determined in STEP6-5 in the present control cycle is considered to be not sufficiently converged to the central value of the variation basic parameter B1MT. Therefore, the processing in STEP6-6 is finished without evaluating the deteriorated state of the catalytic converter 3 based on the deterioration evaluating parameter B1MTLS.

If either of the conditions in STEP6-6-1 and STEP6-6-2 is satisfied, then since the deterioration evaluating parameter B1MTLS determined in STEP6-5 in the control cycle is representative of the central value of the variation basic parameter B1MT, the catalytic converter deterioration evaluator 28 compares the deterioration evaluating parameter B1MTLS with the threshold CATAGELMT shown in FIG. 6 in STEP6-6-3.

If B1MTLS≧CATAGELMT, then the catalytic converter deterioration evaluator 28 decides that the deteriorated state of the catalytic converter 3 is in the deterioration-in-progress state in which it needs to be replaced immediately or soon. The catalytic converter deterioration evaluator 28 controls the deterioration indicator 29 to indicate the deteriorated state of the catalytic converter 3 in STEP6-6-4. After setting the value of the flag F/DONE to "1", indicating that the evaluation of the deteriorated state of the catalytic converter 3 is completed, in STEP6-6-5, the processing in STEP6-6 is finished.

If B1MTLS<CATAGELMT in STEP6-6-3, since the catalytic converter 3 is in the non-deteriorated state, the catalytic converter deterioration evaluator 28 does not control the deterioration indicator 29, but sets the value of the flag F/DONE to "1" in STEP6-6-5. The processing in STEP6-6 is now finished.

The above processing represents the process that is carried out by the catalytic converter deterioration evaluator 28 in STEP6 shown in FIG. 9.

In FIG. 9, after the processing of the catalytic converter deterioration evaluator 28 has been carried out, the exhaust-side main processor 13 determines the values of the gain coefficients a1, a2, b1 in STEP7. Specifically, if the value of the flag f/id/cal set in STEP2 is "1", i.e., if the gain coefficients a1, a2, b1 have been identified by the identifier 25, then the gain coefficients a1, a2, b1 are set to the latest identified gain coefficients a1(k) hat, a2(k) hat, b1(k) hat determined by the identifier 25 in STEP5 (limited in STEP5-11). If the value of the flag f/id/cal is "0", i.e., if the gain coefficients a1, a2, b1 have not been identified by the identifier 25, then the gain coefficients a1, a2, b1 are set to predetermined values, respectively.

Then, the exhaust-side main processor 13 effects a processing operation of the estimator 26, i.e., calculates the estimated differential output VO2 bar, in STEP8.

The estimator 26 calculates the coefficients α1, α2, βj (j=1, 2, ..., d) to be used in the equation (13), using the gain coefficients a1, a2, b1 determined in STEP7 (these values are basically the identified gain coefficients a1 hat, a2 hat, b1 hat) as described above.

Then, the estimator 26 calculates the estimated differential output VO2(k+d) bar (the estimated value of the differential output VO2 after the total dead time d from the time of the present control cycle) according to the equation (13), using the time-series data VO2(k), VO2(k−1), from before the present control cycle, of the differential output VO2 of the $O_2$ sensor calculated in each control cycle in STEP3, the time-series data kact(k−j) (j=0, . . . d1), from before the present control cycle, of the differential output kact of the LAF sensor 5, the time-series data kcmd(k−j) (=Usl(k−j), j=1, . . . , d2−1), from before the preceding control cycle, of the target differential air-fuel ratio kcmd (=the SLD manipulating input Usl) given in each control cycle from the sliding mode controller 27, and the coefficients α1, α2, βj calculated as described above.

Then, the exhaust-side main processor 13 calculates the SLD manipulating input Usl (=the target differential air-fuel ratio kcmd) with the sliding mode controller 27 in STEP9.

Specifically, the sliding mode controller 27 calculates a value σ(k+d) bar (corresponding to an estimated value, after the total dead time d, of the linear function σ defined according to the equation (15)), after the total dead time d from the present control cycle, of the switching function σ bar defined according to the equation (25), using the time-series data VO2(k+d) bar, VO2(k+d−1) bar of the estimated differential output VO2 bar (the present and preceding values of the estimated differential output VO2 bar) determined by the estimator 26 in STEP8.

At this time, the sliding mode controller 27 keeps the value of the switching function σ bar within a predetermined allowable range. If the value σ(k+d) bar determined as described above exceeds the upper or lower limit of the allowable range, then the sliding mode controller 27 forcibly limits the value σ(k+d) bar to the upper or lower limit of the allowable range. This is because if the value of the switching function σ bar were excessive, the reaching control law input Urch would be excessive, and the adaptive control law Uadp would change abruptly, tending to impair the stability of the process of converging the output VO2/OUT of the $O_2$ sensor 6 to the target value VO2/TARGET.

Then, the sliding mode controller 27 accumulatively adds values σ(k+d) bar·ΔT, produced by multiplying the value σ(k+d) bar of the switching function σ bar by the period ΔT (constant period) of the control cycles of the exhaust-side control unit 7a. That is, the sliding mode controller 27 adds the product σ(k+d) bar·ΔT of the value σ(k+d) bar and the period ΔT calculated in the present control cycle to the sum determined in the preceding control cycle, thus calculating an integrated value σ bar (hereinafter represented by "Σσ bar") which is the calculated result of the term Σ(σ bar·ΔT) of the equation (27).

In the present embodiment, the sliding mode controller 27 keeps the integrated value Σσ bar in a predetermined allowable range. If the integrated value Σσ bar exceeds the upper or lower limit of the allowable range, then the sliding mode controller 27 forcibly limits the integrated value Σσ bar to the upper or lower limit of the allowable range. This is because if the integrated value Σσ bar were excessive, the adaptive control law uadp determined according to the equation (27) would be excessive, tending to impair the stability of the process of converging the output VO2/OUT of the $O_2$ sensor 6 to the target value VO2/TARGET.

Then, the sliding mode controller 27 calculates the equivalent control input Ueq, the reaching control law input Urch, and the adaptive control law Uadp according to the respective equations (24), (26), (27), using the time-series data VO2(k+d)bar, VO2(k+d−1) bar of the present and past values of the estimated differential output VO2 bar determined by the estimator 26 in STEP8, the value σ(k+d) bar of the switching function σ and its integrated value Σσ bar which are determined as described above, and the gain coefficients a1, a2, b1 determined in STEP 7 (these values are basically the latest identified gain coefficients a1(k) hat, a2(k) hat, b1(k) hat).

The sliding mode controller 27 then adds the equivalent control input Ueq, the reaching control law input Urch, and the adaptive control law Uadp to calculate the SLD manipulating input Usl, i.e., the input (=the target differential air-fuel ratio kcmd) to be applied to the object exhaust system E for converging the output signal VO2/OUT of the $O_2$ sensor 6 toward the target value VO2/TARGET.

The above process represents the processing in STEP9.

After the SLD manipulating input Usl has been calculated, the exhaust-side main processor 13 determines the stability of the adaptive sliding mode control process carried out by the sliding mode controller 27, or more specifically, the ability of the controlled state of the output VO2/OUT of the $O_2$ sensor 6 based on the adaptive sliding mode control process (hereinafter referred to as "SLD controlled state"), and sets a value of a flag f/sld/stb indicative of whether the SLD controlled state is stable or not in STEP10. The value of the flag f/sld/stb is "1" if the SLD controlled state is stable, and "0" otherwise.

Figure 23:
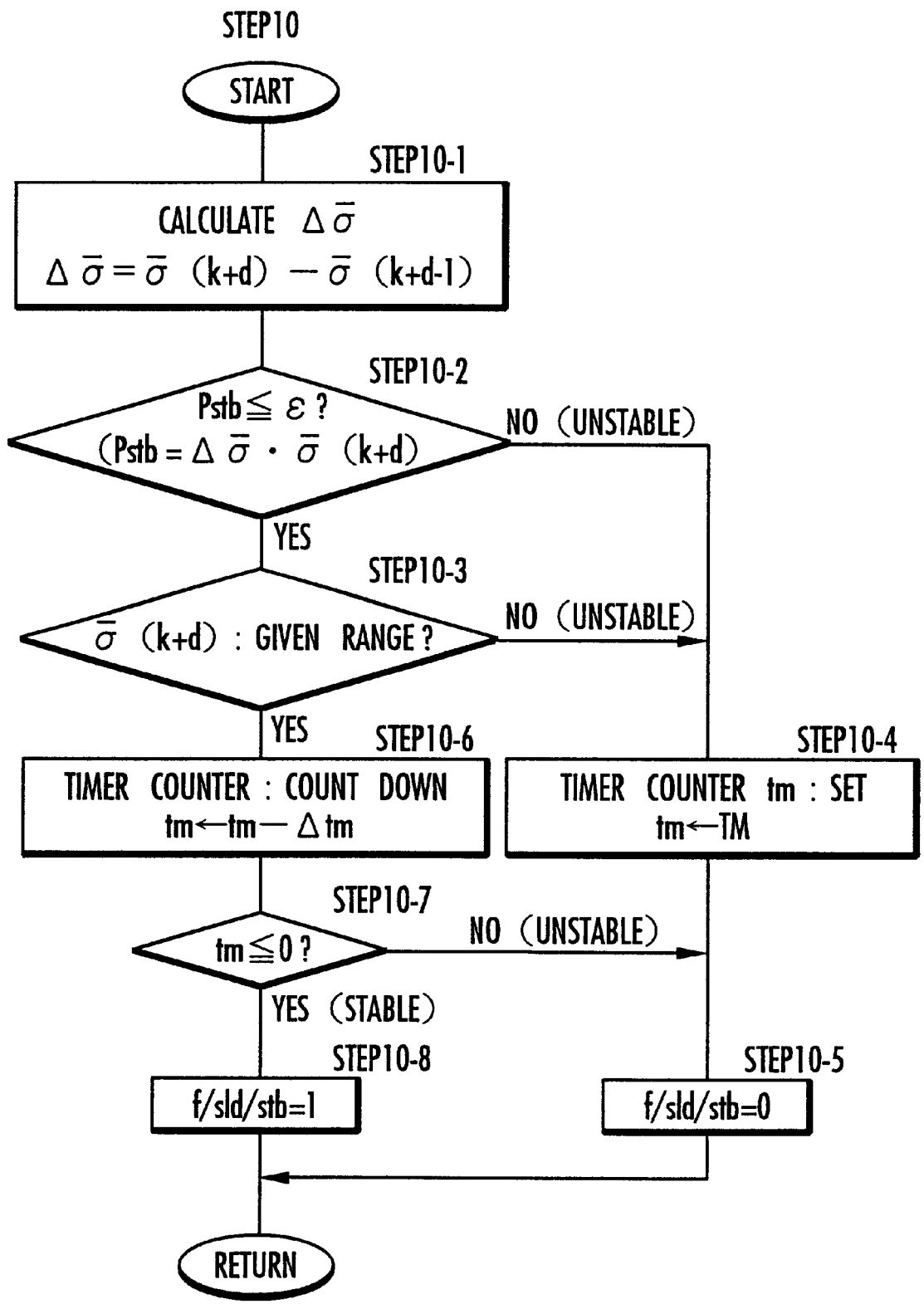
FIG. 23 is a flowchart of a subroutine of the main routine shown in FIG. 9.

The determining subroutine of STEP10 is shown in detail in FIG. 23.

As shown in FIG. 23, the exhaust-side main processor 13 calculates a difference Δσ bar (corresponding to a rate of change of the switching function σ bar) between the present value σ(k+d) bar of the switching function σ bar calculated in STEP9 and a preceding value σ(k+d−1) bar thereof in STEP10-1.

Then, the exhaust-side main processor 13 decides whether or not a product Δσ bar·σ(k+d) bar (corresponding to the time-differentiated function of a Lyapunov function σ bar$^2$/2 relative to the σ bar) of the difference Δσ bar and the present value σ(k+d) bar is equal to or smaller than a predetermined value ε (≧0) in STEP10-2.

The difference Δσ bar·σ(k+d) bar (hereinafter referred to as "stability determining parameter Pstb") will be described below. If the stability determining parameter Pstb is greater than 0 (Pstb>0), then the value of the switching function σ bar is basically changing away from "0". If the stability determining parameter Pstb is equal to or smaller than 0 (Pstb≦0), then the value of the switching function σ bar is basically converged or converging to "0". Generally, in order to converge a controlled variable to its target value according to the sliding mode control process, it is necessary that the value of the switching function be stably converged to "0". Basically, therefore, it is possible to determine whether the SLD controlled state is stable or unstable depending on whether or not the value of the stability determining parameter Pstb is equal to or smaller than 0.

If, however, the stability of the SLD controlled state is determined by comparing the value of the stability determining parameter Pstb with "0", then the determined result of the stability is affected even by slight noise contained in the value of the switching function σ bar. According to the present embodiment, therefore, the predetermined value ε with which the stability determining parameter Pstb is to be compared in STEP10-2 is of a positive value slightly greater than "0".

If Pstb>ε in STEP10-2, then the SLD controlled state is judged as being unstable, and the value of a timer counter tm (count-down timer) is set to a predetermined initial value $T_M$ (the timer counter tm is started) in order to inhibit the determination of the target air-fuel ratio KCMD using the SLD manipulating input Usl calculated in STEP9 for a predetermined time in STEP10-4. Thereafter, the value of the flag f/sld/stb is set to "0" in STEP10-5, after which control returns to the main routine shown in FIG. 9.

If Pstb≦ϵ in STEP10-2, then the exhaust-side main processor 13 decides whether the present value σ(k+d) bar of the switching function σ bar falls within a predetermined range or not in STEP10-3.

If the present value σ(k+d) bar of the switching function σ bar does not fall within the predetermined range, then since the present value σ(k+d) bar spaced widely apart from "0", the SLD controlled state is considered to be unstable. Therefore, if the present value σ(k+d) bar of the switching function σ bar does not fall within the predetermined range in STEP10-3, then the SLD controlled state is judged as being unstable,.and the processing of STEP10-4 and STEP10-5 is executed to start the timer counter tm and set the value of the flag f/sld/stb to "0".

In the present embodiment, since the value of the switching function σ bar is limited within the allowable range in STEP9, the decision processing in STEP10-3 may be dispensed with.

If the present value σ(k+d) bar of the switching function σ bar falls within the predetermined range in STEP10-3, then the exhaust-side main processor 13 counts down the timer counter tm for a predetermined time Δtm in STEP10-6. The exhaust-side main processor 13 then decides whether or not the value of the timer counter tm is equal to or smaller than "0", i.e., whether a time corresponding to the initial value $T_M$ has elapsed from the start of the timer counter tm or not, in STEP10-7.

If tm>0, i.e., if the timer counter tm is still measuring time and its set time has not yet elapsed, then since no substantial time has elapsed after the SLD controlled state is judged as unstable in STEP10-2 or STEP10-3, the SLD controlled state tends to become unstable. Therefore, if tm>0 in STEP10-7, then the value of the flag f/sld/stb is set to "0" in STEP10-5.

If tm≦0 in STEP10-7, i.e., if the set time of the timer counter tm has elapsed, then the SLD controlled stage is judged as being stable, and the value of the flag f/sld/stb is set to "1" in STEP10-8.

According to the above processing, if the SLD controlled state is judged as being unstable, then the value of the flag f/sld/stb is set to "0", and if the SLD controlled state is judged as being stable, then the value of the flag f/sld/stb is set to "1".

In the present embodiment, the above process of determining the stability of the SLD controlled state is by way of illustrative example only. The stability of the SLD controlled state may be determined by any of various other processes. For example, in each given period longer than the control cycle, the frequency with which the value of the stability determining parameter Pstb in the period is greater than the predetermined value ϵ is counted. If the frequency is in excess of a predetermined value, then the SLD controlled state is judged as unstable. Otherwise, the SLD controlled state is judged as stable.

Referring back to FIG. 9, after a value of the flag f/sld/stb indicative of the stability of the SLD controlled state has been set, the exhaust-side main processor 13 determines the value of the flag f/sld/stb in STEP11. If the value of the flag f/sld/stb is "1", i.e., if the SLD controlled state is judged as being stable, then the sliding mode controller 27 limits the SLD manipulating input Usl calculated in STEP9 in STEP12. Specifically, the sliding mode controller 27 determines whether the present value of the SLD manipulating input Usl calculated in STEP9 falls in a predetermined allowable range or not. If the present value of the SLD manipulating input Usl exceeds the upper or lower limit of the allowable range, then the sliding mode controller 27 forcibly limits the present value Usl(k) of the SLD manipulating input Usl to the upper or lower limit of the allowable range.

The SLD manipulating input Usl (=the target differential air-fuel ratio kcmd) limited in STEP12 is stored in a memory (not shown) in a time-series fashion, and will be used in the processing operation of the estimator 26.

Then, the exhaust-side main processor 13 adds the reference value FLAF/BASE to the SLD manipulating input Usl which has been limited in STEP12 for thereby determining a target air-fuel ratio KCMD in STEP 14. Then, the processing in the present control cycle is finished.

If f/sld/stb=0 in STEP11, i.e., if the SLD controlled state is judged as unstable, then the exhaust-side main processor 13 forcibly sets the SLD manipulating input Usl in the present control cycle to a predetermined value (the fixed value or the preceding value of the SLD manipulating input Usl) in STEP13. The exhaust-side main processor 13 calculates the target air-fuel ratio KCMD according to the equation (28) in STEP 14. Then, the processing in the present control cycle is finished.

The target air-fuel ratio KCMD finally determined in STEP14 is stored in a memory (not shown) in a time-series fashion in each control cycle. When the general feedback controller 15 is to use the target air-fuel ratio KCMD determined by the exhaust-side main processor 13 (see STEPf in FIG. 8), the latest one of the time-series data of the target air-fuel ratio KCMD thus stored is selected.

Details of the operation of the apparatus shown in FIG. 1 have been described above.

The operation of the apparatus will be summarized as follows: The exhaust-side main processor 13 sequentially determines the target air-fuel ratio KCMD (the target value for the air-fuel ratio detected by the LAF sensor 5) for the exhaust gas introduced into the catalytic converter 3 so as to converge (adjust) the output signal VO2/OUT of the $O_2$ sensor 6 downstream of the catalytic converter 3 to the target value VO2/TARGET therefor. The amount of fuel injected into the internal combustion engine 1 is adjusted depending on the target air-fuel ratio KCMD and the output KACT (the detected value of the air-fuel ratio) of the LAF sensor 5 to manipulate the air-fuel ratio of the internal combustion engine 1. By adjusting the output signal VO2/OUT of the $O_2$ sensor 6 downstream of the catalytic converter 3 to the target value VO2/TARGET, the catalytic converter 3 can maintain its optimum exhaust gas purifying performance without being affected by its own aging.

Concurrent with the above fuel control for the internal combustion engine.1, the catalytic converter deterioration evaluator 28 of the exhaust-side main processor 13 determines the deterioration evaluating parameter B1MTLS representing the degree of variation of the time-series data of the identified gain coefficient b1 hat, among the identified gain coefficients a1 hat, a2 hat, b1 hat sequentially determined by the identifier 25, from the time-series data of the identified gain coefficient b1 hat. The catalytic converter deterioration evaluator 28 then compares the deterioration evaluating parameter B1MTLS with the threshold CATAGELMT to evaluate whether the catalytic converter 3 is in the deterioration-in-progress state or the non-deteriorated state. If the catalytic converter 3 is in the deterioration-in-progress state, the deterioration-in-progress state is indicated by the deterioration indicator 29.

The apparatus according to the present embodiment is thus capable of evaluating the deteriorated state of the catalytic converter 3 without interrupting, but concurrent with, the control of fuel in the internal combustion engine 1 while the internal combustion engine 1 is operating in an ordinary state in which the air-fuel ratio of the internal combustion engine 1 is controlled in order to achieve an optimum purifying capability of the catalytic converter 3.

For evaluating the deteriorated state of the catalytic converter 3, the square B1MT (or the absolute value) of the difference between each of the time-series data of the identified gain coefficient b1 hat and the identified central value B1LS which is a central value of those time-series data is determined as the variation basic parameter B1MT representing the degree of variation of the time-series data. Then, a central value of the variation basic parameter B1MT is determined as the deterioration evaluating parameter B1MTLS.

The deterioration evaluating parameter B1MTLS is highly correlated to the deteriorated state of the catalytic converter 3, and monotonously increases as the deterioration of the catalytic converter 3 progresses. If the deteriorated state of the catalytic converter 3 remains the same, the value of the deterioration evaluating parameter B1MTLS also remains substantially the same. Therefore, the deteriorated state of the catalytic converter 3 can accurately and properly be evaluated by comparing the deterioration evaluating parameter B1MTLS with the predetermined threshold CATAGELMT.

In the present embodiment, the target air-fuel ratio KCMD determined by the exhaust-side main processor 13 is calculated using the sliding mode controller 27 which is resistant to the effect of disturbances, the estimator 26 which compensates for the effect of the dead times d1, d2 of the object exhaust system E and the air-fuel manipulating system, and the identifier 25 which sequentially identifies on a real-time basis the gain coefficients a1, a2, b1 which are parameters of the exhaust system model that expresses the behavior of the object exhaust system E. Therefore, it is possible to accurately determine the target air-fuel ratio KCMD optimum for controlling the output VO2/OUT of the $O_2$ sensor 6 at the target value VO2/TARGET therefor. The air-fuel ratio of the internal combustion engine 1 is controlled to converge the output KACT of the LAF sensor 5 to the target air-fuel ratio KCMD primarily by the adaptive controller 18 which is a controller of the recursive type capable of accurately compensating for the effect of behavioral changes of the internal combustion engine 1.

Thus, the output VO2/OUT of the $O_2$ sensor 6 can stably be controlled at the target value VO2/TARGET therefor while minimizing the effect of disturbances. Therefore, the behavior of the object exhaust system E is stabilized, preventing disturbances other than the deteriorated state of the catalytic converter 3 from affecting the identified gain coefficients a1 hat, a2 hat, b1 hat. As a result, the correlation between the degree of variation of the time-series data of the identified gain coefficient b1 hat and the deteriorated state of the catalytic converter 3 is increased, and hence the deteriorated state of the catalytic converter 3 can accurately be evaluated based on the deterioration evaluating parameter B1MTLS which represents the degree of variation of the time-series data of the identified gain coefficient b1.

In the present invention, the identifier 25 calculates (updates) the identified gain coefficients a1 hat, a2 hat, b1 hat when the object exhaust system E is in a behavioral state in which the air-fuel ratio is changed from a leaner value to a richer value. The above behavioral state of the object exhaust system E can simply and reliably be recognized using the management function γ defined using the time-series data of the differential output VO2 of the $O_2$ sensor 6. Therefore, it is possible to control the air-fuel ratio of the internal combustion engine 1 and also to determine the identified gain coefficients a1 hat, a2 hat, b1 hat that are highly reliable and suitable for evaluating the deteriorated state of the catalytic converter 3.

In calculating the identified error id/e used to sequentially update the identified gain coefficients a1 hat, a2 hat, b1 hat, the identified differential output VO2 hat corresponding to the output VO2/OUT of the $O_2$ sensor 6 on the exhaust system model and the actual differential output VO2 of the $O_2$ sensor 6 are subjected to a filtering process of the same frequency characteristics (low-pass characteristics), in view of the frequency characteristics (low-pass characteristics) of the object exhaust system E.

Therefore, it is possible to identify the gain coefficients a1, a2, b1 in a manner to cause the frequency characteristics of the exhaust system model to match the actual frequency characteristics of the object exhaust system E, for thereby determining the identified gain coefficients a1 hat, a2 hat, b1 hat that match the behavioral characteristics of the object exhaust system E. Therefore, the reliability of the identified gain coefficients a1 hat, a2 hat, b1 hat is increased. Particularly, the identified gain coefficient b1 hat can properly reflects the effect of the deteriorated state of the catalytic converter 3.

In sequentially calculating the identified gain coefficients a1 hat, a2 hat, b1 hat, the above limiting process is performed to determine the identified gain coefficients a1 hat, a2 hat, b1 hat which are suitable to make smooth and stable the target air-fuel ratio KCMD and the air-fuel ratio of the internal combustion engine 1 controlled thereby. At the same time, it is possible to stably determine an identified gain coefficient b1 hat highly reflecting the deteriorated state of the catalytic converter 3 while eliminating an identified gain coefficient b1 hat which is not suitable for evaluating the deteriorated state of the catalytic converter 3.

Furthermore, in the exhaust system model and the processing operation of the identifier 25, the output KACT from the LAF sensor 5 and the output VO2/OUT from the $O_2$ sensor 6 are not directly used, but the difference kact between the output KACT from the LAF sensor 5 and the reference value FLAF/BASE and the difference VO2 between the output VO2/OUT from the $O_2$ sensor 6 and the target value VO2/TARGET (reference value) are used. Therefore, the algorithm of the processing operation of the identifier 25 is constructed easily, and the accuracy of the processing operation of the identifier 25 is increased. This holds true for the processing operation of the estimator 26 and the sliding mode controller 27.

In the cruise state in which the exhaust gas volume of the internal combustion engine 1 is maintained at a substantially constant level, the process of calculating the identified central value B1LS and the deterioration evaluating parameter B1MTLS and the process of evaluating the deteriorated state of the catalytic converter 3 based on the deterioration evaluating parameter B1MTLS (STEP6-5, STEP6-6) are not carried out. Stated otherwise, the identified gain coefficient b1 hat determined by the identifier 25 is not used in the cruise state in calculating the deterioration evaluating parameter B1MTLS for evaluating the deteriorated state of the catalytic converter 3. In operating states of the internal combustion engine 1 other than the cruise state, the identified gain coefficient b1 hat determined by the identifier 25 is used to calculate the deterioration evaluating parameter B1MTLS.

Therefore, it is possible to obtain the deterioration evaluating parameter B1MTLS which is reliably correlated to the deteriorated state of the catalytic converter 3, achieving the reliability of the evaluation of the deteriorated state of the catalytic converter 3.

The present invention is not limited to the above embodiment, but may be modified as follows:

In the above embodiment, the deterioration evaluating parameter B1MTLS is determined from the time-series data of the identified gain coefficient b1 hat, among the identified gain coefficients a1 hat, a2 hat, b1 hat, and the deteriorated state of the catalytic converter 3 is evaluated based on the deterioration evaluating parameter B1MTLS. However, the deteriorated state of the catalytic converter 3 may be evaluated using the identified gain coefficient a1 hat or a2 hat. In such a case, a central value of the time-series data of the identified gain coefficient a1 hat or a2 hat is sequentially determined according to a sequential statistical algorithm (more generally, a low-pass filtering process) such as a degression gain method or a method of least squares, and a central value of the square or absolute value of the difference between the central value and each of the data of the identified gain coefficient a1 hat or a2 hat is determined as a deterioration evaluating parameter according to a sequential statistical algorithm (more generally, a low-pass filtering process) such as a degression gain method or a method of least squares. The deterioration evaluating parameter thus determined is correlated to the deteriorated state of the catalytic converter 3 in the same manner as with the deterioration evaluating parameter B1MTLS in the above embodiment, and the deteriorated state of the catalytic converter 3 can be evaluated based on the deterioration evaluating parameter thus determined.

However, the inventors have found that of the identified gain coefficients a1 hat, a2 hat, b1 hat, the identified gain coefficient b1 hat has a largest tendency to vary more greatly as the deterioration of the catalytic converter 3 progresses. Therefore, it is preferable to determine the deterioration evaluating parameter using the identified gain coefficient b1.

In the above embodiment, the deteriorated state of the catalytic converter 3 is evaluated based on only the deterioration evaluating parameter B1MTLS determined from the identified gain coefficient b1. However, deterioration evaluating parameters may be determined respectively from the identified gain coefficients a1 hat, a2 hat, b1 hat, the deteriorated state of the catalytic converter 3 may be temporarily determined based on the respective deterioration evaluating parameters, and the evaluated results may be combined to finally evaluate the deteriorated state of the catalytic converter 3.

In the above embodiment, in determining the deterioration evaluating parameter B1MTLS, the central value (=the identified central value B1LS) of the identified gain coefficient b1 hat is determined according to a sequential statistical algorithm of a degression gain method. However, the central value of the identified gain coefficient b1 hat may be determined according to any of various other statistical algorithms such as a method of minimum squares, a method of weighted minimum squares, a fixed gain method, etc. Furthermore, an arithmetic mean of the time-series data of the identified gain coefficient b1 hat may be determined as the central value thereof. This also holds true for the determination of a deterioration evaluating parameter using the other identified gain coefficient a1 hat or a2 hat.

In the above embodiment, the central value of the square of the difference B1MT between each of the identified gain coefficient b1 hat and the identified central value B1LS is determined as the deterioration evaluating parameter B1MTLS representing the degree of variation of the time-series data of the identified gain coefficient b1 hat. However, an arithmetic mean of the square of the difference B1MT, which represents a variance of the time-series data of the identified gain coefficient b1 hat, or a standard deviation which is the square root of the arithmetic mean or variance may be determined as the deterioration evaluating parameter, or the deterioration evaluating parameter may be determined using the absolute value of the difference B1MT instead of the square of the difference B1MT. Dependent on the operating conditions of the internal combustion engine 1 and the accuracy required of the evaluation of the deteriorated state of the catalytic converter 3, it is possible to evaluate the deteriorated state of the catalytic converter 3 using the square or absolute value of the difference B1MT itself as the deterioration evaluating parameter. This also holds true for the determination of a deterioration evaluating parameter using the other identified gain coefficient a1 hat or a2 hat.

In the above embodiment, the deteriorated state of the catalytic converter 3 is evaluated as one of the two states, i.e., the deterioration-in-progress state and the non-deteriorated state. However, if an increased number of thresholds are used for comparison with the deterioration evaluating parameter, then the deteriorated state of the catalytic converter 3 may be evaluated as three or more deteriorated states. In this case, different evaluations may be indicated depending on those three or more deteriorated states.

In the above embodiment, the model of the object exhaust system E (the exhaust system model) is expressed according to the equation (1). However, the exhaust system model may be expressed according to an equation in which the secondary autoregressive term (the term of VO2(k−1) is be dispensed with, or more autoregressive terms including the term of VO2(k−2), for example, are added.

In the above embodiment, the model of the object exhaust system E used to determine the deteriorated state of the catalytic converter 3 and the model of the object exhaust system E used to control the air-fuel ratio of the internal combustion engine 1, i.e., to calculate the target air-fuel ratio KCMD, are the same as each other, and the parameters (gain coefficients) a1, a2, b1 of the model are identified by the same identifier 25. However, different models of the object exhaust system E may be established to determine the deteriorated state of the catalytic converter 3 and control the air-fuel ratio of the internal combustion engine 1, and the parameters of those models may be identified by respective identifiers.

In the above embodiment, the deteriorated state of the catalytic converter 3 is evaluated while controlling the air-fuel ratio of the internal combustion engine 1 at an air-fuel ratio for achieving an optimum purifying capability of the catalytic converter 3. However, even while the internal combustion engine 1 is operating in another mode, it is possible to identify the parameters (gain coefficients) a1, a2, b1 of the exhaust system model and determine the deterioration evaluating parameter from the identified values for evaluating the deteriorated state of the catalytic converter 3.

In the above embodiment, the adaptive sliding mode control process is employed to calculate the target air-fuel ratio KCMD. However, the ordinary sliding mode control process which does not use the adaptive control law may be employed to calculate the target air-fuel ratio KCMD.

In the above embodiment, the effect of the total dead time d is compensated for by the estimator 26 in calculating the target air-fuel ratio KCMD for converging the output VO2/OUT of the $O_2$ sensor 6 to the target value VO2/TARGET. If the dead time of the air-fuel ratio manipulating system, which is made up of the internal combustion engine 1 and the engine-side control unit 7b, is negligibly small, then only the dead time d1 of the object exhaust system E may be compensated for. In this modification, the estimator 26 sequentially determines in each control cycle the estimated value VO2(k+d1) after the dead time d1 of the differential output VO2 of the $O_2$ sensor 6, according to the following equation (49) which is similar to the equation (12) except that "kcmd" and "d" are replaced respectively with "kact" and "d1":

$$\overline{VO2}(k+d1) = \alpha 1 \cdot VO2(k) + \alpha 2 \cdot VO2(k-1) + \sum_{j=1}^{d1} \beta j \cdot kact(k-j) \quad (49)$$

where
$\alpha 1$=the first-row, first-column element of $A^{d1}$,
$\alpha 2$=the first-row, second-column element of $A^{d1}$,
$\beta$=the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

In this modification, the sliding mode controller 27 determines in each control cycle the equivalent control input Ueq, the reaching control law input Urch, and the adaptive control law input Uadp according to equations which are similar to the equations (24)–(27) except that "d" is replaced with "d1", and adds the equivalent control input Ueq, the reaching control law input Urch, and the adaptive control law input Uadp to determine the target differential air-fuel ratio kcmd for thereby determining the target air-fuel ratio KCMD which has been compensated for the effect of the dead time d1 of the object exhaust system E.

If the dead time d2 of the object exhaust system E as well as the dead time d1 of the air-fuel ratio manipulating system is negligibly small, then the estimator 26 may be dispensed with. In this modification, the processing operation of the sliding mode controller 27 and the identifier 25 may be performed with d=d1=0.

In the above embodiment, the $O_2$ sensor 6 is used as the second exhaust gas sensor. However, for maintaining the desired purifying performance of the catalytic converter 3, any of various other sensors may be employed insofar as they can detect the concentration of a certain component of the exhaust gas downstream of the catalytic converter to be controlled. For example, a CO sensor is employed if the carbon monoxide (CO) in the exhaust gas downstream of the catalytic converter is controlled, an NOx sensor is employed if the nitrogen oxide (NOx) in the exhaust gas downstream of the catalytic converter is controlled, and an HC sensor is employed if the hydrocarbon (HC) in the exhaust gas downstream of the catalytic converter is controlled. If a three-way catalytic converter is employed, then it can be controlled to maximize its purifying performance irrespective of which of the above gas components is detected for its concentration. If a reducing catalytic converter or an oxidizing catalytic converter is employed, then its purifying performance can be increased by directly detecting a gas component to be purified.

For evaluating the deteriorated state of the catalytic converter 3, an exhaust gas sensor other than the LAF sensor 5 may be used as the first exhaust gas sensor, and may comprise a CO sensor, an NOx sensor, a HC sensor, or the like. The first and second exhaust gas sensors may be selected such that when the object exhaust system E is modeled and the parameters of the model are identified, the degree of variation of the time-series data of the identified values varies depending on the deteriorated state of the catalytic converter 3.

In the above embodiment, the differential output kact from the LAF sensor 5, the differential output VO2 from the $O_2$ sensor 6, and the target differential air-fuel ratio kcmd are employed in performing the processing operation of the identifier 25, the estimator 26, and the sliding mode controller 27. However, the output KACT of the LAF sensor 5, the output VO2/OUT of the $O_2$ sensor 6, and the target air-fuel ratio KCMD may directly be employed in performing the processing operation of the identifier 25, the estimator 26, and the sliding mode controller 27. The reference value FLAF/BASE relative to the differential output kact (=KACT−FLAF/BASE) may not necessarily be of a constant value, but may be established depending on the rotational speed NE and intake pressure PB of the internal combustion engine 1.

In the above embodiment, in order to reliably achieve the optimum purifying capability of the catalytic converter 3, the identifier 25, the estimator 26, and the sliding mode controller 27 are used to calculate the target air-fuel ratio KCMD, and the air-fuel ratio of the internal combustion engine 1 is feedback-controlled using the adaptive controller 18. However, if the purifying capability of the catalytic converter 3 is not required to be so strict, the target air-fuel ratio KCMD may be calculated and the air-fuel ratio of the internal combustion engine 1 may be feedback-controlled according to a general PID control process.

In the above embodiment, the deteriorated state of the catalytic converter 3 which is disposed in the exhaust pipe 2 of the internal combustion engine 1 is evaluated. However, if the deteriorated state of the catalytic converter 3 alone is to be determined, then an air-fuel mixture which is the same as the air-fuel mixture supplied to the internal combustion engine 1 may be combusted by a combustion device other than the internal combustion engine 1, and an exhaust gas produced by the combustion device may be supplied to the catalytic converter 3 for the evaluation of the deteriorated state of the catalytic converter 3.

Although a certain preferred embodiment of the present invention has been shown and described in detail, it should be understood that various changes and modifications may be made therein without departing from the scope of the appended claims.

What is claimed is:

1. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

sequentially identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor;

determining data representing a degree of variation of time-series data of the identified value of the parameter of said model, as a deterioration evaluating parameter, from the time-series data of said identified value, and evaluating a deteriorated state of said catalytic converter based on the determined deterioration evaluating parameter; and wherein said model comprises a model expressing said object exhaust system for generating the output of said second exhaust gas sensor from the output of said first exhaust gas sensor via at least one of a response delay element and a dead time element, and includes, as said parameter, at least one of a coefficient relative to the output of said first exhaust gas sensor and a coefficient relative to the output of said second exhaust gas sensor.

2. A method according to claim 1, wherein said catalytic converter comprises a catalytic converter disposed in the exhaust passage of an internal combustion engine which combusts said air-fuel mixture therein.

3. A method according to claim 1, wherein said step of sequentially identifying the value of said parameter comprises the step of:

limiting the identified value of said parameter.

4. A method according to claim 1, wherein said first exhaust gas sensor comprises a sensor for producing an output representing the air-fuel ratio of said air-fuel mixture from which the exhaust gas entering said catalytic converter is produced, and said second exhaust gas sensor comprises a sensor for producing an output representing the content of a particular component of the exhaust gas that has passed through said catalytic converter.

5. A method according to claim 4, wherein said catalytic converter comprises a catalytic converter disposed in the exhaust passage of an internal combustion engine which combusts said air-fuel mixture therein.

6. A method according to claim 5, further comprising the step of:

controlling the air-fuel ratio of said internal combustion engine in order to converge the output of said second exhaust gas sensor to a predetermined target value when the exhaust gas is supplied to said exhaust passage upon operation of said internal combustion engine;

wherein said value of the parameter is identified and said deteriorated state of said catalytic converter is evaluated concurrent with said step of controlling the air-fuel ratio of said internal combustion engine.

7. A method according to claim 6, wherein said step of controlling the air-fuel ratio of said internal combustion engine comprises the steps of:

calculating a target air-fuel ratio of said internal combustion engine in order to converge the output of said second exhaust gas sensor to said target value; and controlling the air-fuel ratio of said internal combustion engine according to a feedback control process in order to converge the air-fuel ratio represented by the output of said first exhaust gas sensor to said target air-fuel ratio.

8. A method according to claim 7, wherein said target air-fuel ratio is calculated by a sliding mode controller.

9. A method according to claim 7, wherein said target air-fuel ratio is calculated by an algorithm determined in advance using the identified data of said parameter.

10. A method according to claim 7, wherein the air-fuel ratio of said internal combustion engine is controlled according to the feedback control process by a recursive-type controller.

11. A method according to claim 1, wherein said model comprises a model expressing said object exhaust system as a discrete-time system for generating the output of said second exhaust gas sensor from the output of said first exhaust gas sensor via at least one of a response delay element and a dead time element, and includes, as said parameter, at least one of a coefficient relative to the output of said first exhaust gas sensor and a coefficient relative to the output of said second exhaust gas sensor.

12. A method according to claim 11, wherein said parameter includes the coefficient relative to the output of said first exhaust gas sensor, and said step of evaluating the deteriorated state of said catalytic converter comprises the step of:

evaluating the deteriorated state of said catalytic converter based on said deterioration evaluating parameter determined from time-series data of the identified value of the coefficient relative to the output of said first exhaust gas sensor.

13. A method according to claim 11 or 12, wherein said step of sequentially identifying the value of said parameter comprises the steps of:

sequentially identifying the value of said parameter according to an algorithm for sequentially updating and identifying the value of said parameter in order to minimize an error between the output of said second exhaust gas sensor in said model and an actual output of said second exhaust gas sensor; and filtering the output of said second exhaust gas sensor in said model and the actual output of said second exhaust gas sensor with the same frequency passing characteristics in calculating said error.

14. A method according to claim 11 or 12, wherein said step of sequentially identifying the value of said parameter comprises the step of:

sequentially identifying the value of said parameter depending on a particular behavior of said object exhaust system.

15. A method according to claim 14, wherein said step of sequentially identifying the value of said parameter comprises the step of:

recognizing the particular behavior of said object exhaust system based on the value of a function that is determined by a predetermined number of time-series data prior to the present of the output of said second exhaust gas sensor.

16. A method according to claim 12, wherein said step of sequentially identifying the value of said parameter comprises the step of:

calculating the identified value of said parameter based on the difference between an actual output of said first exhaust gas sensor and a predetermined reference value and the difference between an actual output of said second exhaust gas sensor and a predetermined reference value, which differences are used as the data of the outputs of said first and second exhaust gas sensors.

17. A method according to claim 12, wherein said step of evaluating the deteriorated state of said catalytic converter comprises the steps of:

determining a central value of the identified value of said parameter by effecting a low-pass filtering process on the time-series data of the identified value of said parameter; and determining said deterioration evaluating parameter from the difference between said central value and each of the time-series data of the identified value of said parameter.

18. A method according to claim 17, wherein said low-pass filtering process comprises a filtering process according to a sequential statistical algorithm.

19. A method according to claim 17, wherein said step of evaluating the deteriorated state of said catalytic converter comprises the step of:

determining said deterioration evaluating parameter by effecting a low-pass filtering process on the square or absolute value of the difference between said central value and each of the time-series data of the identified value of said parameter.

20. A method according to claim 19, wherein said low-pass filtering process comprises a filtering process according to a sequential statistical algorithm.

21. A method according to claim 12, further comprising the step of:

determining whether the exhaust gas is supplied to said exhaust passage at a substantially constant rate or not;

wherein said step of evaluating the deteriorated state of said catalytic converter comprises the step of:

preventing said deterioration evaluating parameter from being determined using data of the identified value if it is determined that the exhaust gas is supplied to said exhaust passage at the substantially constant rate.

22. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

sequentially identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor;

determining data representing a degree of variation of time-series data of the identified value of the parameter of said model, as a deterioration evaluating parameter, from the time-series data of said identified value, and evaluating a deteriorated state of said catalytic converter based on the determined deterioration evaluating parameter; and calculating the identified value of said parameter based on the difference between an actual output of said first exhaust gas sensor and a predetermined reference value and the difference between an actual output of said second exhaust gas sensor and a predetermined reference value, which differences are used as the data of the outputs of said first and second exhaust gas sensors.

23. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

sequentially identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor;

determining data representing a degree of variation of time-series data of the identified value of the parameter of said model, as a deterioration evaluating parameter, from the time-series data of said identified value, and evaluating a deteriorated state of said catalytic converter based on the determined deterioration evaluating parameter;

determining a central value of the identified value of said parameter by effecting a low-pass filtering process on the time-series data of the identified value of said parameter; and determining said deterioration evaluating parameter from the difference between said central value and each of the time-series data of the identified value of said parameter.

24. A method according to claim 23, wherein said low-pass filtering process comprises a filtering process according to a sequential statistical algorithm.

25. A method according to claim 23, wherein said step of evaluating the deteriorated state of said catalytic converter comprises the step of:

determining said deterioration evaluating parameter by effecting a low-pass filtering process on the square or absolute value of the difference between said central value and each of the time-series data of the identified value of said parameter.

26. A method according to claim 25, wherein said low-pass filtering process comprises a filtering process according to a sequential statistical algorithm.

27. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

sequentially identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor;

determining data representing a degree of variation of time-series data of the identified value of the parameter of said model, as a deterioration evaluating parameter, from the time-series data of said identified value, and evaluating a deteriorated state of said catalytic converter based on the determined deterioration evaluating parameter;

determining whether the exhaust gas is supplied to said exhaust passage at a substantially constant rate or not; and preventing said deterioration evaluating parameter from being determined using data of the identified value if it is determined that the exhaust gas is supplied to said exhaust passage at the substantially constant rate.

28. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

sequentially identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor;

determining data representing a degree of variation of time-series data of the identified value of the parameter of said model, as a deterioration evaluating parameter, from the time-series data of said identified value, and evaluating a deteriorated state of said catalytic converter based on the determined deterioration evaluating parameter;

wherein said model comprises a model expressing said object exhaust system as a discrete-time system for generating the output of said second exhaust gas sensor from the output of said first exhaust gas sensor via at least one of a response delay element and a dead time element, and includes, as said parameter, at least one of a coefficient relative to the output of said first exhaust gas sensor and a coefficient relative to the output of said second exhaust gas sensor;

wherein said parameter includes the coefficient relative to the output of said first exhaust gas sensor, and wherein said step of evaluating the deteriorated state of said catalytic converter includes evaluating the deteriorated state of said catalytic converter based on said deterioration evaluating parameter determined from time-series data of the identified value of the coefficient relative to the output of said first exhaust gas sensor; and wherein said step of sequentially identifying the value of said parameter includes limiting the identified value of said parameter.

* * * * *